(12) United States Patent
Conant et al.

(10) Patent No.: US 11,000,148 B2
(45) Date of Patent: May 11, 2021

(54) BEVERAGE-BREWING PACKAGE

(71) Applicant: Berry Plastics Corporation, Evansville, IN (US)

(72) Inventors: David W. Conant, Sanford, NC (US); Debra R. Wilson, Houston, TX (US); Yucheng Peng, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 181 days.

(21) Appl. No.: 15/631,236

(22) Filed: Jun. 23, 2017

(65) Prior Publication Data

US 2017/0367521 A1 Dec. 28, 2017

Related U.S. Application Data

(60) Provisional application No. 62/355,366, filed on Jun. 28, 2016, provisional application No. 62/379,995, filed on Aug. 26, 2016.

(51) Int. Cl.
| | |
|---|---|
| *A47J 31/36* | (2006.01) |
| *B65D 1/26* | (2006.01) |
| *B65D 85/816* | (2006.01) |
| *A47J 31/06* | (2006.01) |
| *B65D 85/804* | (2006.01) |

(52) U.S. Cl.
CPC .......... *A47J 31/3676* (2013.01); *B65D 1/265* (2013.01); *B65D 85/816* (2013.01); *A47J 31/0626* (2013.01); *B65D 85/8043* (2013.01)

(58) Field of Classification Search
CPC ....... B32B 27/08; B32B 27/306; B32B 27/18; B32B 27/30; B32B 27/34; B32B 2307/74; B32B 2439/80; B32B 2250/03; B32B 2250/40; B32B 2307/7246; B32B 2439/70; B29C 48/18; B29C 48/92; B29C 48/21; B29C 48/022; Y10T 428/3175; B29K 2031/00; B29K 2077/00

See application file for complete search history.

(56) References Cited

U.S. PATENT DOCUMENTS

| | | |
|---|---|---|
| 3,077,284 A | 2/1963 | Mclaughlin |
| 3,530,917 A | 9/1970 | Donovan |
| 3,721,367 A | 3/1973 | Fletcher |
| 5,012,928 A | 5/1991 | Proffitt |
| 5,325,765 A | 7/1994 | Sylvan |
| 5,840,189 A | 11/1998 | Sylvan |
| D452,433 S | 12/2001 | Lazaris |
| D452,434 S | 12/2001 | Sweeney |

(Continued)

FOREIGN PATENT DOCUMENTS

| | | |
|---|---|---|
| ES | 1073281 | 11/2010 |
| WO | 2012076135 A1 | 6/2012 |

(Continued)

OTHER PUBLICATIONS

Office Action dated Jun. 29, 2018 for U.S. Appl. No. 15/236,010 (p. 1-13).

(Continued)

*Primary Examiner* — Anthony J Frost
(74) *Attorney, Agent, or Firm* — Barnes & Thornburg LLP

(57) ABSTRACT

A beverage brewing package includes a cup and a sealant film. The cup may be formed by a thermoforming process.

20 Claims, 14 Drawing Sheets

(56) References Cited

U.S. PATENT DOCUMENTS

| | | | |
|---|---|---|---|
| 6,440,256 B1 | 8/2002 | Gordon | |
| D474,110 S | 5/2003 | Sweeney | |
| D474,111 S | 5/2003 | Lazaris | |
| 6,589,577 B2 | 7/2003 | Lazaris | |
| 6,607,762 B2 | 8/2003 | Lazaris | |
| 6,645,537 B2 | 11/2003 | Sweeney | |
| 6,655,260 B2 | 12/2003 | Lazaris | |
| D502,362 S | 3/2005 | Lazaris | |
| 7,328,651 B2 | 2/2008 | Halliday | |
| 7,531,198 B2 | 5/2009 | Cortese | |
| D637,484 S | 5/2011 | Winkler | |
| D647,398 S | 10/2011 | Winkler | |
| D647,399 S | 10/2011 | Winkler | |
| 8,252,351 B2 | 8/2012 | Ozanne | |
| 8,361,527 B2 | 1/2013 | Winkler | |
| 8,685,479 B2 | 4/2014 | Dogan | |
| D747,187 S | 1/2016 | Cochran | |
| 2002/0020659 A1 | 2/2002 | Sweeney | |
| 2004/0045443 A1 | 3/2004 | Lazaris | |
| 2005/0051478 A1 | 3/2005 | Karanikos | |
| 2005/0287251 A1 | 12/2005 | Lazaris | |
| 2010/0064899 A1 | 3/2010 | Aardenburg | |
| 2010/0288131 A1 | 11/2010 | Kilber | |
| 2010/0303964 A1* | 12/2010 | Beaulieu | B65D 85/8043 426/77 |
| 2011/0151075 A1 | 6/2011 | Peterson | |
| 2012/0070596 A1* | 3/2012 | Kwon | C08F 10/00 428/36.9 |
| 2012/0251749 A1* | 10/2012 | Lee | C08L 23/16 428/35.2 |
| 2012/0308688 A1 | 12/2012 | Peterson | |
| 2013/0101716 A1 | 4/2013 | Beaulieu | |
| 2013/0122167 A1 | 5/2013 | Winkler | |
| 2013/0129872 A1 | 5/2013 | Krueger | |
| 2013/0323370 A1* | 12/2013 | Gerbaulet | B65D 85/8043 426/115 |
| 2014/0212546 A1* | 7/2014 | Koestring | A47J 31/0626 426/82 |
| 2014/0363655 A1* | 12/2014 | Yoshida | B32B 27/34 428/220 |
| 2017/0042362 A1 | 2/2017 | Bunner | |
| 2017/0121050 A1 | 5/2017 | Foster | |

FOREIGN PATENT DOCUMENTS

| | | |
|---|---|---|
| WO | 2013132436 A1 | 9/2013 |
| WO | 2014128315 | 8/2014 |
| WO | 2016174671 | 11/2016 |

OTHER PUBLICATIONS

Braskem Regulatory Information Sheet for INSPIRE 6025N Polypropylene Resin, 12 pages.

Braskem information sheet for INSPIRE 6025N Polypropylene, 1 page.

Office Action dated Feb. 19, 2019 for U.S. Appl. No. 15/236,010 (pp. 1-15).

Office Action dated Oct. 18, 2019 for U.S. Appl. No. 15/236,010, (pp. 1-16).

Office Action dated May 15, 2020 for U.S. Appl. No. 15/236,010, (pp. 1-21).

International Search Report and Written Opinion for PCT/EP2019/065625, dated Jan. 9, 2020.

Mexican Office Action for Mexican Patent App. No. MX/a/2017/08605 dated Feb. 5, 2021, BP-506 MX II (5723-265447), 5 pages.

* cited by examiner

BEVERAGE-BREWING PACKAGE

CROSS REFERENCE TO RELATED APPLICATIONS

This application claims priority under 35 U.S.C. § 119(e) to U.S. Provisional Patent Application No. 62/355,366, filed Jun. 28, 2016, and U.S. Provisional Patent Application No. 62/379,995, filed Aug. 26, 2016, each of which is expressly incorporated by reference herein.

BACKGROUND

The present disclosure relates to a package, and particularly to one-cup beverage brewing systems. More particularly, the present disclosure relates to a cup included in a one-cup beverage package.

SUMMARY

A beverage-brewing package in accordance with the present disclosure includes a cup formed to include an interior region. In illustrative embodiments, the beverage-brewing package also includes coffee, tea, or cocoa grinds stored in the interior region of the cup.

In illustrative embodiments, the cup is thermoformed from a multi-layer sheet. The multi-layer sheet includes an outer-skin layer, an inner-skin layer, and a barrier layer extending between the outer-skin layer and the inner-skin layer. The outer-skin layer is arranged to form an exterior surface of the cup. The inner-skin layer is arranged to form an interior surface of the cup. The barrier layer is configured to block gas travel through the cup to maximize the shelf life of the contents stored in the beverage-brewing package.

In illustrative embodiments, the cup comprises a polypropylene impact copolymer and a mineral filler. Illustratively, the polypropylene impact copolymer and the mineral filler cooperate to minimize fractures extending from a cannula aperture formed in a floor of the cup during a brewing operation.

In illustrative embodiments, the cup is configured to float in water allowing the cup to be separated in a sink/float tank during a recycling process. The cup has a density between about 0.9 g/cm$^3$ and about 0.98 g/cm$^3$.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a beverage-brewing package including a cup comprising a multi-layer sheet and a sealant film coupled to a brim of the cup;

FIG. 2 is a sectional diagrammatic view taken along line 2-2 of FIG. 1 showing a one-cup beverage brewing system such as a coffee maker having pressurized hot water admitted into a filter bag through an inlet cannula arranged to pierce a portion of the sealant film located over coffee grinds and brewed coffee is discharged from the cup through an outlet cannula arranged to pierce a portion of a floor of the cup;

DETAILED DESCRIPTION

Figure 1:
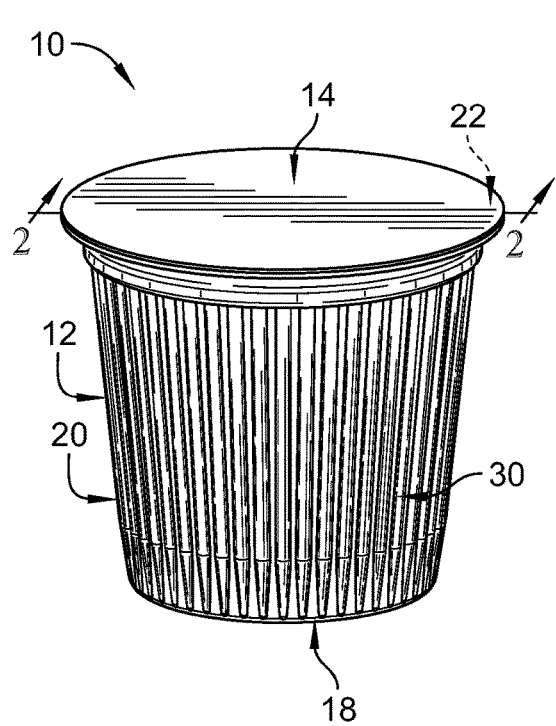

A first embodiment of a beverage-brewing package 10 including a cup 12 in accordance with the present disclosure is shown in FIGS. 1, 2, and 4-11. A second embodiment of a cup 212 in accordance with the present disclosure is shown in FIGS. 12-19. A third embodiment of a cup 312 in accordance with the present disclosure is shown in FIGS. 20 and 22-29. Cups 12, 212, and 312 comprise a multi-layer sheet, which is configured to form a cannula aperture in the cup in response to a force being applied by an outlet cannula of a beverage maker during a beverage-making process so that fractures extending from the cannula aperture are minimized. The multi-layer sheet also has a density to cause resulting cups 12, 212, and 312 to float in a sink/float separation tank during a recycling process. A first embodiment of a multi-layer sheet 16 in accordance with the present disclosure is shown in FIG. 3. A second embodiment of a multi-layer sheet 316 in accordance with the present disclosure is shown in FIG. 21.

Figure 2:
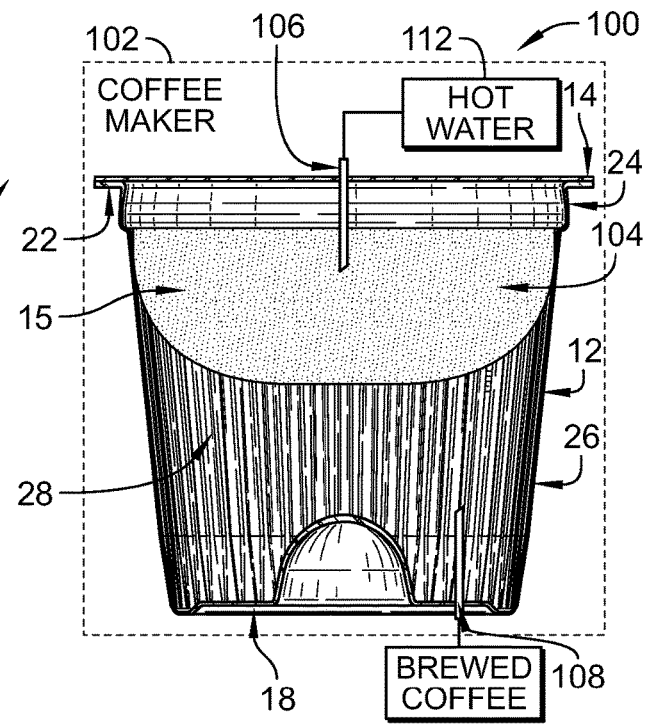
Figure 3:
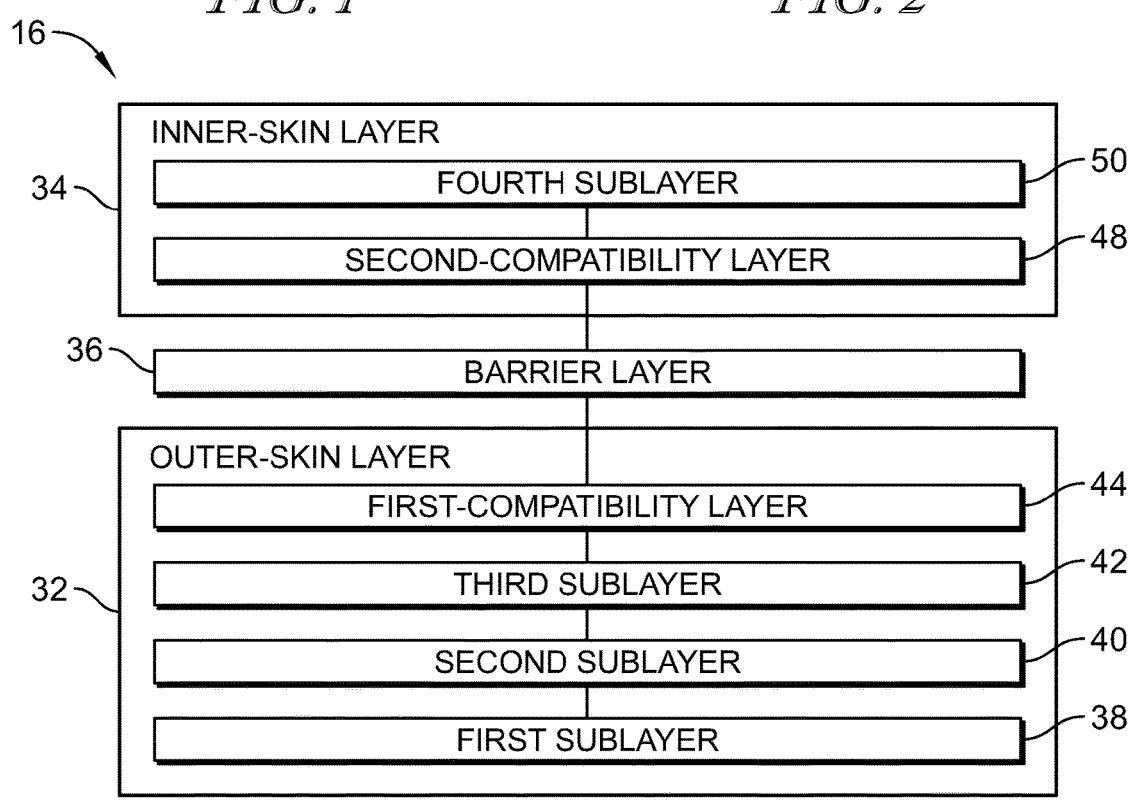
FIG. 3 is a diagrammatic view of the multi-layer sheet used to form the cup, showing that the multi-layer sheet includes from top-to-bottom an inner-skin layer, a barrier layer, and an outer-skin layer.
Figure 4:
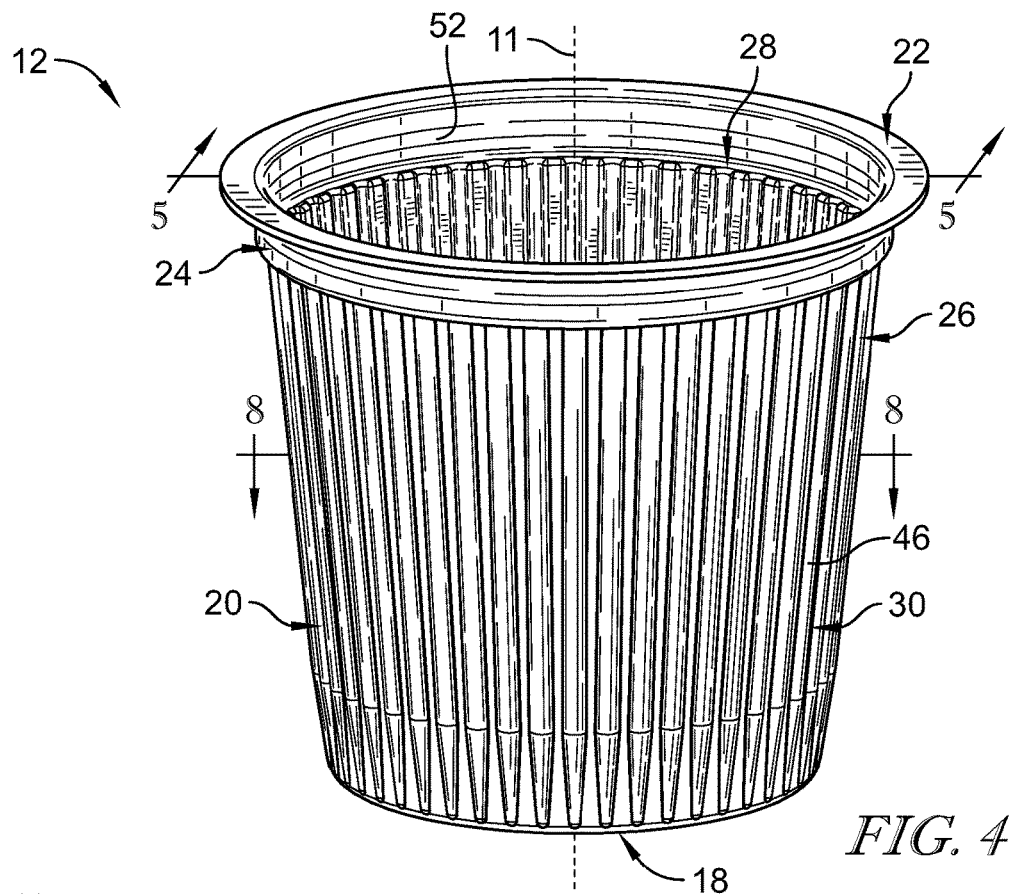
FIG. 4 is a perspective view of the cup of FIG. 1 showing that the cup includes the floor, and a side wall extending up from the floor towards the brim to define an interior product-storage region, and further showing the side wall and the brim extending circumferentially around a central axis.
Figure 5:
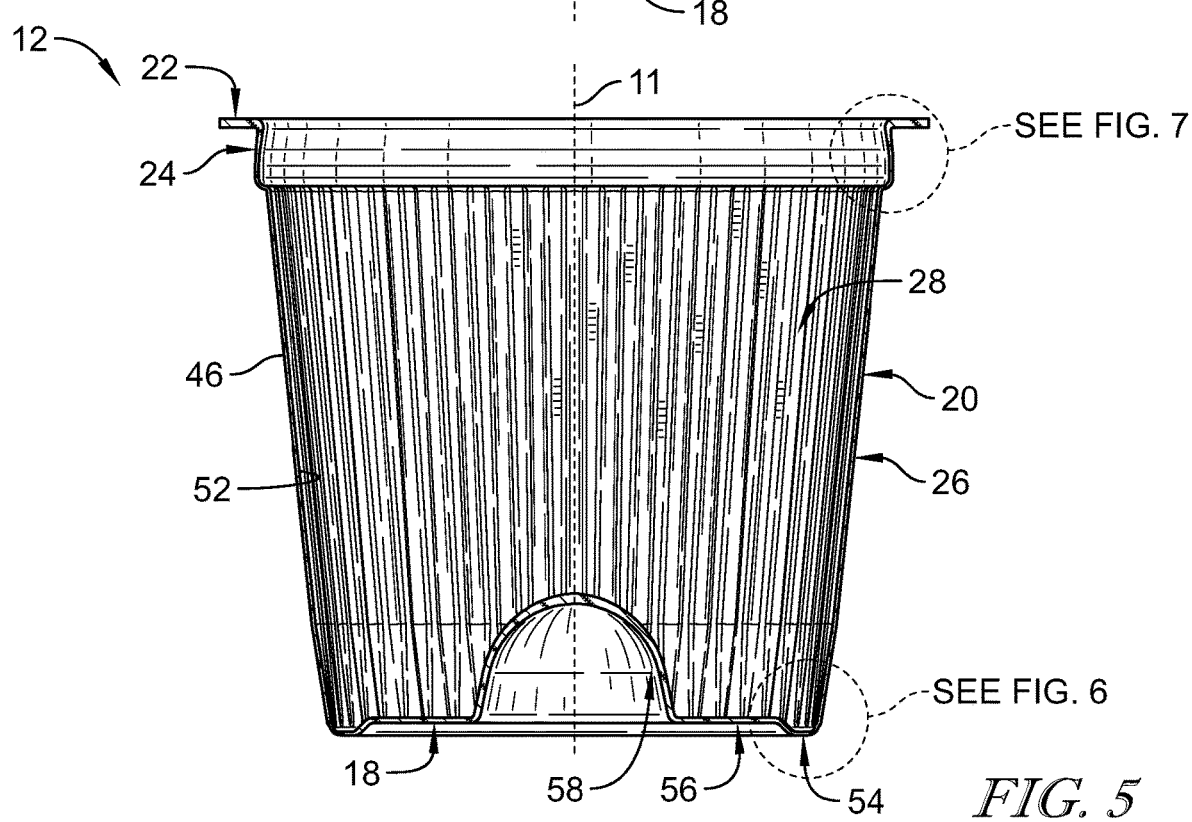
FIG. 5 is a sectional view taking along line 5-5 of FIG. 4 showing that the floor includes a floor mount, a floor dome, and a disc extending radially-outwardly from the floor dome to the floor mount.
Figure 6:
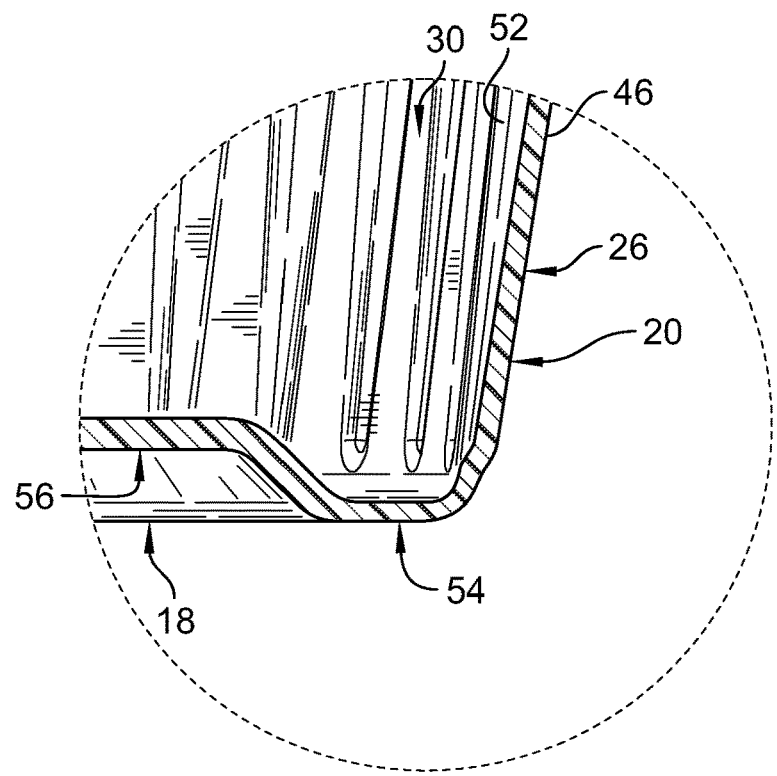
FIG. 6 is a detail view of a circled region of FIG. 5 showing the floor mount extending between the side wall and the disc of the floor.
Figure 7:
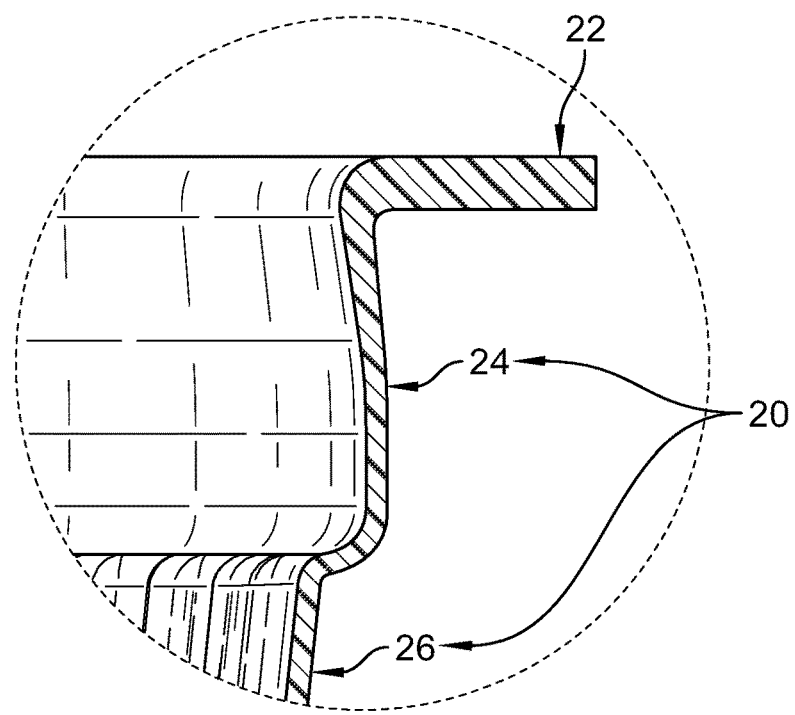
FIG. 7 is a detail view of a circled region of FIG. 5 showing that the side wall is formed to include a stack shoulder and a frustoconical panel, and the stack shoulder extends between the frustoconical panel and the brim and further showing that the brim extends radially outward from the stack shoulder to form an upward facing surface of the brim.
Figure 8:
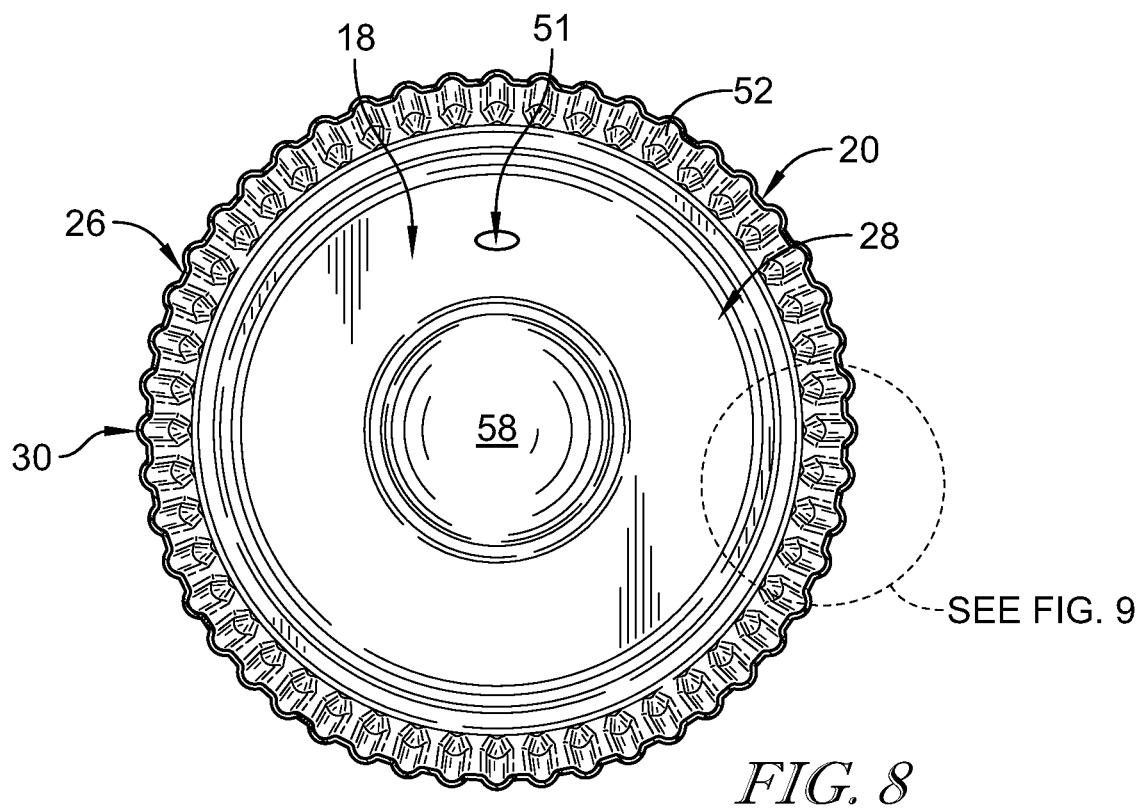
FIG. 8 is a sectional view taking along line 8-8 of FIG. 4 showing that the disc extends from the floor dome towards the side wall and that the frustoconical panel is formed to include a plurality of ribs that extend upwardly from the floor towards the stack shoulder.
Figure 9:
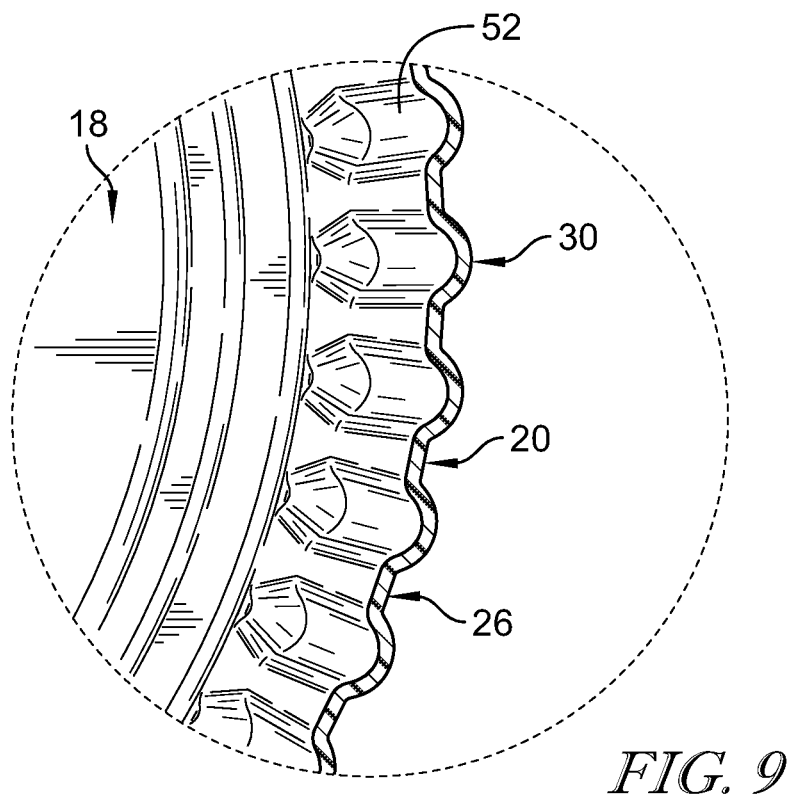
FIG. 9 is a detail view of the circled region of FIG. 8 showing that the ribs are generally semi-circular and circumferentially spaced apart from one another and that the frustoconical panel is formed to include a plurality of side wall segments extending between the ribs.
Figure 10:
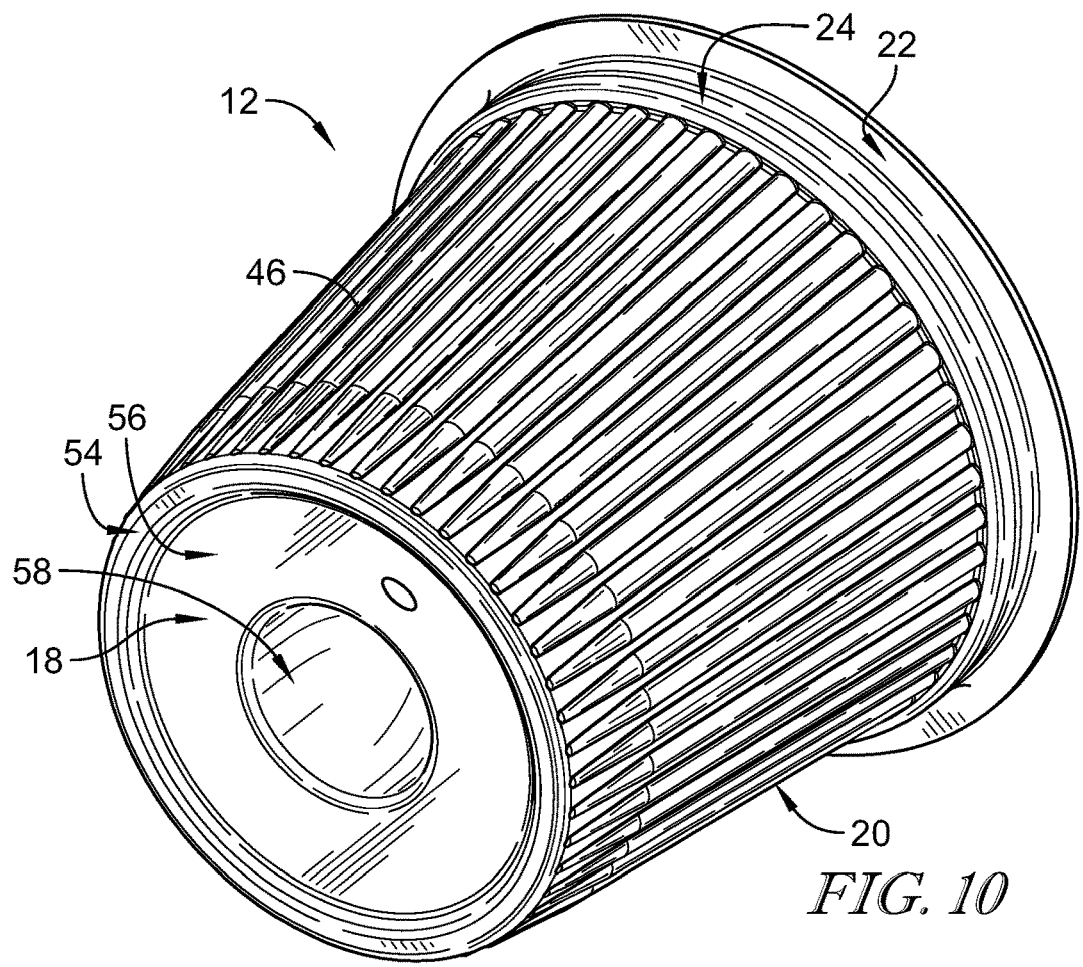
FIG. 10 is a perspective view of the cup of FIGS. 1-9 showing the floor coupled to the side wall and further showing the floor dome is arranged to extend into the interior product-storage region.
Figure 11:
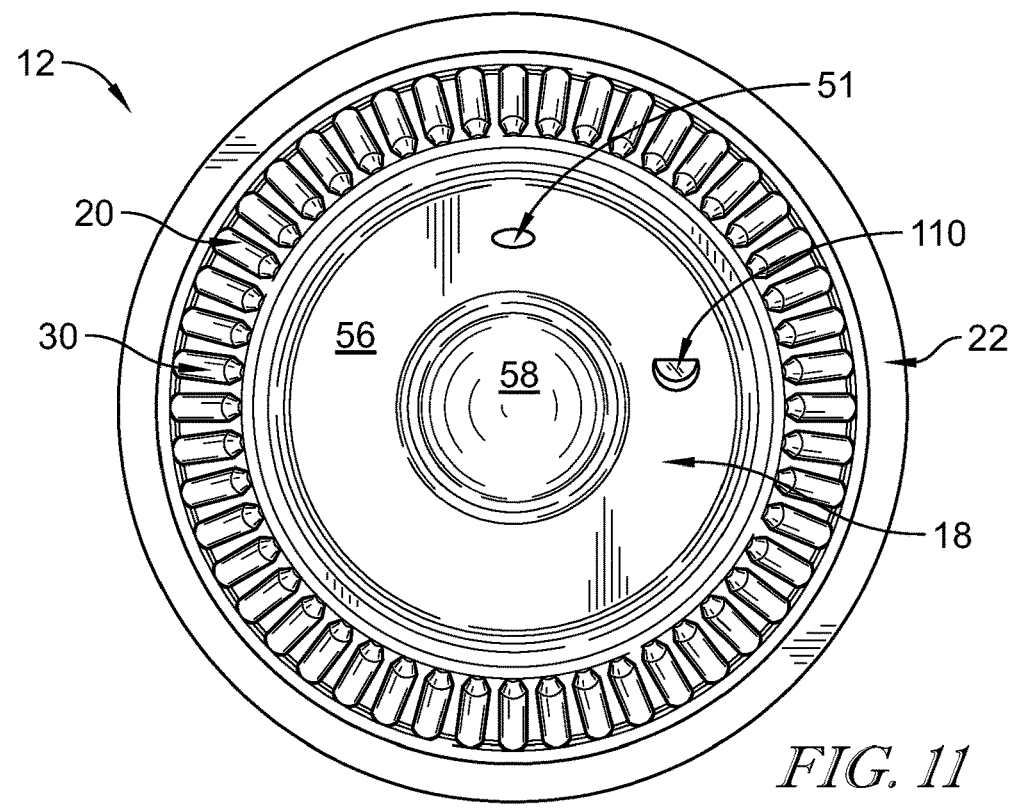
FIG. 11 is a bottom plan view of the cup of FIGS. 1-10 after the floor has been pierced by the outlet cannula and showing a cannula aperture formed in the disc of the floor.
Figure 12:
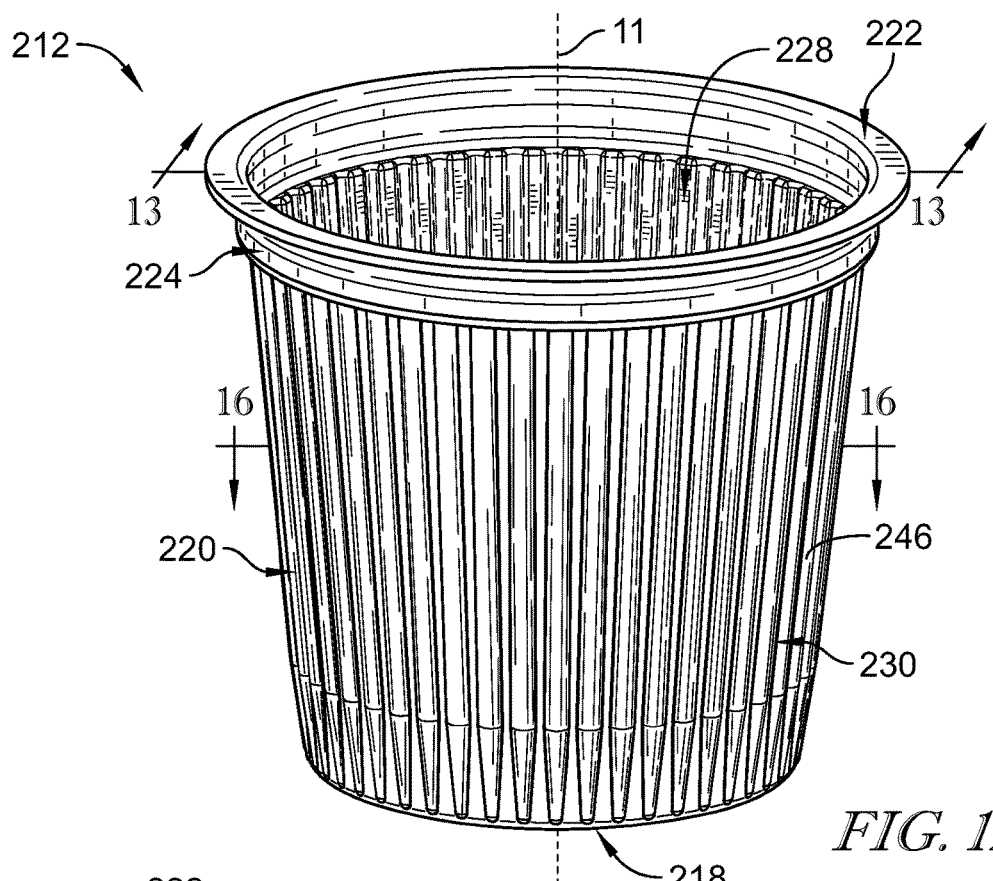
FIG. 12 is a perspective view of the second embodiment of a cup in accordance with the present disclosure showing that the cup includes a floor and a side wall extending up from the floor towards a brim to define an interior product-storage region.
Figure 13:
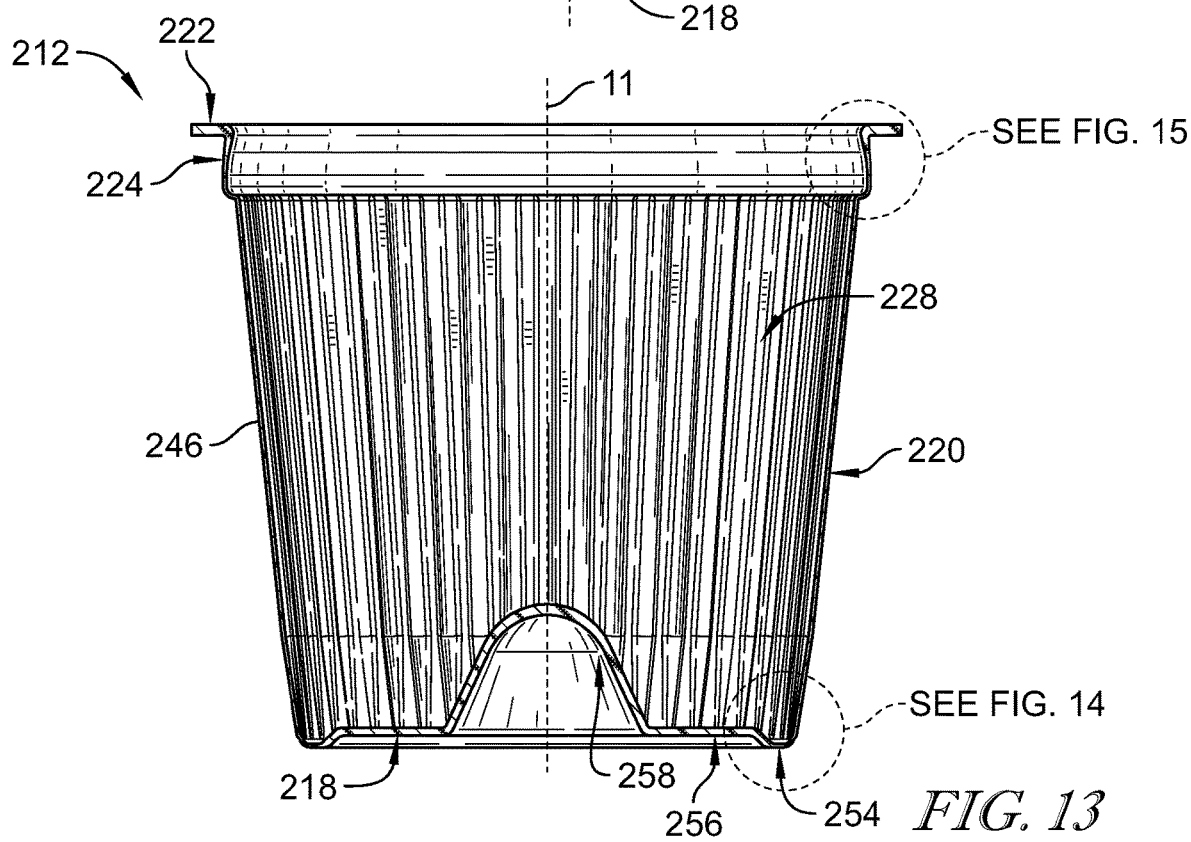
FIG. 13 is a sectional view taking along line 13-13 of FIG. 12 showing the floor includes a floor mount, a floor dome, and a disc extending radially outward from the floor dome to the floor mount.
Figure 14:
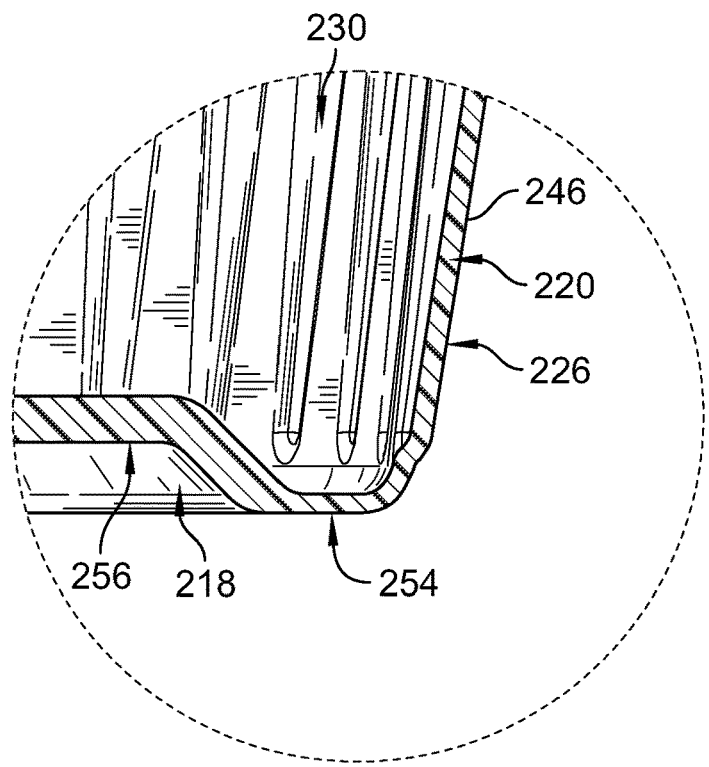
FIG. 14 is a detail view of a circled region of FIG. 13 showing the floor mount extending between the side wall and the disc of the floor.
Figure 15:
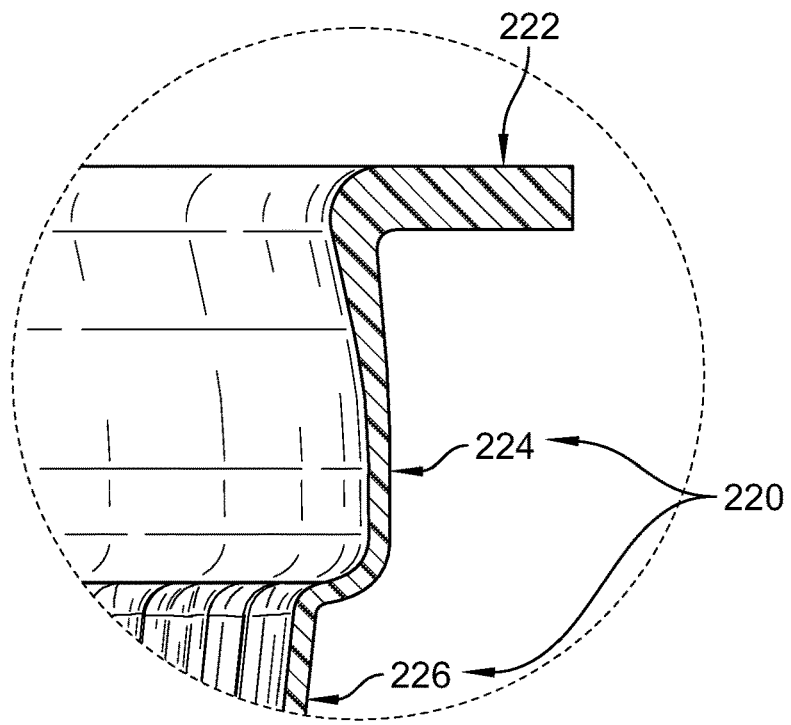
FIG. 15 is a detail view of a circled region of FIG. 13 showing the side wall is formed to include a stack shoulder and a frustoconical panel, and the stack shoulder extends between the frustoconical panel and the brim and further showing the brim extends radially outward from the stack shoulder to form an upward facing surface of the brim.

Brewing package 10, also called container 10, is configured to store, for example, coffee grinds 104 in a filter bag 15 retained in cup 12 as suggested in FIG. 2. A consumer may brew coffee 100 by placing brewing package 10 in a beverage maker 102 and exposing coffee grinds 104 stored in filter bag 15 to pressurized hot water discharged from hot water source 112 as suggested in FIG. 4. Brewing package 10 may also be used to brew tea by storing tea grinds in filter bag 15.

Cup 12 includes a floor 18, a side wall 20, and a brim 22. Side wall 20 extends upwardly from floor 18 as shown, for example, in FIGS. 1, 2, 4, and 5. Side wall 20 is formed to include a stack shoulder 24, a frustoconical panel 26 extending from floor 18 towards brim 22 to define an interior product-storage region 28, and a series of ribs 30 extending radially outward away from a central axis 11 of cup 12. Ribs 30 are formed in frustoconical panel 26 to provide additional stiffness, rigidity, and strength to side wall 20.

Floor 18 includes a floor mount 54, a disc 56, and a floor dome 58 as shown in FIGS. 1, 2, 4, 10 and 11. Floor mount 54 extends between and interconnects disc 56 with side wall 20. Disc 56 extends radially outward from floor dome 58 to couple with floor mount 54. Floor dome 58 extends radially outward from central axis 11 to couple to disc 56.

During a brewing operation, outlet cannula 108 applies a force generally vertically to disc 56 of floor 18 along central axis 11. Once sufficient force is reached, outlet cannula 108 forms cannula aperture 110 in disc 56. In some embodiments, multi-layer sheet 16 is configured to minimize fractures extending from cannula aperture 110. In some embodiments, multi-layer sheet 16 is configured to minimize failed punctures of disc 56 by outlet cannula 108.

Cup 12 is made, for example, by thermoforming multi-layer sheet 16 in accordance with the illustrative embodiments of the present disclosure to facilitate the positive formation of ribs 30, stack shoulder 24, and brim 22. Multi-layer sheet 16 comprises an outer-skin layer 32, an inner-skin layer 34, and a barrier layer 36 extending between and interconnecting outer-skin layer 32 and inner-skin layer 34 as shown in FIG. 3. During the thermoforming process, outer-skin layer 32 is arranged to face away from central axis 11 and interior product-storage region 28 and inner-skin layer 34 is arranged to face towards central axis 11 and interior product-storage region 28.

In an embodiment, multi-layer sheet 16 comprises a polypropylene, a polyethylene, or a mixture thereof. In some embodiments, multi-layer sheet 16 is substantially free of an aromatic polymer or material. Illustrative aromatic polymers or materials include, for example, polystyrene and polyethylene terephthalate.

In an embodiment, multi-layer sheet 16 is about 0.02 inches to about 0.08 inches thick. Multi-layer sheet 16 may be a particular thickness or fall within one of several different ranges. The thickness of multi-layer sheet 16 may be one of the following values: about 0.02 inches, about 0.03 inches, about 0.035 inches, about 0.04 inches, about 0.045 inches, about 0.05 inches, about 0.051 inches, about 0.052 inches, about 0.053 inches, about 0.054 inches, about 0.055 inches, about 0.056 inches, about 0.057 inches, about 0.058 inches, about 0.059 inches, about 0.06 inches, about 0.065 inches, about 0.07 inches, or about 0.08 inches thick. The thickness of multi-layer sheet 16 may fall within one of many different ranges. In a first set of ranges, the thickness of multi-layer sheet 16 is one of the following ranges: about 0.02 inches to about 0.08 inches, about 0.03 inches to about 0.08 inches, about 0.04 inches to about 0.08 inches, about 0.045 inches to about 0.08 inches, or about 0.05 inches to about 0.08 inches thick. In a second set of ranges, the thickness of multi-layer sheet 16 is one of the following ranges: about 0.02 inches to about 0.08 inches, about 0.02 inches to about 0.07 inches, about 0.02 inches to about 0.06 inches, about 0.02 inches to about 0.055 inches, or about 0.02 inches to about 0.05 inches thick. In a third set of ranges, the thickness of multi-layer sheet 16 is one of the following ranges: about 0.02 inches to about 0.08 inches, about 0.02 inches to about 0.07 inches, about 0.03 inches to about 0.07 inches, about 0.03 inches to about 0.06 inches, about 0.04 inches to about 0.06 inches, about 0.045 inches to about 0.06 inches, about 0.045 inches to about 0.055 inches, or about 0.045 inches to about 0.05 inches thick. In a fourth set of ranges, the thickness of multi-layer sheet 16 is one of the following ranges: about 0.05 inches to about 0.06 inches, about 0.051 inches to about 0.06 inches, about 0.052 inches to about 0.06 inches, about 0.053 inches to about 0.06 inches, about 0.054 inches to about 0.06 inches, or about 0.055 inches to about 0.06 inches.

In an embodiment, multi-layer sheet 16 has a density between 0.8 g/cm$^3$ and 1.1 g/cm$^3$. Multi-layer sheet 16 may be a particular density or fall within one of several different ranges. The density of multi-layer sheet 16 may be one of the following values: about 0.8 g/cm$^3$, about 0.85 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, about 0.96 g/cm$^3$, about 0.97 g/cm$^3$, about 0.98 g/cm$^3$, about 0.99 g/cm$^3$, about 1 g/cm$^3$, or about 1.1 g/cm$^3$. The density of multi-layer sheet 16 may fall within one of many different ranges. In a first set of ranges, the density of multi-layer sheet 16 is one of the following ranges: about 0.8 g/cm$^3$ to about 1.1 g/cm$^3$, about 0.9 g/cm$^3$ to about 1.1 g/cm$^3$, about 0.91 g/cm$^3$ to about 1.1 g/cm$^3$, about 0.92 g/cm$^3$ to about 1.1 g/cm$^3$, about 0.93 g/cm$^3$ to about 1.1 g/cm$^3$, about 0.93 g/cm$^3$ to about 1.1 g/cm$^3$, about 0.94 g/cm$^3$ to about 1.1 g/cm$^3$, about 0.95 g/cm$^3$ to about 1.1 g/cm$^3$, about 0.96 g/cm$^3$ to about 1.1 g/cm$^3$, about 0.97 g/cm$^3$ to about 1.1 g/cm$^3$, or about 0.98 g/cm$^3$ to about 1.1 g/cm$^3$. In a second set of ranges, the density of multi-layer sheet 16 is one of the following ranges: about 0.8 g/cm$^3$ to about 1.1 g/cm$^3$, about 0.8 g/cm$^3$ to about 1 g/cm$^3$, about 0.8 g/cm$^3$ to about 0.99 g/cm$^3$, about 0.8 g/cm$^3$ to about 0.98 g/cm$^3$, about 0.8 g/cm$^3$ to about 0.97 g/cm$^3$, about 0.8 g/cm$^3$ to about 0.96 g/cm$^3$, or about 0.8 g/cm$^3$ to about 0.95 g/cm$^3$. In a third set of ranges, the density of multi-layer sheet 16 is one of the following ranges: about 0.8 g/cm$^3$ to about 1.1 g/cm$^3$, about 0.8 g/cm$^3$ to about 1 g/cm$^3$, about 0.85 g/cm$^3$ to about 1 g/cm$^3$, about 0.9 g/cm$^3$ to about 1 g/cm$^3$, about 0.9 g/cm$^3$ to about 0.99 g/cm$^3$, about 0.9 g/cm$^3$ to about 0.98 g/cm$^3$, about 0.92 g/cm$^3$ to about 0.98 g/cm$^3$, about 0.93 g/cm$^3$ to about 0.98 g/cm$^3$, about 0.94 g/cm$^3$ to about 0.98 g/cm$^3$, or about 0.93 g/cm$^3$ to about 0.97 g/cm$^3$.

Outer-skin layer 32 includes a first sublayer 38, a second sublayer 40, a third sublayer 42, and a first-compatibility layer 44 as shown in FIG. 3. First sublayer 38 is arranged to form an outer surface 46 of multi-layer sheet 16. Second sublayer 40 extends between and interconnects first sublayer 38 with third sublayer 42. Third sublayer 42 extends between and interconnects second sublayer 40 with first-compatibility layer 44. First-compatibility layer 44 extends between and interconnects third sublayer 42 with barrier layer 36.

Inner-skin layer 34 includes a second-compatibility layer 48 and a fourth sublayer 50 as shown in FIG. 3. Second-compatibility layer 48 extends between and interconnects barrier layer 36 with fourth sublayer 50. Fourth sublayer 50 is arranged to form an inner surface 52 of multi-layer sheet 16.

Multi-layer sheet 16 is, for example, a co-extruded sheet in which first sublayer 38, second sublayer 40, third sublayer 42, first-compatibility layer 44, barrier layer 36, second-compatibility layer 48, and fourth sublayer 50 each comprise a composition. In one aspect, each composition may be formed by an extrusion process of a formulation.

Illustratively, each formulation of first sublayer 38, second sublayer 40, third sublayer 42, first-compatibility layer 44, barrier layer 36, second-compatibility layer 48, and fourth sublayer 50 may be added to a hopper on an extrusion machine and heated to produce a molten material in an extruder. The molten material of each of first sublayer 38, second sublayer 40, third sublayer 42, first-compatibility layer 44, barrier layer 36, second-compatibility layer 48, and fourth sublayer 50 may be co-extruded to produce multi-layer sheet 16.

The composition of each of first sublayer 38, second sublayer 40, third sublayer 42, first-compatibility layer 44, barrier layer 36, second-compatibility layer 48, and fourth sublayer 50 may comprise, for example, a plastic polymer, a material, or a resin, and may optionally include one or more additives. Examples of plastic polymers, resins, or materials suitable for multi-layer sheet 16 include high-density polyethylene (HDPE), low-density polyethylene (LDPE), and polypropylene (PP). In some aspects, the plastic polymer, material, or resin may be called a base resin.

In one aspect, the polypropylene may be a polypropylene homopolymer, a polypropylene copolymer (PP-CoP), an impact polypropylene, a polypropylene impact copolymer, or combinations thereof. In some embodiments, the polypropylene may contain an additive. In some examples, a polypropylene impact copolymer is a copolymer of ethylene and propylene. In some examples, a polypropylene impact copolymer is a heterophasic in-situ blend containing an ethylene/propylene rubber component. In some examples, a polypropylene impact copolymer comprises a rubber phase and a polypropylene matrix phase. In some embodiments, a polypropylene impact copolymer may be produced with a Ziegler-Natta catalyst. In some embodiments, a polypropylene impact copolymer is a semi-crystalline thermoplastic resin. In some examples, the polypropylene impact copolymer comprises a nucleating agent.

In some aspects, the composition of each of first sublayer 38, second sublayer 40, third sublayer 42, first-compatibility layer 44, barrier layer 36, second-compatibility layer 48, and fourth sublayer 50 comprises a process aid. Process aids may reduce friction between the melt and metal surfaces during an extrusion process. Process aids may comprise a fluoropolymer, a tetrafluoroethylene, combinations thereof, or any other suitable alternative. In some embodiments, process aids are provided as masterbatches that comprise a carrier resin. In some embodiments, a carrier resin is a polyolefin such as an LLDPE. In some embodiments, process additives, such as slip agents and antiblock agents, may be added to the formulations to improve the extrusion process and provide advantageous properties of multi-layer sheet 16. Colorants in the form of masterbatches may also be added to each formulation.

In some aspects, the composition of each of first sublayer 38, second sublayer 40, third sublayer 42, first-compatibility layer 44, barrier layer 36, second-compatibility layer 48, and fourth sublayer 50 comprises a mineral filler. Mineral fillers include calcium carbonate ($CaCO_3$), dolomite, barium sulfate (BaSO$_4$), talc, wollastonite, mica, kaolin, combinations thereof, or any other suitable alternative.

In some aspects, the composition of each of first sublayer 38, second sublayer 40, third sublayer 42, first-compatibility layer 44, barrier layer 36, second-compatibility layer 48, and fourth sublayer 50 comprises a compatibilizer. In some aspects, compatibilizers improve the properties of a regrind of multi-layer sheet 16. In some aspects, compatibilizers improve the dispersion of a regrind in a molten material. In some aspects, compatibilizers may also improve the thermal stability of the extruded materials. Compatibilizers include GF-30 available from EVAL® or any other suitable alternative.

In some aspects, the compositions of each of first sublayer 38, second sublayer 40, third sublayer 42, first-compatibility layer 44, barrier layer 36, second-compatibility layer 48, and fourth sublayer 50 comprises an adhesive. In some aspects, adhesives comprise a modified polyolefin. In some aspects, the polyolefin may be a polyethylene or a polypropylene. In some aspects, the polyolefin may be modified by an anhydride. Adhesives include Mitsui ADMER® QF551A or any other suitable alternative.

In some aspects, the composition of each of first sublayer 38, second sublayer 40, third sublayer 42, first-compatibility layer 44, barrier layer 36, second-compatibility layer 48, and fourth sublayer 50 comprises a gas barrier. Gas barriers include ethylene-vinyl alcohol copolymers (EVOH), polyvinyl alcohols (PVA), combinations thereof, or any other suitable alternative. In another aspect, barrier additives may be added to non-barrier materials to form a gas barrier. Barrier materials include oxygen scavengers, nanomaterials, combinations thereof, or any other suitable alternative. Barrier materials include polyethylene terephthalate (PET), polyamides, combinations thereof, or any other suitable alternative. Nanomaterials include nanoclays, montmorillonite, modified montmorillonite clays, combinations thereof, or any other suitable alternative.

In some embodiments, the composition of each of first sublayer 38, second sublayer 40, third sublayer 42, first-compatibility layer 44, barrier layer 36, second-compatibility layer 48, and fourth sublayer 50 comprises a regrind. In one aspect, a regrind is formed by recovering unused material from the thermoforming process of cup 12 and processing to produce a homogenous material. In some aspects, a regrind is formed by recovering other plastic materials and processing to produce a homogenous material. In another aspect, a regrind is formed by recycling cups 12.

First sublayer 38 of multi-layer sheet 16 is arranged to form outer surface 46 of cup 12 as shown in FIGS. 1 and 3. In an embodiment, first sublayer 38 is about 10% to about 40% of the total thickness multi-layer sheet 16. First sublayer 38 may be one of several different percentages of thickness of multi-layer sheet 16 or fall within one of several different ranges. The percentage thickness of first sublayer 38 of multi-layer sheet 16 may be one of the following values: about 10%, about 15%, about 16%, about 17%, about 18%, about 19%, about 20%, about 21%, about 22%, about 23%, about 24%, about 25%, about 30%, about 35%, or about 40% of the total thickness of multi-layer sheet 16. The percentage thickness of first sublayer 38 of multi-layer sheet 16 may fall within one of many different ranges. In a set of ranges, the thickness range of first sublayer 38 is one of the following ranges: about 10% to about 40%, about 10% to about 35%, about 10% to about 30%, about 15% to about 30%, or about 15% to about 25% of the total thickness of multi-layer sheet 16. In an embodiment, first sublayer 38 is about 20% of the total thickness of multi-layer sheet 16.

First sublayer 38 may be a particular thickness or fall within one of several different ranges. The thickness of first sublayer 38 may be one of the following values: about 0.005 inches, about 0.006 inches, about 0.007 inches, about 0.008 inches, about 0.009 inches, about 0.01 inches, about 0.011 inches, about 0.012 inches, about 0.013 inches, about 0.014 inches, or about 0.015 inches thick. The thickness of first sublayer 38 may fall within one of many different ranges. In a set of ranges, the thickness of first sublayer 38 is one of the following ranges: about 0.005 inches to about 0.015 inches, about 0.006 inches to about 0.015 inches, about 0.007 inches to about 0.015 inches, about 0.008 inches to about 0.015 inches, about 0.008 inches to about 0.012 inches, about 0.009 inches to about 0.012 inches, or about 0.009 inches to about 0.011 inches thick.

In some embodiments, the composition of first sublayer 38 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205,000 psi as measured by ASTMD790A. In some examples, the polypropylene impact copolymer is Braskem PP TI4040WT. In some embodiments, the polypropylene impact copolymer has a flexural modulus-1% secant of about 230,000 psi as measured by ASTMD790A. In some embodiments, the polypropylene impact copolymer has a flexural modulus-1% secant of about 195,000 psi as measured by ASTMD790A. In some embodiments, the polypropylene impact copolymer is ExxonMobil™ PP7032KN.

The composition of first sublayer 38 may comprise one of several different percentages of a polyolefin or fall within one of several different ranges. The percentage by weight amount of the polyolefin may be selected from the following values: about 85%, about 88%, about 89%, about 90%, about 90.5%, about 91%, about 91.1%, about 91.2%, about 91.3%, about 91.4%, about 91.5%, about 92%, about 92.5%, about 92.9%, about 93%, about 93.2%, about 93.3%, about 93.5%, about 94%, or about 95% by weight of the composition of first sublayer 38. The amount of the polyolefin may fall within a series of ranges including about 85% to about 95%, about 88% to about 95%, about 88% to about 94%, about 89% to about 94%, or about 89% to about 93.5% by weight of the composition of first sublayer 38. The various values and ranges described here are also applicable if the polyolefin is a polypropylene. The various values and ranges described here are also applicable if the polyolefin is a polypropylene impact copolymer.

In one example, the composition of first sublayer 38 comprises about 91.3% by weight of the composition a polypropylene impact copolymer. In another example, the composition of first sublayer 38 comprises about 92.9% by weight of the composition a polypropylene impact copolymer. In another example, the composition of first sublayer 38 comprises about 93.3% by weight of the composition a polypropylene impact copolymer.

In some embodiments, the composition of first sublayer 38 comprises a mineral filler. In some embodiments, the mineral filler comprises talc. In some embodiments, the mineral filler comprises $CaCO_3$. In some embodiments, the mineral filler further comprises a carrier resin. In some embodiments, the carrier resin is a polyolefin. In some embodiments, the polypropylene is a polypropylene copolymer. In some embodiments, the polyolefin is LLDPE. In some examples, the mineral filler is Heritage Plastics Heritage HT6HP. In some examples, the mineral filler is Heritage Plastics Heritage HT6P. In some other examples, the mineral filler is Heritage Plastics HM10®MAX. In some examples, the mineral filler is Heritage Plastics HiCal™ LC.

The composition of first sublayer 38 may comprise one of several different percentages of a mineral filler or fall within one of several different ranges. The percentage by weight amount of the mineral filler may be selected from the following values: about 1%, about 1.5%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.5%, about 4%, or about 5% by weight of the composition of first sublayer 38. The amount of the mineral filler may fall within a series of ranges including about 1% to about 5%, about 1% to about 4%, about 1.5% to about 4%, about 1.5% to about 3.5%, or about 2% to about 3.5% by weight of the composition of first sublayer 38. The various values and ranges described here are also applicable if the mineral filler comprises talc. The various values and ranges described here are also applicable if the mineral filler comprises $CaCO_3$.

In one example, the composition of first sublayer 38 comprises about 2.7% by weight of the composition a mineral filler comprising talc. In one example, the composition of first sublayer 38 comprises about 2.7% by weight of the composition a mineral filler comprising $CaCO_3$. In another example, the composition of first sublayer 38 comprises about 3.1% by weight of the composition a mineral filler comprising $CaCO_3$.

In some embodiments, first sublayer 38 comprises a colorant. In some embodiments, the colorant is available as a masterbatch. In some embodiments, the masterbatch comprises a carrier resin. In some embodiments, the carrier resin is a polyolefin. In some embodiments, the polyolefin of the carrier resin is LLDPE. In some examples, the colorant is Ampacet 192434 Kosher FDA Black PE MB. In some examples, the colorant is Ampacet 112761 White PE MB.

The composition of first sublayer 38 may comprise one of several different percentages of colorant or fall within one of several different ranges. The percentage by weight amount of the colorant may be selected from the following values: about 1%, about 2%, about 3%, about 4%, about 5%, about 6%, about 7%, about 8%, about 9%, or about 10% by weight of the composition of first sublayer 38. The amount of the colorant may fall within a series of ranges including about 1% to about 10%, about 2% to about 10%, about 2% to about 8%, about 3% to about 8%, or about 3% to about 6% by weight of the composition of first sublayer 38. The various values and ranges described here are also applicable if the colorant is Ampacet 192434 Kosher FDA Black PE MB. The various values and ranges described here are also applicable if the colorant is Ampacet 112761 White PE MB. In some examples, first sublayer 38 comprises about 5% by weight a colorant. In some other examples, first sublayer 38 comprises about 3% by weight a colorant.

In some embodiments, first sublayer 38 comprises a process aid. In some embodiments, the process aid comprises a fluoropolymer. In some embodiments, the process aid is available as a masterbatch and further comprises a carrier resin. In some embodiments, the carrier resin of the masterbatch is a polyolefin. In some embodiments, the polyolefin of the masterbatch is LLDPE. In some examples, the process aid is Ampacet 100458 Process Aid PE MB.

The composition of first sublayer 38 may comprise one of several different percentages of process aid or fall within one of several different ranges. The percentage by weight amount of the process aid may be selected from the following values: about 0.5%, about 0.6%, about 0.7%, about 0.8%, about 0.9%, about 1%, about 1.1%, about 1.2%, about 1.3%, about 1.4%, or about 1.5% by weight of the composition of first sublayer 38. The amount of the process aid may fall within a series of ranges including about 0.5% to about 1.5%, about 0.6% to about 1.5%, about 0.8% to about 1.5%, about 0.8% to about 1.3%, or about 0.8% to about 1.2% by weight of the composition of first sublayer 38. The various values and ranges described here are also applicable if the process aid is Ampacet 100458 Process Aid PE MB. In some examples, first sublayer 38 comprises about 1% by weight a process aid.

Second sublayer 40 of multi-layer sheet 16 is arranged to extend between and interconnect first sublayer 38 with third sublayer 42. In an embodiment, second sublayer 40 is about 40% to about 80% of the total thickness multi-layer sheet 16. Second sublayer 40 may be one of several different percentages of thickness of multi-layer sheet 16 or fall within one of several different ranges. The percentage thickness of second sublayer 40 of multi-layer sheet 16 may be one of the following values: about 40%, about 45%, about 50%, about 55%, about 57%, about 58%, about 59%, about 60%, about 61%, about 62%, about 63%, about 64%, about 65%, about 66%, about 70%, about 75%, or about 80% of the total thickness of multi-layer sheet 16. The percentage thickness of second sublayer 40 of multi-layer sheet 16 may fall within one of many different ranges. In a set of ranges, the thickness range of second sublayer 40 is one of the following ranges: about 40% to about 80%, about 45% to about 80%, about 50% to about 80%, about 50% to about 70%, or about 55% to about 70% of the total thickness of multi-layer sheet 16. In an embodiment, second sublayer 40 is about 63% of the total thickness of multi-layer sheet 16.

Second sublayer 40 may be a particular thickness or fall within one of several different ranges. The thickness of second sublayer 40 may be one of the following values: about 0.028 inches, about 0.029 inches, about 0.03 inches, about 0.031 inches, about 0.0311 inches, about 0.0312 inches, about 0.0313 inches, about 0.0314 inches, about 0.0315 inches, about 0.0316 inches, about 0.0317 inches, about 0.0318 inches, about 0.032 inches, or about 0.033 inches thick. The thickness of second sublayer 40 may fall within one of many different ranges. In a set of ranges, the thickness of second sublayer 40 is one of the following ranges: about 0.028 inches to about 0.033 inches, about 0.03 inches to about 0.033 inches, about 0.03 inches to about 0.032 inches, or about 0.031 inches to about 0.032 inches thick.

In some embodiments, the composition of second sublayer 40 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205,000 psi as measured by ASTMD790A. In some examples, the polypropylene impact copolymer is Braskem PP TI4040WT.

The composition of second sublayer 40 may comprise one of several different percentages of a polyolefin or fall within one of several different ranges. The percentage by weight amount of the polyolefin may be selected from the following values: about 5%, about 6%, about 7%, about 8%, about 9%, about 10%, about 11%, about 12%, about 13%, about 14%, about 15%, about 20%, or about 25% by weight of the composition of second sublayer 40. The amount of the polyolefin may fall within a series of ranges including about 5% to about 25%, about 5% to about 20%, about 9% to about 20%, about 9% to about 14%, or about 10% to about 14% by weight of the composition of second sublayer 40. The various values and ranges described here are also applicable if the polyolefin is a polypropylene. The various values and ranges described here are also applicable if the polyolefin is a polypropylene impact copolymer. In one example, the composition of second sublayer 40 comprises about 12% by weight of the composition a polypropylene impact copolymer.

The composition of second sublayer 40 may comprise one of several different percentages of a regrind or fall within one of several different ranges. The percentage by weight amount of the regrind may be selected from the following values: about 50%, about 55%, about 60%, about 65%, about 70%, about 75%, about 80%, about 85%, about 90% or about 95% by weight of the composition of second sublayer 40. The amount of the regrind may fall within a series of ranges including about 50% to about 95%, about 60% to about 95%, about 70% to about 95%, about 70% to about 90%, or about 75% to about 90% by weight of the composition of second sublayer 40. In some of the examples, second sublayer 40 comprises about 85% by weight of the composition a regrind.

In some embodiments, second sublayer 40 comprises a compatibilizer. In some embodiments, the compatibilizer comprises polyethylene. In some examples, the compatibilizer is EVAL® AMERICAS GF-30.

The composition of second sublayer 40 may comprise one of several different percentages of compatibilizer or fall within one of several different ranges. The percentage by weight amount of the compatibilizer may be selected from the following values: about 1%, about 2%, about 2.5%, about 3%, about 3.5%, about 4%, about 5%, or about 6% by weight of the composition of second sublayer 40. The amount of the compatibilizer may fall within a series of ranges including about 1% to about 6%, about 1% to about 5%, about 2% to about 5%, or about 2% to about 4%. The various values and ranges described here are also applicable if the compatibilizer is EVAL® AMERICAS GF-30. In some examples, second sublayer 40 comprises about 3% by weight a compatibilizer.

Third sublayer 42 of multi-layer sheet 16 is arranged to extend between and interconnect second sublayer 40 with first-compatibility layer 44. In an embodiment, third sublayer 42 is about 1% to about 3% of the total thickness multi-layer sheet 16. Third sublayer 42 may be one of several different percentages of the thickness of multi-layer sheet 16 or fall within one of several different ranges. The percentage thickness of third sublayer 42 of multi-layer sheet 16 may be one of the following values: about 1%, about 1.2%, about 1.3%, about 1.4%, about 1.5%, about 1.6%, about 1.7%, about 1.8%, about 1.9%, about 2%, about 2.1%, about 2.2%, about 2.3%, about 2.4%, about 2.5%, or about 3% of the total thickness of multi-layer sheet 16. The percentage thickness of third sublayer 42 of multi-layer sheet 16 may fall within one of many different ranges. In a set of ranges, the thickness range of third sublayer 42 is one of the following ranges: about 1% to about 3%, about 1.2% to about 3%, about 1.5% to about 3%, about 1.5% to about 2.5%, or about 1.5% to about 2.2% of the total thickness of multi-layer sheet 16. In an embodiment, third sublayer 42 is about 2% of the total thickness of multi-layer sheet 16.

Third sublayer 42 may be a particular thickness or fall within one of several different ranges. The thickness of third sublayer 42 may be one of the following values: about 0.0005 inches, about 0.0006 inches, about 0.0007 inches, about 0.0008 inches, about 0.0009 inches, about 0.001 inches, about 0.0011 inches, about 0.0012 inches, about 0.0013 inches, about 0.0015 inches, or about 0.002 inches thick. The thickness of third sublayer 42 may fall within one of many different ranges. In a set of ranges, the thickness of third sublayer 42 is one of the following ranges: about 0.0005 inches to about 0.002 inches, about 0.0005 inches to about 0.0015 inches, about 0.0008 inches to about 0.0015 inches, or about 0.0008 inches to about 0.0013 inches thick.

In some embodiments, the composition of third sublayer 42 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205000 psi as measured by ASTMD790A. In some examples, the polypropylene impact copolymer is Braskem PP TI4040WT.

The composition of third sublayer 42 may comprise one of several different percentages of a polyolefin or fall within one of several different ranges. The percentage by weight amount of the polyolefin may be selected from the following values: about 90%, about 91%, about 92%, about 93%, about 94%, about 95%, about 95.5%, about 95.7%, about 95.9%, about 96%, about 96.1%, about 96.2%, about 96.3%, about 96.5%, about 97%, or about 98% by weight of the composition of third sublayer 42. The amount of the polyolefin may fall within a series of ranges including about 90% to about 98%, about 92% to about 98%, about 93% to about 98%, about 94% to about 98%, or about 94% to about 97% by weight of the composition of third sublayer 42. The various values and ranges described here are also applicable if the polyolefin is a polypropylene. The various values and ranges described here are also applicable if the polyolefin is a polypropylene impact copolymer.

In one example, the composition of third sublayer 42 comprises about 96.3% by weight of the composition a polypropylene impact copolymer. In another example, the composition of third sublayer 42 comprises about 95.9% by weight of the composition a polypropylene impact copolymer.

In some embodiments, the composition of third sublayer 42 comprises a mineral filler. In some embodiments, the mineral filler comprises talc. In some embodiments, the mineral filler comprises $CaCO_3$. In some embodiments, the mineral filler further comprises a carrier resin. In some embodiments, the carrier resin of the mineral filler is a polyolefin. In some embodiments, the carrier resin of the mineral filler is a polypropylene homopolymer. In some embodiments, the polyolefin of the mineral filler is a polypropylene copolymer. In some embodiments, the polyolefin is LLDPE. In some examples, the mineral filler is Heritage Plastics Heritage HT6HP. In some embodiments, the polyolefin is LLDPE. In some examples, the mineral filler is Heritage Plastics Heritage HT6P. In some other examples, the mineral filler is Heritage Plastics HM10®MAX.

The composition of third sublayer 42 may comprise one of several different percentages of a mineral filler or fall within one of several different ranges. The percentage by weight amount of the mineral filler may be selected from the following values: about 1%, about 1.5%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.5%, about 4%, or about 5% by weight of the composition of third sublayer 42. The amount of the mineral filler may fall within a series of ranges including about 1% to about 5%, about 1% to about 4%, about 1.5% to about 4%, about 1.5% to about 3.5%, or about 2% to about 3.5% by weight of the composition of third sublayer 42. The various values and ranges described here are also applicable if the mineral filler comprises talc. The various values and ranges described here are also applicable if the mineral filler comprises $CaCO_3$.

In one example, the composition of third sublayer 42 comprises about 2.7% by weight of the composition a mineral filler comprising talc. In one example, the composition of third sublayer 42 comprises about 2.7% by weight of the composition a mineral filler comprising $CaCO_3$. In another example, the composition of third sublayer 42 comprises about 3.1% by weight of the composition a mineral filler comprising $CaCO_3$.

In some embodiments, third sublayer 42 comprises a process aid. In some embodiments, the process aid comprises a fluoropolymer. In some embodiments, the process aid is available as a masterbatch and further comprises a carrier resin. In some embodiments, the carrier resin of the process aid is a polyolefin. In some embodiments, the polyolefin of the process aid is LLDPE. In some examples, the process aid is Ampacet 100458 Process Aid PE MB.

The composition of third sublayer 42 may comprise one of several different percentages of process aid or fall within one of several different ranges. The percentage by weight amount of the process aid may be selected from the following values: about 0.5%, about 0.6%, about 0.7%, about 0.8%, about 0.9%, about 1%, about 1.1%, about 1.2%, about 1.3%, about 1.4%, or about 1.5% by weight of the composition of third sublayer 42. The amount of the process aid may fall within a series of ranges including about 0.5% to about 1.5%, about 0.6% to about 1.5%, about 0.8% to about 1.5%, about 0.8% to about 1.3%, or about 0.8% to about 1.2% by weight of the composition of third sublayer 42. The various values and ranges described here are also applicable if the process aid is Ampacet 100458 Process Aid PE MB. In some examples, third sublayer 42 comprises about 1% by weight a process aid.

In some embodiments, first-compatibility layer 44 and second-compatibility layer 48 may be about the same thickness. In an embodiment, each of first-compatibility layer 44 and second-compatibility layer 48 is about 0.05% to about 2% of the total thickness multi-layer sheet 16. Each of first-compatibility layer 44 and second-compatibility layer 48 may be one of several different percentages of the thickness of multi-layer sheet 16 or fall within one of several different ranges. The percentage thickness of each of first-compatibility layer 44 and second-compatibility layer 48 of multi-layer sheet 16 may be one of the following values: about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% of the total thickness of multi-layer sheet 16. The percentage thickness of each of first-compatibility layer 44 and second-compatibility layer 48 of multi-layer sheet 16 may fall within one of many different ranges. In a set of ranges, the thickness range of each of first-compatibility layer 44 and second-compatibility layer 48 is one of the following ranges: about 0.5% to about 2%, about 0.5% to about 1.5%, about 0.7% to about 1.5%, about 0.7% to about 1.3%, or about 0.7% to about 1.2% of the total thickness of multi-layer sheet 16. In an embodiment, each of first-compatibility layer 44 and second-compatibility layer 48 is about 1% of the total thickness of multi-layer sheet 16.

Each of first-compatibility layer 44 and second-compatibility layer 48 may be a particular thickness or fall within one of several different ranges. The thickness of each of first-compatibility layer 44 and second-compatibility layer 48 may be one of the following values: about 0.0001 inches, about 0.0002 inches, about 0.0003 inches, about 0.0004 inches, about 0.0005 inches, about 0.0006 inches, about 0.0007 inches, about 0.0008 inches, about 0.0009 inches, about 0.001 inches thick. The thickness of each of first-compatibility layer 44 and second-compatibility layer 48 may fall within one of many different ranges. In a set of ranges, the thickness of each of first-compatibility layer 44 and second-compatibility layer 48 is one of the following ranges: about 0.0001 inches to about 0.001 inches, about 0.0002 inches to about 0.001 inches, about 0.0003 inches to about 0.001 inches, or about 0.0003 inches to about 0.0008 inches thick.

In some embodiments, each of first-compatibility layer 44 and second-compatibility layer 48 comprises an adhesive. In some embodiments, the adhesive comprises a polyolefin. In some embodiments, the polyolefin of the adhesive comprises a polypropylene. In some embodiments, the polypropylene of the adhesive is modified with a functional group. In some embodiments, the functional group is an anhydride. In some embodiments, the adhesive comprises a polypropylene modified with an anhydride. In some examples, the adhesive is Mitsui ADMER™ QF551A. In some embodiments, each of first-compatibility layer 44 and second-compatibility layer 48 comprises up to 100% by weight an adhesive.

In an embodiment, barrier layer 36 extends between and interconnects outer-skin layer 32 and inner-skin layer 34 as shown in FIG. 3. In some embodiments, barrier layer 36 extends between and interconnects first-compatibility layer 44 and second-compatibility layer 48 as shown in FIG. 3. In an embodiment, barrier layer 36 is about 1% to about 5% of the total thickness multi-layer sheet 16. Barrier layer 36 may be one of several different percentages of thickness of multi-layer sheet 16 or fall within one of several different ranges. The percentage thickness of barrier layer 36 of multi-layer sheet 16 may be one of the following values: about 1%, about 2%, about 3%, about 4%, or about 5% of the total thickness of multi-layer sheet 16. The percentage thickness of barrier layer 36 of multi-layer sheet 16 may fall within one of many different ranges. In a set of ranges, the thickness range of barrier layer 36 is one of the following ranges: about 1% to about 5%, about 1% to about 4%, or about 2% to about 4% of the total thickness of multi-layer sheet 16. In an embodiment, barrier layer 36 is about 3% of the total thickness of multi-layer sheet 16.

Barrier layer 36 may be a particular thickness or fall within one of several different ranges. The thickness of barrier layer 36 may be one of the following values: about 0.001 inches, about 0.0011 inches, about 0.0012 inches, about 0.0013 inches about 0.0014 inches, about 0.0015 inches, about 0.0016 inches, about 0.0017 inches, about 0.0018 inches, about 0.0019 inches or about 0.002 inches thick. The thickness of barrier layer 36 may fall within one of many different ranges. In a set of ranges, the thickness of barrier layer 36 is one of the following ranges: about 0.001 inches to about 0.002 inches, about 0.0012 inches to about 0.002 inches, about 0.0012 inches to about 0.0018 inches, or about 0.0013 inches to about 0.0017 inches thick.

In some embodiments, barrier layer 36 comprises a barrier material. In some embodiments, the barrier material comprises a polyolefin. In some embodiments, the barrier layer is a gas barrier layer. In some embodiments, the polyolefin of barrier layer 36 is a polyethylene. In some embodiments, the polyethylene of barrier layer 36 is a polyethylene copolymer. In some embodiments, the polyolefin of barrier layer 36 is an EVOH copolymer. In some examples, the EVOH copolymer is EVAL™ LT171B. In some embodiments, the composition of barrier layer 36 comprises up to 100% by weight a barrier material.

Fourth sublayer 50 of multi-layer sheet 16 is arranged to form inner surface 52 of cup 12 as shown in FIGS. 1 and 3. In an embodiment, fourth sublayer 50 is about 5% to about 20% of the total thickness multi-layer sheet 16. Fourth sublayer 50 may be one of several different percentages of the thickness of multi-layer sheet 16 or fall within one of several different ranges. The percentage thickness of fourth sublayer 50 of multi-layer sheet 16 may be one of the following values: about 5%, about 6%, about 7%, about 8%, about 9%, about 10%, about 11%, about 12%, about 13%, about 14%, about 15%, or about 20% of the total thickness of multi-layer sheet 16. The percentage thickness of fourth sublayer 50 of multi-layer sheet 16 may fall within one of many different ranges. In a set of ranges, the thickness range of fourth sublayer 50 is one of the following ranges: about 5% to about 20%, about 5% to about 15%, about 7% to about 15%, about 7% to about 13%, or about 8% to about 13% of the total thickness of multi-layer sheet 16. In an embodiment, fourth sublayer 50 is about 10% of the total thickness of multi-layer sheet 16.

Fourth sublayer 50 may be a particular thickness or fall within one of several different ranges. The thickness of fourth sublayer 50 may be one of the following values: about 0.001 inches, about 0.002 inches, about 0.003 inches, about 0.004 inches, about 0.005 inches, about 0.006 inches, about 0.007 inches, about 0.008 inches, about 0.009 inches, or about 0.01 inches thick. The thickness of fourth sublayer 50 may fall within one of many different ranges. In a set of ranges, the thickness of fourth sublayer 50 is one of the following ranges: about 0.001 inches to about 0.01 inches, about 0.002 inches to about 0.01 inches, about 0.002 inches to about 0.008 inches, or about 0.003 inches to about 0.008 inches thick.

In some embodiments, the composition of fourth sublayer 50 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205000 psi as measured by ASTMD790A. In some examples, the polypropylene impact copolymer is Braskem PP TI4040WT. In some embodiments, fourth sublayer 50 comprises a blend of at least two polyolefins. In some embodiments, fourth sublayer 50 comprises a blend of a first polypropylene impact copolymer and a second polypropylene impact copolymer.

The composition of fourth sublayer 50 may comprise one of several different percentages of a polyolefin or fall within one of several different ranges. The percentage by weight amount of the polyolefin may be selected from the following values: about 92%, about 93%, about 94%, about 95%, about 96%, about 96.5%, about 96.9%, about 97%, about 98%, about 99%, or about 99.5% by weight of the composition of fourth sublayer 50. The amount of the polyolefin may fall within a series of ranges including about 92% to about 99.5%, about 93% to about 99.5%, about 93% to about 99%, about 94% to about 99%, or about 94% to about 97% by weight of the composition of fourth sublayer 50. The various values and ranges described here are also applicable if the polyolefin is a polypropylene. The various values and ranges described here are also applicable if the polyolefin is a polypropylene impact copolymer.

In one example, the composition of fourth sublayer 50 comprises about 96.3% by weight of the composition a polypropylene impact copolymer. In another example, the composition of fourth sublayer 50 comprises about 99% by weight of the composition a polypropylene impact copolymer.

In some embodiments, the composition of fourth sublayer 50 comprises a mineral filler. In some embodiments, the mineral filler comprises talc. In some embodiments, the mineral filler comprises $CaCO_3$. In some embodiments, the mineral filler further comprises a carrier resin. In some embodiments, the carrier resin of the mineral filler is a polyolefin. In some embodiments, the carrier resin of the mineral filler is a polypropylene homopolymer. In some embodiments, the polyolefin of the carrier resin is a polypropylene copolymer. In some embodiments, the polyolefin of the carrier resin is LLDPE. In some examples, the mineral filler is Heritage Plastics Heritage HT6HP. In some examples, the mineral filler is Heritage Plastics Heritage HT6P. In some other examples, the mineral filler is Heritage Plastics HM10®MAX.

The composition of fourth sublayer 50 may comprise one of several different percentages of a mineral filler or fall within one of several different ranges. The percentage by weight amount of the mineral filler may be selected from the following values: about 1%, about 1.5%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.5%, about 4%, or about 5% by weight of the composition of fourth sublayer 50. The amount of the mineral filler may fall within a series of ranges including about 1% to about 5%, about 1% to about 4%, about 1.5% to about 4%, about 1.5% to about 3.5%, or about 2% to about 3.5% by weight of the composition of fourth sublayer 50. The various values and ranges described here are also applicable if the mineral filler comprises talc. The various values and ranges described here are also applicable if the mineral filler comprises $CaCO_3$.

In one example, the composition of fourth sublayer 50 comprises about 2.7% by weight of the composition a mineral filler comprising talc. In one example, the composition of fourth sublayer 50 comprises about 2.7% by weight of the composition a mineral filler comprising $CaCO_3$.

In some embodiments, fourth sublayer 50 comprises a process aid. In some embodiments, the process aid comprises a fluoropolymer. In some embodiments, the process aid is available as a masterbatch and further comprises a carrier resin. In some embodiments, the carrier resin of the process aid is a polyolefin. In some embodiments, the polyolefin of the carrier resin is LLDPE. In some examples, the process aid is Ampacet 100458 Process Aid PE MB.

The composition of fourth sublayer 50 may comprise one of several different percentages of process aid or fall within one of several different ranges. The percentage by weight amount of the process aid may be selected from the following values: about 0.5%, about 0.6%, about 0.7%, about 0.8%, about 0.9%, about 1%, about 1.1%, about 1.2%, about 1.3%, about 1.4%, or about 1.5% by weight of the composition of fourth sublayer 50. The amount of the process aid may fall within a series of ranges including about 0.5% to about 1.5%, about 0.6% to about 1.5%, about 0.8% to about 1.5%, about 0.8% to about 1.3%, or about 0.8% to about 1.2% by weight of the composition of fourth sublayer 50. The various values and ranges described here are also applicable if the process aid is Ampacet 100458 Process Aid PE MB. In some examples, fourth sublayer 50 comprises about 1% by weight a process aid.

In another embodiment in accordance with the present disclosure, a cup 212 includes a floor 218, a side wall 220, and a brim 222. Side wall 220 extends upwardly from floor 218 as shown, for example, in FIGS. 12 and 13. Side wall 220 is formed to include a stack shoulder 224, a frustoconical panel 226 extending from floor 218 towards brim 222 to define an interior product-storage region 228, and a series of ribs 230 extending radially outward from central axis 11. Ribs 230 are formed in frustoconical panel 226 to provide additional stiffness to side wall 220. Cup 212 is made by thermoforming multi-layer sheet 16 in accordance with the illustrative embodiments of the present disclosure to facilitate the positive formation of ribs 230, stack shoulder 224, and brim 222, for example.

Floor 218 includes a floor mount 254, a disc 256, and a floor dome 258 as shown in FIGS. 12, 13, 16, 18, and 19. Floor mount 254 extends between and interconnects disc 256 with side wall 220. Disc 256 extends radially outward from floor dome 258 to couple with floor mount 254. Floor dome 258 extends radially outward from central axis 11 and vertically along central axis 11 towards brim 222.

Figure 20:
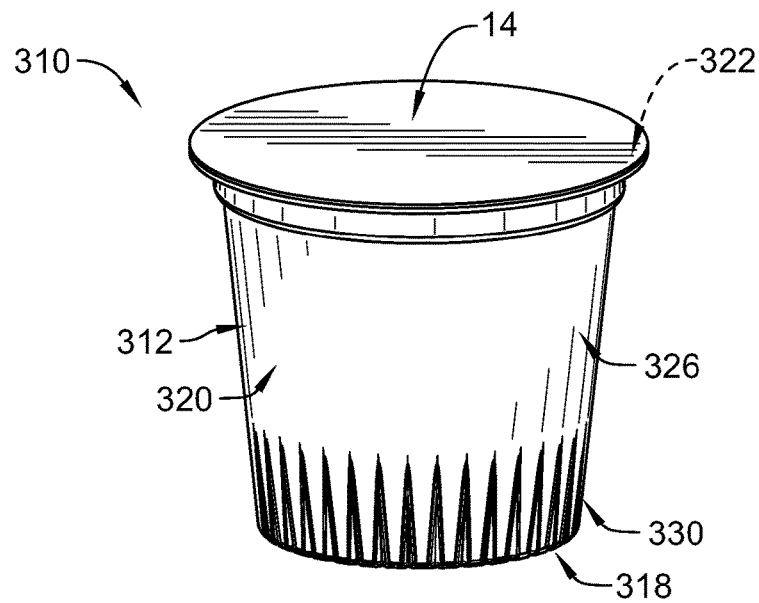
FIG. 20 is a perspective view of a third embodiment of a beverage-brewing package in accordance with the present disclosure showing that the beverage brewing package includes a cup comprising a multi-layer sheet and a sealant film coupled to a brim of the cup.
Figure 21:
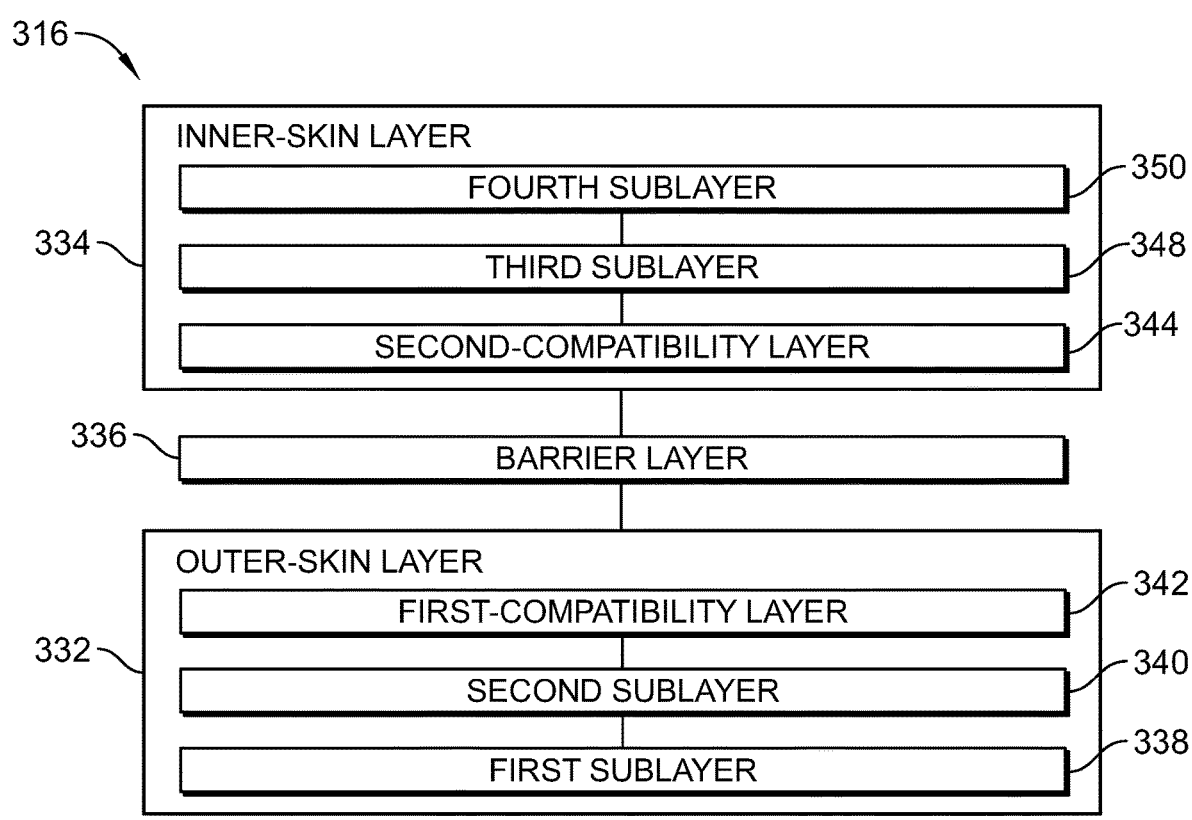
FIG. 21 is a diagrammatic view of the multi-layer sheet used to form the cup of FIG. 20 showing that the multi-layer sheet includes, from top to bottom, an inner-skin layer, a barrier layer, and an outer-skin layer.

A beverage-brewing package 310 in accordance with the present disclosure is shown in FIG. 20. Beverage-brewing package 310 includes a cup 312 and a sealant film 14 coupled to a brim 322 of cup 312. Cup 312 comprises a multi-layer sheet 316 configured to form a cannula aperture 311 in response to a force being applied by an outlet cannula 108 to cup 312 so that fractures extending from cannula aperture 311 are minimized. Multi-layer sheet 316 also has a density to cause resulting cup 312 to float in a sink/float separation tank during a recycling process. Brewing package 310, also called container 310, is configured to perform in a similar manner to brewing package 10.

Cup 312 includes a floor 318, a side wall 320, and a brim 322. Side wall 320 extends upwardly from floor 318 as shown, for example, in FIGS. 20, 22, and 23. Side wall 320 is formed to include a stack shoulder 324, and a frustoconical panel 326 extending from floor 318 towards brim 322 to define an interior product-storage region 328.

Figure 22:
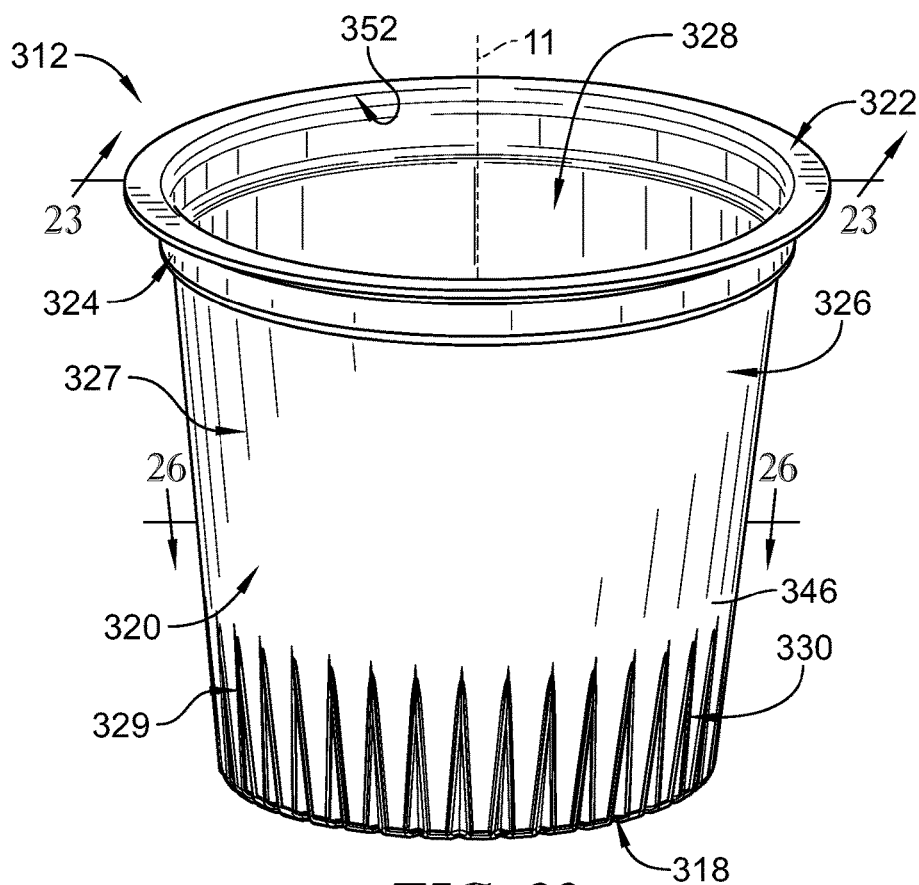
FIG. 22 is a perspective view of the cup of FIG. 20 showing that the cup includes a floor and a side wall extending up from the floor towards the brim to define an interior product-storage region and that the side wall and the brim extend circumferentially around a central axis.
Figure 23:
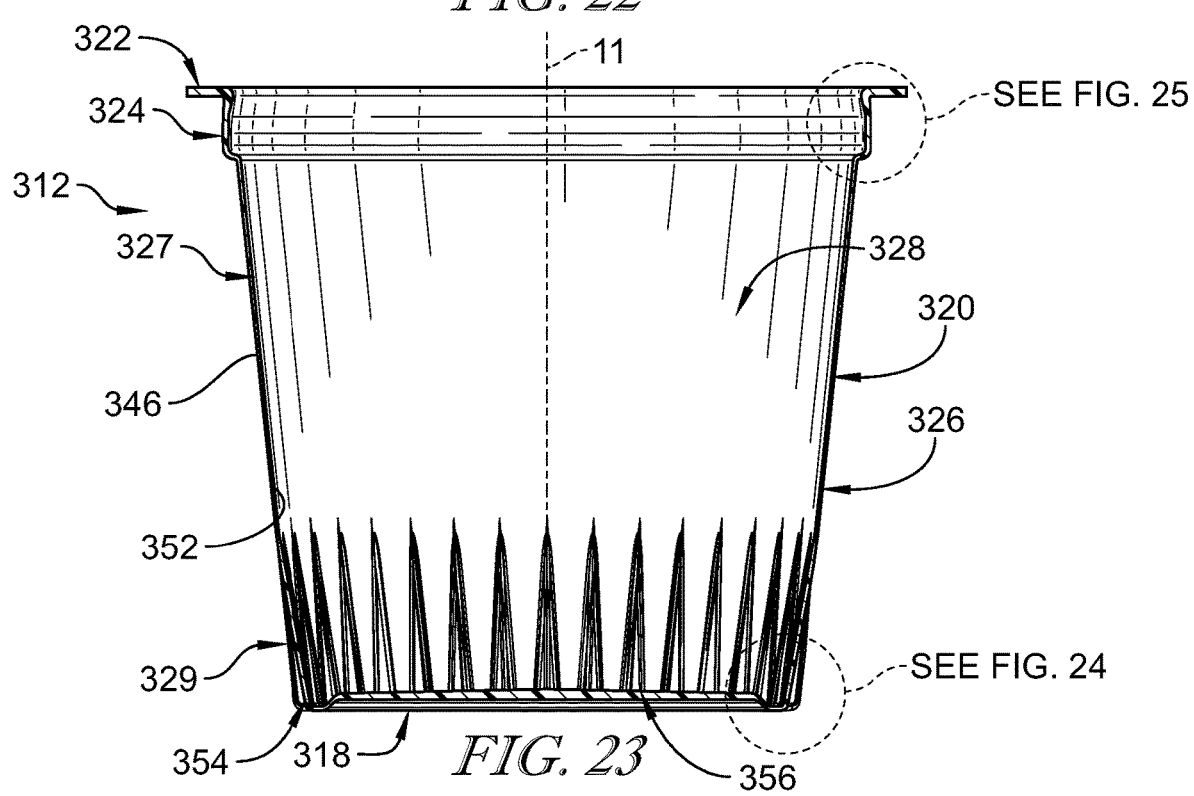
FIG. 23 is a sectional view taking along line 23-23 of FIG. 22 showing that the floor includes a disc extending radially outward from the central axis towards the side wall and a floor mount arranged to interconnect the disc to the side wall.
Figure 24:
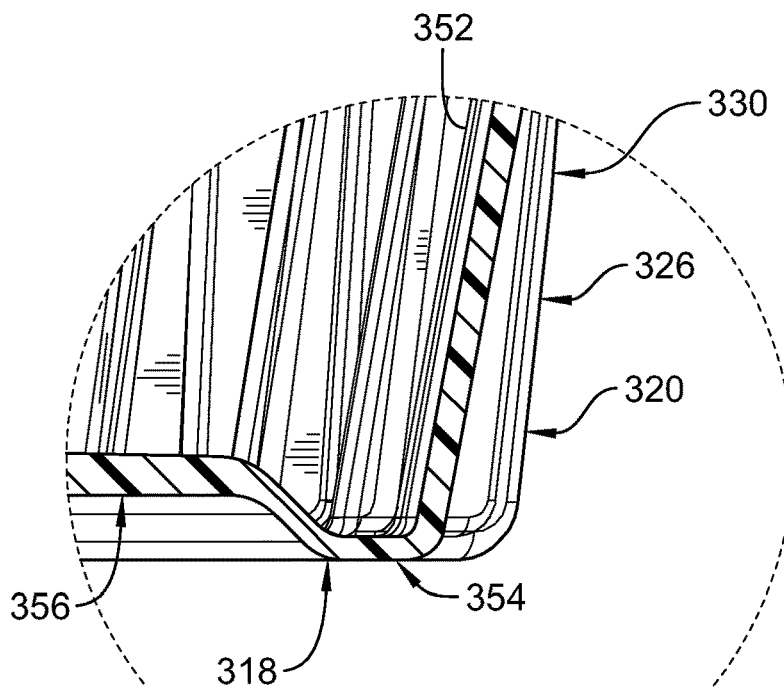
FIG. 24 is a detail view of a circled region of FIG. 23 showing the floor mount extending between the side wall and the disc of the floor.
Figure 25:
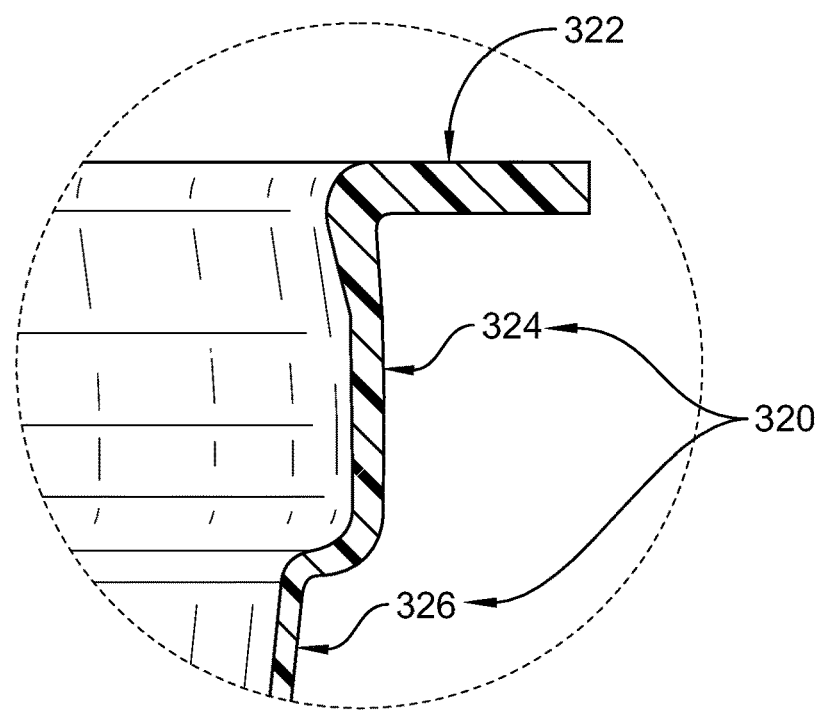
FIG. 25 is a detail view of a circled region of FIG. 23 showing that the side wall includes a frustoconical panel and a stack shoulder arranged to extend between the frustoconical panel and the brim and that the brim extends radially outward from the stack shoulder to form an upward facing surface of the brim.

Frustoconical panel 326 is formed to include a side wall band 327 and a rib band 329 as shown in FIG. 22. Side wall band 327 extends between rib band 329 and stack shoulder 324. Rib band 329 is formed to include a series of ribs 330 extending radially outward away from a central axis 11 of cup 312. Ribs 330 are formed in rib panel 329 to provide additional stiffness, rigidity, and strength to side wall 320.

Floor 318 includes a floor mount 354 and a disc 356 as shown in FIGS. 20, 23, 24, and 26-39. Floor mount 354 extends between and interconnects disc 356 with side wall 320. Disc 356 extends radially outward from central axis 11 to couple to floor mount 354.

During a brewing operation, outlet cannula 108 applies a force vertically to disc 356 of floor 318 along central axis 11. Once sufficient force is reached, outlet cannula 108 forms cannula aperture 311 in disc 356. In some embodiments, multi-layer sheet 316 is configured to minimize fractures extending from cannula aperture 311. In some embodiments, multi-layer sheet 316 is configured to minimize failed punctures of disc 356 by outlet cannula 108.

Cup 312 is made, for example, by thermoforming multi-layer sheet 316 in accordance with the illustrative embodiments of the present disclosure to facilitate the positive formation of ribs 330, stack shoulder 324, and brim 322. Multi-layer sheet 316 comprises an outer-skin layer 332, an inner-skin layer 334, and a barrier layer 336 extending between and interconnecting outer-skin layer 332 and inner-skin layer 334 as shown in FIG. 21. During the thermoforming process, outer-skin layer 332 is arranged to face radially-outwardly away from central axis 11 and interior product-storage region 328 and inner-skin layer 334 is arranged to face radially-inwardly towards interior product-storage region 328.

In an embodiment, multi-layer sheet 316 is about 0.02 inches to about 0.08 inches thick. Multi-layer sheet 16 may be a particular thickness or fall within one of several different ranges. The thickness of multi-layer sheet 16 may be one of the following values: about 0.02 inches, about 0.03 inches, about 0.035 inches, about 0.04 inches, about 0.045 inches, about 0.05 inches, about 0.055 inches, about 0.06 inches, about 0.065 inches, about 0.07 inches, or about 0.08 inches thick. The thickness of multi-layer sheet 316 may fall within one of many different ranges. In a first set of ranges, the thickness of multi-layer sheet 316 is one of the following ranges: about 0.02 inches to about 0.08 inches, about 0.03 inches to about 0.08 inches, about 0.04 inches to about 0.08 inches, about 0.045 inches to about 0.08 inches, or about 0.05 inches to about 0.08 inches thick. In a second set of ranges, the thickness of multi-layer sheet 316 is one of the following ranges: about 0.02 inches to about 0.08 inches, about 0.02 inches to about 0.07 inches, about 0.02 inches to about 0.06 inches, about 0.02 inches to about 0.055 inches, or about 0.02 inches to about 0.05 inches thick. In a third set of ranges, the thickness of multi-layer sheet 316 is one of the following ranges: about 0.02 inches to about 0.08 inches, about 0.02 inches to about 0.07 inches, about 0.03 inches to about 0.07 inches, about 0.03 inches to about 0.06 inches, about 0.04 inches to about 0.06 inches, or about 0.045 inches to about 0.06 inches thick.

In an embodiment, multi-layer sheet 316 has a density between 0.8 g/cm$^3$ and 1.1 g/cm$^3$. Multi-layer sheet 316 may be a particular density or fall within one of several different ranges. The density of multi-layer sheet 316 may be one of the following values: about 0.8 g/cm$^3$, about 0.85 g/cm$^3$, about 0.9 g/cm$^3$, about 0.91 g/cm$^3$, about 0.92 g/cm$^3$, about 0.93 g/cm$^3$, about 0.94 g/cm$^3$, about 0.95 g/cm$^3$, about 0.96 g/cm$^3$, about 0.97 g/cm$^3$, about 0.98 g/cm$^3$, about 0.99 g/cm$^3$, about 1 g/cm$^3$, or about 1.1 g/cm$^3$. The density of multi-layer sheet 316 may fall within one of many different ranges. In a first set of ranges, the density of multi-layer sheet 316 is one of the following ranges: about 0.8 g/cm$^3$ to about 1.1 g/cm$^3$, about 0.9 g/cm$^3$ to about 1.1 g/cm$^3$, about 0.91 g/cm$^3$ to about 1.1 g/cm$^3$, about 0.92 g/cm$^3$ to about 1.1 g/cm$^3$, about 0.93 g/cm$^3$ to about 1.1 g/cm$^3$, about 0.93 g/cm$^3$ to about 1.1 g/cm$^3$, about 0.94 g/cm$^3$ to about 1.1 g/cm$^3$, about 0.95 g/cm$^3$ to about 1.1 g/cm$^3$, about 0.96 g/cm$^3$ to about 1.1 g/cm$^3$, about 0.97 g/cm$^3$ to about 1.1 g/cm$^3$, or about 0.98 g/cm$^3$ to about 1.1 g/cm$^3$. In a second set of ranges, the density of multi-layer sheet 316 is one of the following ranges: about 0.8 g/cm$^3$ to about 1.1 g/cm$^3$, about 0.8 g/cm$^3$ to about 1 g/cm$^3$, about 0.8 g/cm$^3$ to about 0.99 g/cm$^3$, about 0.8 g/cm$^3$ to about 0.98 g/cm$^3$, about 0.8 g/cm$^3$ to about 0.97 g/cm$^3$, about 0.8 g/cm$^3$ to about 0.96 g/cm$^3$, or about 0.8 g/cm$^3$ to about 0.95 g/cm$^3$. In a third set of ranges, the density of multi-layer sheet 316 is one of the following ranges: about 0.8 g/cm$^3$ to about 1.1 g/cm$^3$, about 0.8 g/cm$^3$ to about 1 g/cm$^3$, about 0.85 g/cm$^3$ to about 1 g/cm$^3$, about 0.9 g/cm$^3$ to about 1 g/cm$^3$, about 0.9 g/cm$^3$ to about 0.99 g/cm$^3$, about 0.9 g/cm$^3$ to about 0.98 g/cm$^3$, about 0.92 g/cm$^3$ to about 0.98 g/cm$^3$, about 0.93 g/cm$^3$ to about 0.98 g/cm$^3$, or about 0.93 g/cm$^3$ to about 0.97 g/cm$^3$.

Outer-skin layer 332 includes a first sublayer 338, a second sublayer 340, and a first-compatibility layer 342 as shown in FIG. 21. First sublayer 338 is arranged to form an outer surface 346 of cup 312. Second sublayer 340 extends between and interconnects first sublayer 338 with first-compatibility layer 342. First-compatibility layer 342 extends between and interconnects second sublayer 340 with barrier layer 336.

Inner-skin layer 334 includes a second-compatibility layer 344, a third sublayer 348, and a fourth sublayer 350 as shown in FIG. 21. Second-compatibility layer 344 extends between and interconnects barrier layer 336 with third sublayer 348. Third sublayer 348 extends between and interconnects second-compatibility layer 344 and fourth sublayer 350. Fourth sublayer 350 is arranged to form an inner surface 352 of cup 312.

Multi-layer sheet 316 is, for example, a co-extruded sheet in which first sublayer 338, second sublayer 340, first-compatibility layer 342, barrier layer 336, second-compatibility layer 344, third sublayer 348, and fourth sublayer 350 each comprise a composition. Illustratively, each composition may be formed by an extrusion process of a formulation.

Illustratively, each formulation of first sublayer 338, second sublayer 340, first-compatibility layer 342, barrier layer 336, second-compatibility layer 344, third sublayer 348, and fourth sublayer 350 may be added to a hopper on an extrusion machine and heated to produce a molten material in an extruder. The molten material of each of first sublayer 338, second sublayer 340, first-compatibility layer 342, barrier layer 336, second-compatibility layer 344, third sublayer 348, and fourth sublayer 350 may be co-extruded to produce multi-layer sheet 316.

The composition of each of first sublayer 338, second sublayer 340, first-compatibility layer 342, barrier layer 336, second-compatibility layer 344, third sublayer 348, and fourth sublayer 350 may comprise, for example, a plastic polymer, a material, or a resin, and may optionally include one or more additives. Examples of plastic polymers, resins, or materials suitable for multi-layer sheet 16 include high-density polyethylene (HDPE), low-density polyethylene (LDPE), and polypropylene (PP). In some aspects, the plastic polymer, material, or resin may be called a base resin.

In one aspect, the polypropylene may be a polypropylene copolymer (PP-CoP), an impact polypropylene, a polypropylene impact copolymer, or combinations thereof. In some embodiments, the polypropylene may contain an additive. In some examples, a polypropylene impact copolymer is a copolymer of ethylene and propylene. In some examples, a polypropylene impact copolymer is a heterophasic in-situ blend containing an ethylene/propylene rubber component. In some examples, a polypropylene impact copolymer comprises a rubber phase and a polypropylene matrix phase. In some embodiments, a polypropylene impact copolymer may be produced with a Ziegler-Natta catalyst. In some embodiments, a polypropylene impact copolymer is a semi-crystalline thermoplastic resin. In some examples, the polypropylene impact copolymer comprises a nucleating agent.

In some aspects, the composition of each of first sublayer 338, second sublayer 340, first-compatibility layer 342, barrier layer 336, second-compatibility layer 344, third sublayer 348, and fourth sublayer 350 comprises a process aid. Process aids may reduce friction between the melt and metal surfaces during an extrusion process. Process aids may comprise a fluoropolymer, a tetrafluoroethylene, combinations thereof, or any other suitable alternative. In some embodiments, process aids are provided as masterbatches that comprise a carrier resin. In some embodiments, a carrier resin is LLDPE. In some embodiments, process additives, such as slip agents and antiblock agents, may be added to the formulations to improve the extrusion process and provide additional properties of multi-layer sheet 316. Colorants in the form of masterbatches may also be added to each formulation.

In some aspects, the composition of each of first sublayer 338, second sublayer 340, first-compatibility layer 342, barrier layer 336, second-compatibility layer 344, third sublayer 348, and fourth sublayer 350 comprises a mineral filler. Mineral fillers include calcium carbonate (CaCO$_3$), dolomite, barium sulfate (BaSO$_4$), talc, wollastonite, mica, kaolin, combinations thereof, or any other suitable alternative.

In some aspects, the composition of each of first sublayer 338, second sublayer 340, first-compatibility layer 342, barrier layer 336, second-compatibility layer 344, third sublayer 348, and fourth sublayer 350 comprises a compatibilizer. In some aspects, compatibilizers improve the properties of a regrind. In some aspects, compatibilizers improve the dispersion of a regrind in a molten material. In some aspects, compatibilizers may also improve the thermal stability of the extruded materials. Compatibilizers include GF-30 available from EVAL® or any other suitable alternative.

In some aspects, the compositions of each of first sublayer 338, second sublayer 340, first-compatibility layer 342, barrier layer 336, second-compatibility layer 344, third sublayer 348, and fourth sublayer 350 comprises an adhesive. In some aspects, adhesives comprise a modified polyolefin. In some aspects, the polyolefin may be a polyethylene or a polypropylene. In some aspects, the polyolefin may be modified by an anhydride. Adhesives include Mitsui ADMER® QF551A or any other suitable alternative.

In some aspects, the composition of each of first sublayer 338, second sublayer 340, first-compatibility layer 342, barrier layer 336, second-compatibility layer 344, third sublayer 348, and fourth sublayer 350 comprises a gas barrier. Gas barriers include ethylene-vinyl alcohol copolymers (EVOH), poly-vinyl alcohols (PVA), combinations thereof, or any other suitable alternative. In another aspect, barrier additives may be added to non-barrier materials to form a gas barrier. Barrier materials include oxygen scavengers, nanomaterials, combinations thereof, or any other suitable alternative. Barrier materials include polyethylene terephthalate (PET), polyamides, combinations thereof, or any other suitable alternative. Nanomaterials include nanoclays, montmorillonite, modified montmorillonite clays, combinations thereof, or any other suitable alternative.

In some embodiments, the composition of each of first sublayer 338, second sublayer 340, first-compatibility layer 342, barrier layer 336, second-compatibility layer 344, third sublayer 348, and fourth sublayer 350 comprises a regrind. In one aspect, a regrind is formed by recovering unused material from the thermoforming process of cup 312 and processing to produce a homogenous material. In some aspects, a regrind is formed by recovering other plastic materials and processing to produce a homogenous material. In another aspect, a regrind is formed by recycling cups 312.

First sublayer 338 of multi-layer sheet 316 is arranged to form outer surface 346 of cup 312 as shown in FIGS. 20 and 22. In an embodiment, first sublayer 338 is about 10% to about 40% of the total thickness multi-layer sheet 316. First sublayer 338 may be one of several different percentages of thickness of multi-layer sheet 16 or fall within one of several different ranges. The percentage thickness of first sublayer 338 of multi-layer sheet 316 may be one of the following values: about 10%, about 15%, about 16%, about 17%, about 18%, about 19%, about 20%, about 21%, about 22%, about 23%, about 24%, about 25%, about 30%, about 35%, or about 40% of the total thickness of multi-layer sheet 316. The percentage thickness of first sublayer 338 of multi-layer sheet 316 may fall within one of many different ranges. In a set of ranges, the thickness range of first sublayer 338 is one of the following ranges: about 10% to about 40%, about 10% to about 35%, about 10% to about 30%, about 15% to about 30%, or about 15% to about 25% of the total thickness of multi-layer sheet 316. In an embodiment, first sublayer 38 is about 19% of the total thickness of multi-layer sheet 316.

First sublayer 338 may be a particular thickness or fall within one of several different ranges. The thickness of first sublayer 338 may be one of the following values: about 0.005 inches, about 0.006 inches, about 0.007 inches, about 0.008 inches, about 0.009 inches, about 0.01 inches, about 0.011 inches, about 0.012 inches, about 0.013 inches, about 0.014 inches, or about 0.015 inches thick. The thickness of first sublayer 338 may fall within one of many different ranges. In a set of ranges, the thickness of first sublayer 338 is one of the following ranges: about 0.005 inches to about 0.015 inches, about 0.006 inches to about 0.015 inches, about 0.007 inches to about 0.015 inches, about 0.008 inches to about 0.015 inches, about 0.008 inches to about 0.012 inches, about 0.009 inches to about 0.012 inches, or about 0.009 inches to about 0.011 inches thick.

In some embodiments, the composition of first sublayer 338 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205,000 psi as measured by ASTMD790A. In some examples, the polypropylene impact copolymer is Braskem PP TI4040WT. In some embodiments, the polypropylene impact copolymer has a flexural modulus-1% secant of about 230,000 psi as measured by ASTMD790A. In some examples, the polypropylene impact copolymer has a flexural modulus-1% secant of about 195,000 psi as measured by ASTMD790A. In some embodiments, the polypropylene impact copolymer is ExxonMobil™ PP7032KN.

The composition of first sublayer 338 may comprise one of several different percentages of a polyolefin or fall within one of several different ranges. The percentage by weight amount of the polyolefin may be selected from the following values: about 85%, about 88%, about 89%, about 90%, about 90.5%, about 91%, about 91.1%, about 91.2%, about 91.3%, about 91.4%, about 91.5%, about 92%, about 92.5%, about 92.9%, about 93%, about 93.2%, about 93.3%, about 93.5%, about 94%, or about 95% by weight of the composition of first sublayer 338. The amount of the polyolefin may fall within a series of ranges including about 85% to about 95%, about 88% to about 95%, about 88% to about 94%, about 89% to about 94%, or about 89% to about 93.5% by weight of the composition of first sublayer 38. The various values and ranges described here are also applicable if the polyolefin is a polypropylene. The various values and ranges described here are also applicable if the polyolefin is a polypropylene impact copolymer. In some examples, the composition of first sublayer 338 comprises about 91.3% by weight of the composition a polypropylene impact copolymer.

In some embodiments, the composition of first sublayer 338 comprises a mineral filler. In some embodiments, the mineral filler comprises talc. In some embodiments, the mineral filler comprises $CaCO_3$. In some embodiments, the mineral filler further comprises a carrier resin. In some embodiments, the carrier resin is a polyolefin. In some embodiments, the polypropylene is a polypropylene copolymer. In some embodiments, the polyolefin is LLDPE. In some examples, the mineral filler is Heritage Plastics Heritage HT6HP. In some examples, the mineral filler is Heritage Plastics Heritage HT6P. In some other examples, the mineral filler is Heritage Plastics HM10®MAX. In some examples, the mineral filler is Heritage Plastics HiCal™ LC.

The composition of first sublayer 338 may comprise one of several different percentages of a mineral filler or fall within one of several different ranges. The percentage by weight amount of the mineral filler may be selected from the following values: about 1%, about 1.5%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.5%, about 4%, about 5%, or about 10% by weight of the composition of first sublayer 338. The amount of the mineral filler may fall within a series of ranges including about 1% to about 10%, about 1% to about 5%, about 1% to about 4%, about 1.5% to about 4%, about 1.5% to about 3.5%, or about 2% to about 3.5% by weight of the composition of first sublayer 338. The various values and ranges described here are also applicable if the mineral filler comprises talc. The various values and ranges described here are also applicable if the mineral filler comprises $CaCO_3$.

In one example, the composition of first sublayer 338 comprises about 2.7% by weight of the composition a mineral filler comprising talc. In one example, the composition of first sublayer 338 comprises about 2.7% by weight of the composition a mineral filler comprising $CaCO_3$.

In some embodiments, first sublayer 338 comprises a colorant. In some embodiments, the colorant is available as a masterbatch. In some embodiments, the masterbatch comprises a carrier resin. In some embodiments, the carrier resin is a polyolefin. In some embodiments, the polyolefin of the carrier resin is LLDPE. In some examples, the colorant is Ampacet 112761 White PE MB.

The composition of first sublayer 338 may comprise one of several different percentages of colorant or fall within one of several different ranges. The percentage by weight amount of the colorant may be selected from the following values: about 1%, about 2%, about 3%, about 4%, about 5%, about 6%, about 7%, about 8%, about 9%, or about 10% by weight of the composition of first sublayer 338. The amount of the colorant may fall within a series of ranges including about 1% to about 10%, about 2% to about 10%, about 2% to about 8%, about 3% to about 8%, or about 3% to about 6% by weight of the composition of first sublayer 338. The various values and ranges described here are also applicable if the colorant is Ampacet 192434 Kosher FDA Black PE MB. The various values and ranges described here are also applicable if the colorant is Ampacet 112761 White PE MB. In some examples, first sublayer 338 comprises about 5% by weight a colorant.

In some embodiments, first sublayer 338 comprises a process aid. In some embodiments, the process aid comprises a fluoropolymer. In some embodiments, the process aid is available as a masterbatch and further comprises a carrier resin. In some embodiments, the carrier resin of the masterbatch is a polyolefin. In some embodiments, the polyolefin of the masterbatch is LLDPE. In some examples, the process aid is Ampacet 100458 Process Aid PE MB.

The composition of first sublayer 338 may comprise one of several different percentages of process aid or fall within one of several different ranges. The percentage by weight amount of the process aid may be selected from the following values: about 0.5%, about 0.6%, about 0.7%, about 0.8%, about 0.9%, about 1%, about 1.1%, about 1.2%, about 1.3%, about 1.4%, or about 1.5% by weight of the composition of first sublayer 338. The amount of the process aid may fall within a series of ranges including about 0.5% to about 1.5%, about 0.6% to about 1.5%, about 0.8% to about 1.5%, about 0.8% to about 1.3%, or about 0.8% to about 1.2% by weight of the composition of first sublayer 338. The various values and ranges described here are also applicable if the process aid is Ampacet 100458 Process Aid PE MB. In some examples, first sublayer 338 comprises about 1% by weight a process aid.

Second sublayer 340 of multi-layer sheet 316 is arranged to extend between and interconnect first sublayer 338 with first-compatibility layer 342. In an embodiment, second sublayer 340 is about 10% to about 50% of the total thickness multi-layer sheet 316. Second sublayer 340 may be one of several different percentages of thickness of multi-layer sheet 316 or fall within one of several different ranges. The percentage thickness of second sublayer 340 of multi-layer sheet 316 may be one of the following values: about 10%, about 15%, about 20%, about 23%, about 25%, about 26%, about 27%, about 28%, about 28.5%, about 29%, about 30%, about 31%, about 32%, about 35%, about 40%, about 45%, or about 50% of the total thickness of multi-layer sheet 316. The percentage thickness of second sublayer 340 of multi-layer sheet 316 may fall within one of many different ranges. In a set of ranges, the thickness range of second sublayer 340 is one of the following ranges: about 10% to about 50%, about 15% to about 50%, about 20% to about 50%, about 20% to about 40%, about 20% to about 35%, or about 25% to about 35% of the total thickness of multi-layer sheet 316. In an embodiment, second sublayer 340 is about 28.5% of the total thickness of multi-layer sheet 316.

Second sublayer 340 may be a particular thickness or fall within one of several different ranges. The thickness of second sublayer 340 may be one of the following values: about 0.0055 inches, about 0.0083 inches, about 0.011 inches, about 0.013 inches, about 0.014 inches, about 0.015 inches, about 0.0155 inches, about 0.016 inches, about 0.0165 inches, about 0.017 inches, about 0.018 inches, about 0.019 inches, about 0.02 inches, about 0.022 inches, about 0.025 inches, or about 0.03 inches thick. The thickness of second sublayer 340 may fall within one of many different ranges. In a set of ranges, the thickness of second sublayer 340 is one of the following ranges: about 0.0055 inches to about 0.03 inches, about 0.01 inches to about 0.03 inches, about 0.013 inches to about 0.03 inches, or about 0.013 inches to about 0.022 inches thick.

In some embodiments, the composition of second sublayer 340 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205,000 psi as measured by ASTMD790A. In some examples, the polypropylene impact copolymer is Braskem PP TI4040WT.

In some embodiments, the composition of second sublayer 340 comprises a polyolefin. In some embodiments, the composition of second sublayer 340 comprises a regrind. In some embodiments, the regrind comprises a mineral filler. In some embodiments, the composition of second sublayer 340 comprises a blend of a polyolefin and a regrind. In some embodiments, the regrind comprises a polyolefin. In some embodiments, the polyolefin is a polypropylene. In some embodiments, the polyolefin of the regrind is a polypropylene impact copolymer. In some embodiments, the regrind comprises excess material from multi-layer sheet 316 that has been recycled.

The composition of second sublayer 340 may comprise one of several different percentages of a regrind or fall within one of several different ranges. The percentage by weight amount of the regrind may be selected from the following values: about 10%, about 25%, about 50%, about 55%, about 60%, about 65%, about 70%, about 75%, about 80%, about 85%, about 90%, about 93%, about 95%, about 96%, about 97%, about 98%, or about 99% by weight of the composition of second sublayer 340. The amount of the regrind may fall within a series of ranges including about 10% to about 99%, about 50% to about 99%, about 60% to about 99%, about 70% to about 99%, about 70% to about 98%, or about 90% to about 98% by weight of the composition of second sublayer 340. In some of the examples, second sublayer 340 comprises about 97% by weight of the composition a regrind.

The composition of second sublayer 340 may comprise one of several different percentages of a polyolefin or fall within one of several different ranges. The percentage by weight amount of the polyolefin may be selected from the following values: about 5%, about 7%, about 10%, about 12%, about 13%, about 14%, about 15%, about 20%, about 25%, about 30%, about 35%, about 40%, or about 50% by weight of the composition of second sublayer 340. The amount of the polyolefin may fall within a series of ranges including about 5% to about 50%, about 5% to about 40%, about 5% to about 30%, about 5% to about 25%, about 7% to about 25%, about 7% to about 20% or about 7% to about 15% by weight of the composition of second sublayer 340. The various values and ranges described here are also applicable if the polyolefin is a polypropylene. The various values and ranges described here are also applicable if the polyolefin is a polypropylene impact copolymer.

In some embodiments, second sublayer 340 comprises a compatibilizer. In some embodiments, the compatibilizer comprises polyethylene. In some examples, the compatibilizer is EVAL® AMERICAS GF-30.

The composition of second sublayer 340 may comprise one of several different percentages of compatibilizer or fall within one of several different ranges. The percentage by weight amount of the compatibilizer may be selected from the following values: about 1%, about 2%, about 2.5%, about 3%, about 3.5%, about 4%, about 5%, or about 6% by weight of the composition of second sublayer 340. The amount of the compatibilizer may fall within a series of ranges including about 1% to about 6%, about 1% to about 5%, about 2% to about 5%, or about 2% to about 4%. The various values and ranges described here are also applicable if the compatibilizer is EVAL® AMERICAS GF-30. In some examples, second sublayer 340 comprises about 3% by weight a compatibilizer.

In some embodiments, first-compatibility layer 342 and second-compatibility layer 344 may be about the same thickness. In an embodiment, each of first-compatibility layer 342 and second-compatibility layer 344 is about 0.05% to about 2% of the total thickness multi-layer sheet 316. Each of first-compatibility layer 342 and second-compatibility layer 344 may be one of several different percentages of thickness of multi-layer sheet 316 or fall within one of several different ranges. The percentage thickness of each of first-compatibility layer 342 and second-compatibility layer 344 of multi-layer sheet 316 may be one of the following values: about 0.5%, about 0.6%, about 0.7%, about 0.8%, about 0.9%, about 1%, about 1.1%, about 1.2%, about 1.3%, about 1.4%, about 1.5%, about 1.6%, about 1.7%, about 1.8%, about 1.9%, or about 2% of the total thickness of multi-layer sheet 316. The percentage thickness of each of first-compatibility layer 342 and second-compatibility layer 344 of multi-layer sheet 316 may fall within one of many different ranges. In a set of ranges, the thickness range of each of first-compatibility layer 342 and second-compatibility layer 344 is one of the following ranges: about 0.5% to about 2%, about 0.5% to about 1.5%, about 0.7% to about 1.5%, about 0.7% to about 1.3%, or about 0.7% to about 1.2% of the total thickness of multi-layer sheet 316. In an embodiment, each of first-compatibility layer 342 and second-compatibility layer 344 is about 1% of the total thickness of multi-layer sheet 316.

Each of first-compatibility layer 342 and second-compatibility layer 344 may be a particular thickness or fall within one of several different ranges. The thickness of each of first-compatibility layer 342 and second-compatibility layer 344 may be one of the following values: about 0.0001 inches, about 0.0002 inches, about 0.0003 inches, about 0.0004 inches, about 0.0005 inches, about 0.0006 inches, about 0.0007 inches, about 0.0008 inches, about 0.0009 inches, about 0.001 inches thick. The thickness of each of first-compatibility layer 342 and second-compatibility layer 344 may fall within one of many different ranges. In a set of ranges, the thickness of each of first-compatibility layer 342 and second-compatibility layer 344 is one of the following ranges: about 0.0001 inches to about 0.001 inches, about 0.0002 inches to about 0.001 inches, about 0.0003 inches to about 0.001 inches, or about 0.0003 inches to about 0.0008 inches thick.

In some embodiments, each of first-compatibility layer 342 and second-compatibility layer 344 comprises an adhesive. In some embodiments, the adhesive comprises a polyolefin. In some embodiments, the polyolefin of the adhesive comprises a polypropylene. In some embodiments, the polypropylene of the adhesive is modified with a functional group. In some embodiments, the functional group is an anhydride. In some embodiments, the adhesive comprises a polypropylene modified with an anhydride. In some examples, the adhesive is Mitsui ADMER™ QF551A. In some embodiments, each of first-compatibility layer 342 and second-compatibility layer 344 comprises up to 100% by weight an adhesive.

In an embodiment, barrier layer 336 extends between and interconnects outer-skin layer 332 and inner-skin layer 334 as shown in FIG. 21. In some embodiments, barrier layer 336 extends between and interconnects first-compatibility layer 342 and second-compatibility layer 344 as shown in FIG. 21. In an embodiment, barrier layer 336 is about 1% to about 5% of the total thickness multi-layer sheet 316. Barrier layer 336 may be one of several different percentages of the thickness of multi-layer sheet 316 or fall within one of several different ranges. The percentage thickness of barrier layer 336 of multi-layer sheet 316 may be one of the following values: about 1%, about 2%, about 3%, about 4%, or about 5% of the total thickness of multi-layer sheet 316. The percentage thickness of barrier layer 336 of multi-layer sheet 316 may fall within one of many different ranges. In a set of ranges, the thickness range of barrier layer 336 is one of the following ranges: about 1% to about 5%, about 1% to about 4%, or about 2% to about 4% of the total thickness of multi-layer sheet 316. In an embodiment, barrier layer 336 is about 3% of the total thickness of multi-layer sheet 316.

Barrier layer 336 may be a particular thickness or fall within one of several different ranges. The thickness of barrier layer 336 may be one of the following values: about 0.001 inches, about 0.0011 inches, about 0.0012 inches, about 0.0013 inches about 0.0014 inches, about 0.0015 inches, about 0.0016 inches, about 0.0017 inches, about 0.0018 inches, about 0.0019 inches or about 0.002 inches thick. The thickness of barrier layer 336 may fall within one of many different ranges. In a set of ranges, the thickness of barrier layer 336 is one of the following ranges: about 0.001 inches to about 0.002 inches, about 0.0012 inches to about 0.002 inches, about 0.0012 inches to about 0.0018 inches, or about 0.0013 inches to about 0.0017 inches thick.

In some embodiments, barrier layer 336 comprises a barrier material. In some embodiments, the barrier material comprises a polyolefin. In some embodiments, the polyolefin of barrier layer 336 is a polyethylene. In some embodiments, the polyethylene of barrier layer 336 is a polyethylene copolymer. In some embodiments, the polyolefin of barrier layer 336 is an EVOH copolymer. In some examples, the EVOH copolymer is EVAL™ LT171B. In some embodiments, the composition of barrier layer 336 comprises up to 100% by weight a barrier material.

Third sublayer 348 of multi-layer sheet 316 is arranged to extend between and interconnect fourth sublayer 350 with second-compatibility layer 344. In an embodiment, third sublayer 348 is about 10% to about 50% of the total thickness multi-layer sheet 316. Third sublayer 348 may be one of several different percentages of the thickness of multi-layer sheet 316 or fall within one of several different ranges. The percentage thickness of third sublayer 348 of multi-layer sheet 316 may be one of the following values: about 10%, about 15%, about 20%, about 23%, about 25%, about 26%, about 27%, about 28%, about 28.5%, about 29%, about 30%, about 31%, about 32%, about 35%, about 40%, about 45%, or about 50% of the total thickness of multi-layer sheet 316. The percentage thickness of third sublayer 348 of multi-layer sheet 316 may fall within one of many different ranges. In a set of ranges, the thickness range of third sublayer 348 is one of the following ranges: about 10% to about 50%, about 15% to about 50%, about 20% to about 50%, about 20% to about 40%, about 20% to about 35%, or about 25% to about 35% of the total thickness of multi-layer sheet 316. In an embodiment, third sublayer 348 is about 28.5% of the total thickness of multi-layer sheet 316.

Third sublayer 348 may be a particular thickness or fall within one of several different ranges. The thickness of third sublayer 348 may be one of the following values: about 0.0055 inches, about 0.0083 inches, about 0.011 inches, about 0.013 inches, about 0.014 inches, about 0.015 inches, about 0.0155 inches, about 0.016 inches, about 0.0165 inches, about 0.017 inches, about 0.018 inches, about 0.019 inches, about 0.02 inches, about 0.022 inches, about 0.025 inches, or about 0.03 inches thick. The thickness of third sublayer 348 may fall within one of many different ranges. In a set of ranges, the thickness of third sublayer 348 is one of the following ranges: about 0.0055 inches to about 0.03 inches, about 0.01 inches to about 0.03 inches, about 0.013 inches to about 0.03 inches, or about 0.013 inches to about 0.022 inches thick.

In some embodiments, the composition of third sublayer 348 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205,000 psi as measured by ASTMD790A. In some examples, the polypropylene impact copolymer is Braskem PP TI4040WT. In some examples, the polypropylene impact copolymer has a flexural modulus-1% secant of about 195,000 psi as measured by ASTMD790A. In some embodiments, the polypropylene impact copolymer is ExxonMobil™ PP7032KN.

In some embodiments, the composition of third sublayer 348 comprises a regrind. In some embodiments, the regrind comprises a mineral filler. In some embodiments, the regrind comprises a polyolefin. In some embodiments, the polyolefin is a polypropylene. In some embodiments, the polyolefin of the regrind is a polypropylene impact copolymer. In some embodiments, the regrind comprises excess material from multi-layer sheet 316 that has been recycled.

The composition of third sublayer 348 may comprise one of several different percentages of a regrind or fall within one of several different ranges. The percentage by weight amount of the regrind may be selected from the following values: about 50%, about 55%, about 60%, about 65%, about 70%, about 75%, about 80%, about 85%, about 90%, about 93%, about 95%, about 96%, about 97%, about 98%, or about 99% by weight of the composition of third sublayer 348. The amount of the regrind may fall within a series of ranges including about 50% to about 99%, about 60% to about 99%, about 70% to about 99%, about 70% to about 98%, or about 90% to about 98% by weight of the composition of third sublayer 348. In some of the examples, third sublayer 348 comprises about 97% by weight of the composition a regrind.

In some embodiments, third sublayer 348 comprises a compatibilizer. In some embodiments, the compatibilizer comprises polyethylene. In some examples, the compatibilizer is EVAL® AMERICAS GF-30.

The composition of third sublayer 348 may comprise one of several different percentages of compatibilizer or fall within one of several different ranges. The percentage by weight amount of the compatibilizer may be selected from the following values: about 1%, about 2%, about 2.5%, about 3%, about 3.5%, about 4%, about 5%, or about 6% by weight of the composition of third sublayer 348. The amount of the compatibilizer may fall within a series of ranges including about 1% to about 6%, about 1% to about 5%, about 2% to about 5%, or about 2% to about 4%. The various values and ranges described here are also applicable if the compatibilizer is EVAL® AMERICAS GF-30. In some examples, third sublayer 348 comprises about 3% by weight a compatibilizer.

Figure 26:
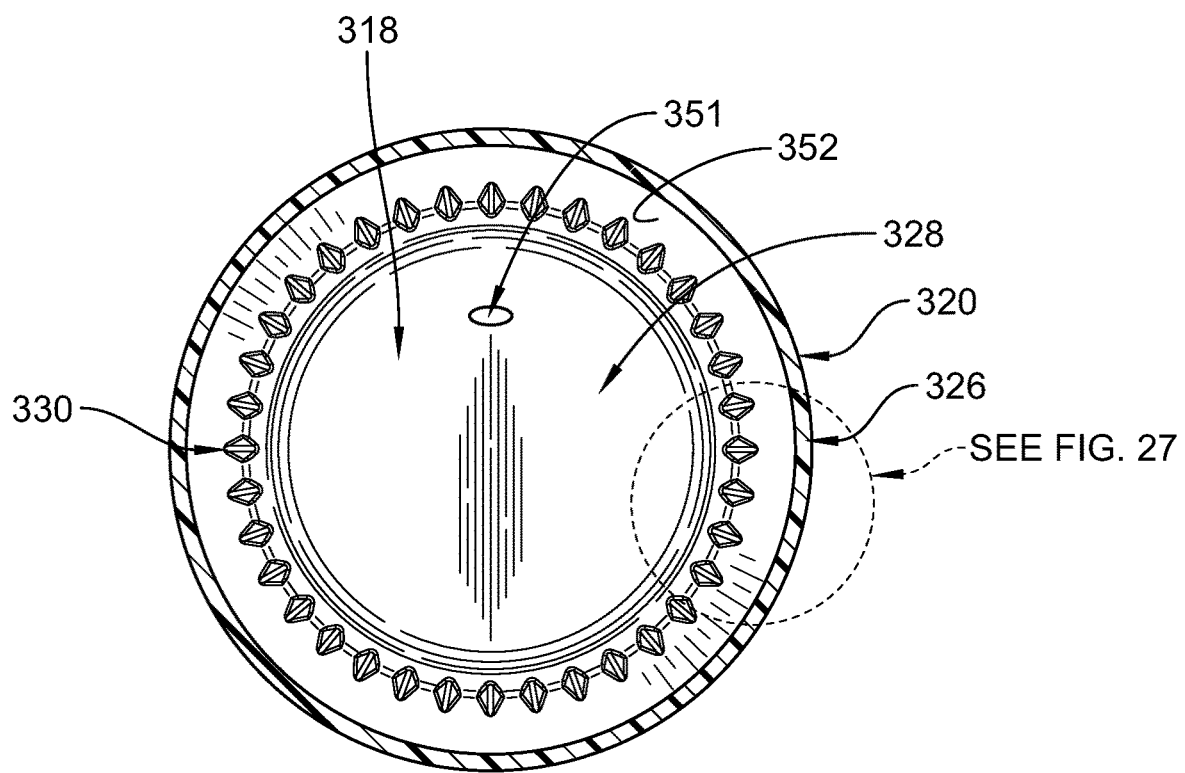
FIG. 26 is a sectional view taken along line 26-26 of FIG. 22 showing that the disc extends radially outward from the central axis towards the floor mount and that the frustoconical panel is formed to include a plurality of ribs that extend upwardly away from the floor mount.
Figure 27:
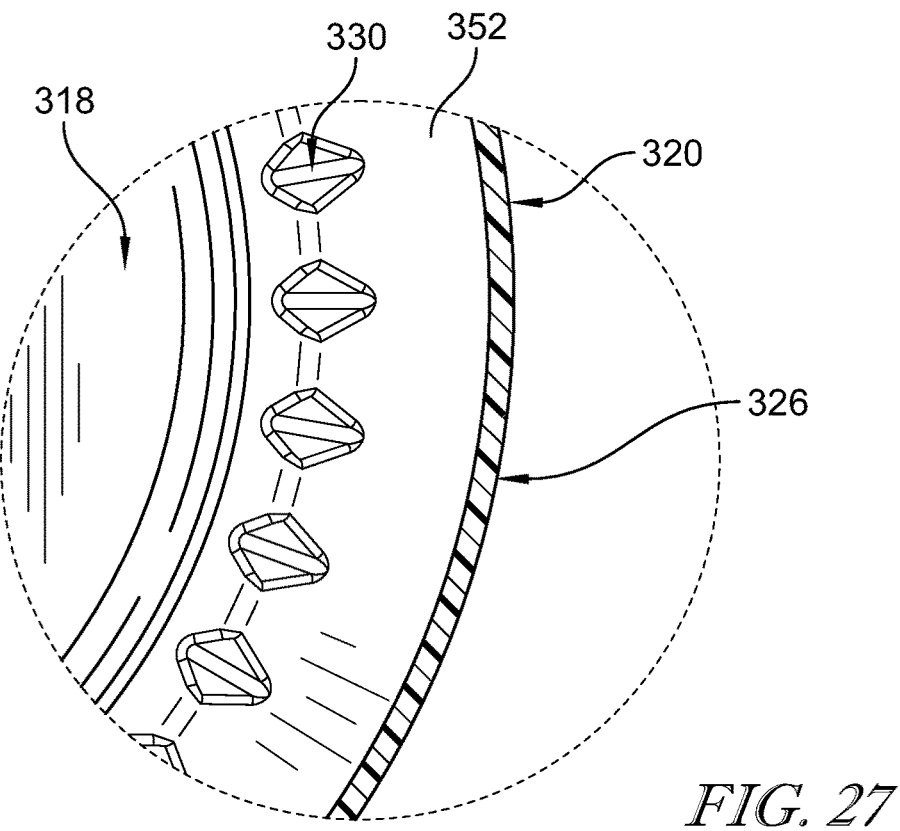
FIG. 27 is a detail view of the circled region of FIG. 26 showing that the ribs are circumferentially spaced-apart from one another.
Figure 28:
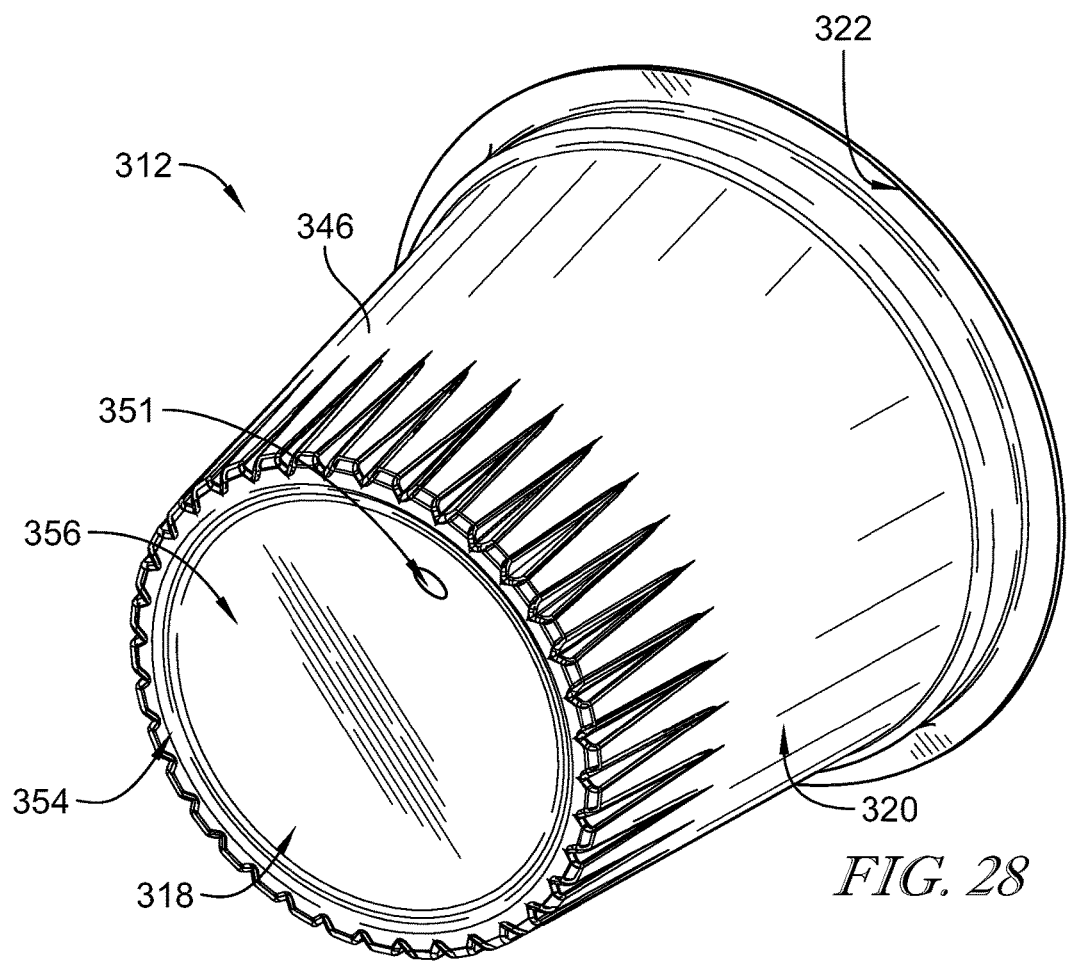
FIG. 28 is a bottom perspective view of the cup of FIGS. 20-27 showing the floor coupled to the side wall.
Figure 29:
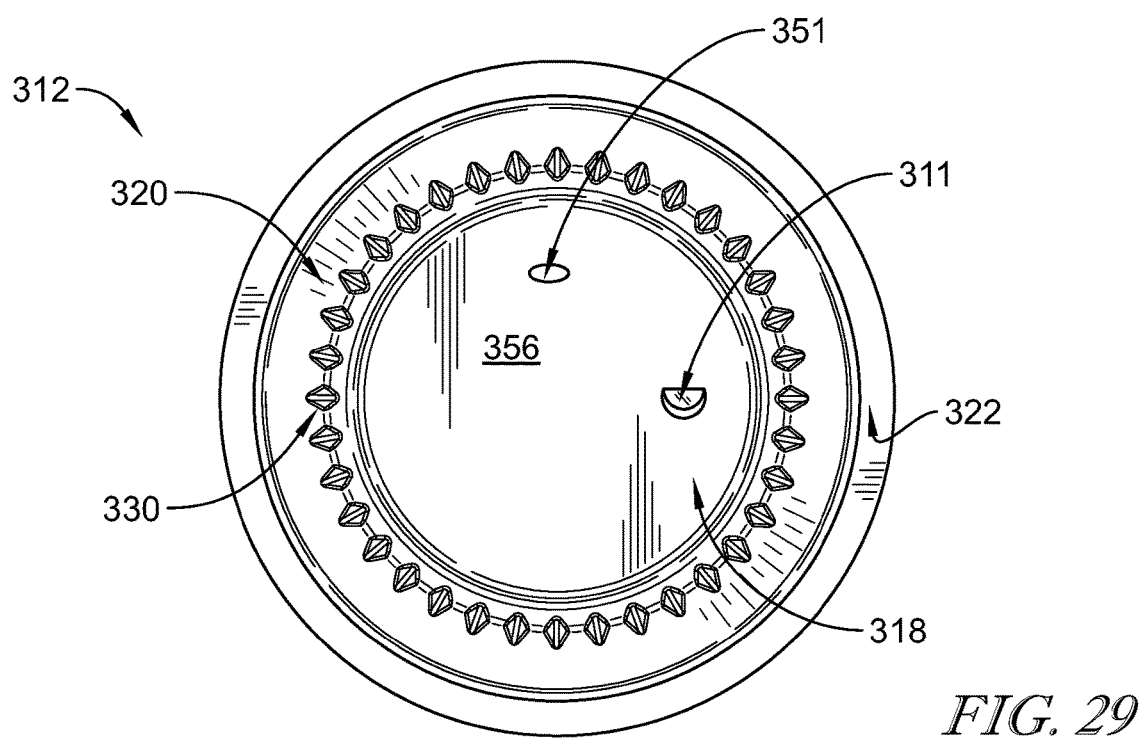
FIG. 29 is a bottom plan view of the cup of FIGS. 20-28 showing the floor after an outlet cannula pierced the floor to form a cannula aperture in the disc of the floor.

Fourth sublayer 350 of multi-layer sheet 316 is arranged to form inner surface 352 of cup 312 as shown in FIGS. 26 and 27. In an embodiment, fourth sublayer 350 is about 10% to about 40% of the total thickness multi-layer sheet 316. Fourth sublayer 350 may be one of several different percentages of the thickness of multi-layer sheet 16 or fall within one of several different ranges. The percentage thickness of fourth sublayer 350 of multi-layer sheet 316 may be one of the following values: about 10%, about 15%, about 16%, about 17%, about 18%, about 19%, about 20%, about 21%, about 22%, about 23%, about 24%, about 25%, about 30%, about 35%, or about 40% of the total thickness of multi-layer sheet 316. The percentage thickness of fourth sublayer 350 of multi-layer sheet 316 may fall within one of many different ranges. In a set of ranges, the thickness range of fourth sublayer 350 is one of the following ranges: about 10% to about 40%, about 10% to about 35%, about 10% to about 30%, about 15% to about 30%, or about 15% to about 25% of the total thickness of multi-layer sheet 316. In an embodiment, fourth sublayer 350 is about 19% of the total thickness of multi-layer sheet 316.

Fourth sublayer 350 may be a particular thickness or fall within one of several different ranges. The thickness of fourth sublayer 350 may be one of the following values: about 0.005 inches, about 0.006 inches, about 0.007 inches, about 0.008 inches, about 0.009 inches, about 0.01 inches, about 0.011 inches, about 0.012 inches, about 0.013 inches, about 0.014 inches, or about 0.015 inches thick. The thickness of fourth sublayer 350 may fall within one of many different ranges. In a set of ranges, the thickness of fourth sublayer 350 is one of the following ranges: about 0.005 inches to about 0.015 inches, about 0.006 inches to about 0.015 inches, about 0.007 inches to about 0.015 inches, about 0.008 inches to about 0.015 inches, about 0.008 inches to about 0.012 inches, about 0.009 inches to about 0.012 inches, or about 0.009 inches to about 0.011 inches thick.

In some embodiments, the composition of fourth sublayer 350 comprises a polyolefin. In some embodiments, the polyolefin is a polypropylene. In some embodiments, the polypropylene is a polypropylene copolymer. In some embodiments, the polypropylene copolymer is a propylene-ethylene copolymer. In some embodiments, the polypropylene copolymer is a polypropylene impact copolymer. In some embodiments, the polypropylene impact copolymer has a melt flow index of about 4 g/10 min as measured by ASTM D1238. In some embodiments, the polypropylene impact copolymer has a flexural modulus-1% secant of about 205,000 psi as measured by ASTMD790A. In some examples, the polypropylene impact copolymer is Braskem PP TI4040WT. In some embodiments, the polypropylene impact copolymer has a flexural modulus-1% secant of about 230,000 psi as measured by ASTMD790A. In some examples, the polypropylene impact copolymer has a flexural modulus-1% secant of about 195,000 psi as measured by ASTMD790A. In some embodiments, the polypropylene impact copolymer is ExxonMobil™ PP7032KN. In some embodiments, fourth sublayer 350 comprises a blend of at least two polyolefins. In some embodiments, fourth sublayer 350 comprises a blend of a first polypropylene impact copolymer and a second polypropylene impact copolymer.

The composition of fourth sublayer 350 may comprise one of several different percentages of a polyolefin or fall within one of several different ranges. The percentage by weight amount of the polyolefin may be selected from the following values: about 85%, about 90%, about 92%, about 93%, about 94%, or about 95%, about 95.5%, about 96%, about 96.1%, about 96.2%, about 96.3%, about 96.4%, about 96.5%, about 97%, about 98%, or about 99% by weight of the composition of fourth sublayer 350. The amount of the polyolefin may fall within a series of ranges including about 85% to about 99%, about 90% to about 99%, about 93% to about 99%, about 93% to about 98%, or about 95% to about 87% by weight of the composition of fourth sublayer 350. The various values and ranges described here are also applicable if the polyolefin is a polypropylene. The various values and ranges described here are also applicable if the polyolefin is a polypropylene impact copolymer. In some examples, the composition of fourth sublayer 350 comprises about 96.3% by weight of the composition a polypropylene impact copolymer.

In some embodiments, the composition of fourth sublayer 350 comprises a mineral filler. In some embodiments, the mineral filler comprises talc. In some embodiments, the mineral filler comprises $CaCO_3$. In some embodiments, the mineral filler further comprises a carrier resin. In some embodiments, the carrier resin is a polyolefin. In some embodiments, the polypropylene is a polypropylene copolymer. In some embodiments, the polyolefin is LLDPE. In some examples, the mineral filler is Heritage Plastics Heritage HT6HP. In some examples, the mineral filler is Heritage Plastics Heritage HT6P. In some other examples, the mineral filler is Heritage Plastics HM10®MAX. In some examples, the mineral filler is Heritage Plastics HiCal™ LC.

The composition of fourth sublayer 350 may comprise one of several different percentages of a mineral filler or fall within one of several different ranges. The percentage by weight amount of the mineral filler may be selected from the following values: about 1%, about 1.5%, about 2%, about 2.1%, about 2.2%, about 2.3%, about 2.4%, about 2.5%, about 2.6%, about 2.7%, about 2.8%, about 2.9%, about 3%, about 3.1%, about 3.2%, about 3.3%, about 3.5%, about 4%, or about 5% by weight of the composition of fourth sublayer 350. The amount of the mineral filler may fall within a series of ranges including about 1% to about 5%, about 1% to about 4%, about 1.5% to about 4%, about 1.5% to about 3.5%, or about 2% to about 3.5% by weight of the composition of fourth sublayer 350. The various values and ranges described here are also applicable if the mineral filler comprises talc. The various values and ranges described here are also applicable if the mineral filler comprises $CaCO_3$.

In one example, the composition of fourth sublayer 350 comprises about 2.7% by weight of the composition a mineral filler comprising talc. In one example, the composition of fourth sublayer 350 comprises about 2.7% by weight of the composition a mineral filler comprising $CaCO_3$.

In some embodiments, fourth sublayer 350 comprises a process aid. In some embodiments, the process aid comprises a fluoropolymer. In some embodiments, the process aid is available as a masterbatch and further comprises a carrier resin. In some embodiments, the carrier resin of the process aid is a polyolefin. In some embodiments, the polyolefin of the carrier resin is LLDPE. In some examples, the process aid is Ampacet 100458 Process Aid PE MB.

The composition of fourth sublayer 350 may comprise one of several different percentages of process aid or fall within one of several different ranges. The percentage by weight amount of the process aid may be selected from the following values: about 0.5%, about 0.6%, about 0.7%, about 0.8%, about 0.9%, about 1%, about 1.1%, about 1.2%, about 1.3%, about 1.4%, or about 1.5% by weight of the composition of fourth sublayer 50. The amount of the process aid may fall within a series of ranges including about 0.5% to about 1.5%, about 0.6% to about 1.5%, about 0.8% to about 1.5%, about 0.8% to about 1.3%, or about 0.8% to about 1.2% by weight of the composition of fourth sublayer 350. The various values and ranges described here are also applicable if the process aid is Ampacet 100458 Process Aid PE MB. In some examples, fourth sublayer 350 comprises about 1% by weight a process aid.

Figure 16:
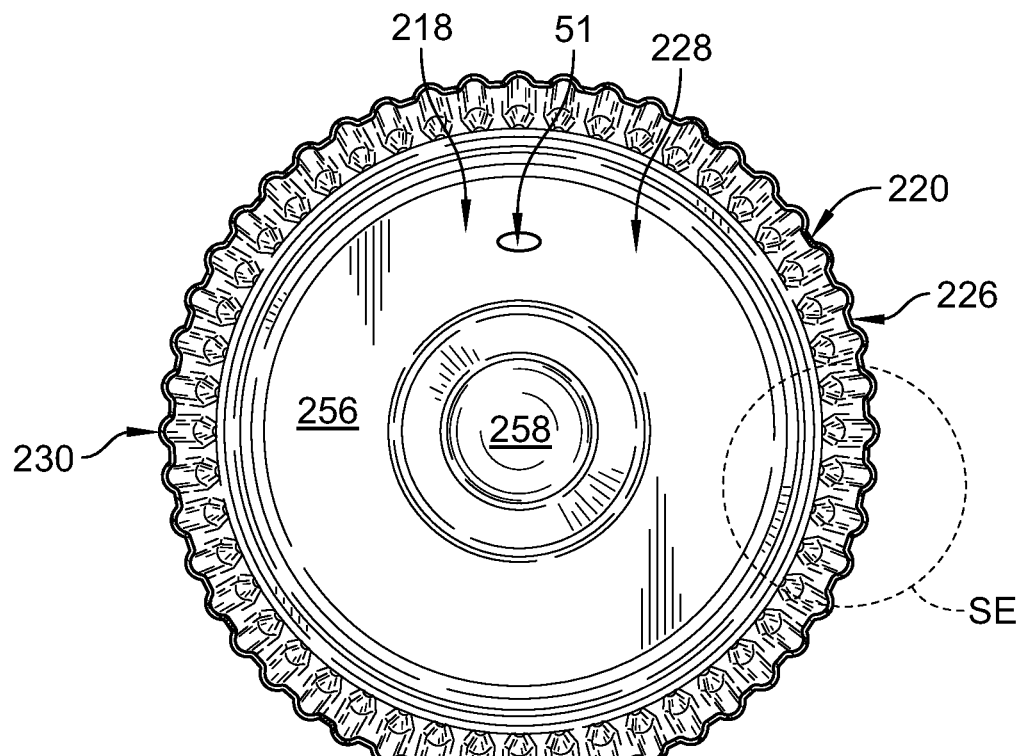
FIG. 16 is a sectional view taking along line 16-16 of FIG. 12 showing the floor dome and the disc extending from the floor dome towards the side wall, and further showing the frustoconical panel is formed to include a plurality of ribs that extend upwardly from the floor towards the stack shoulder.
Figure 17:
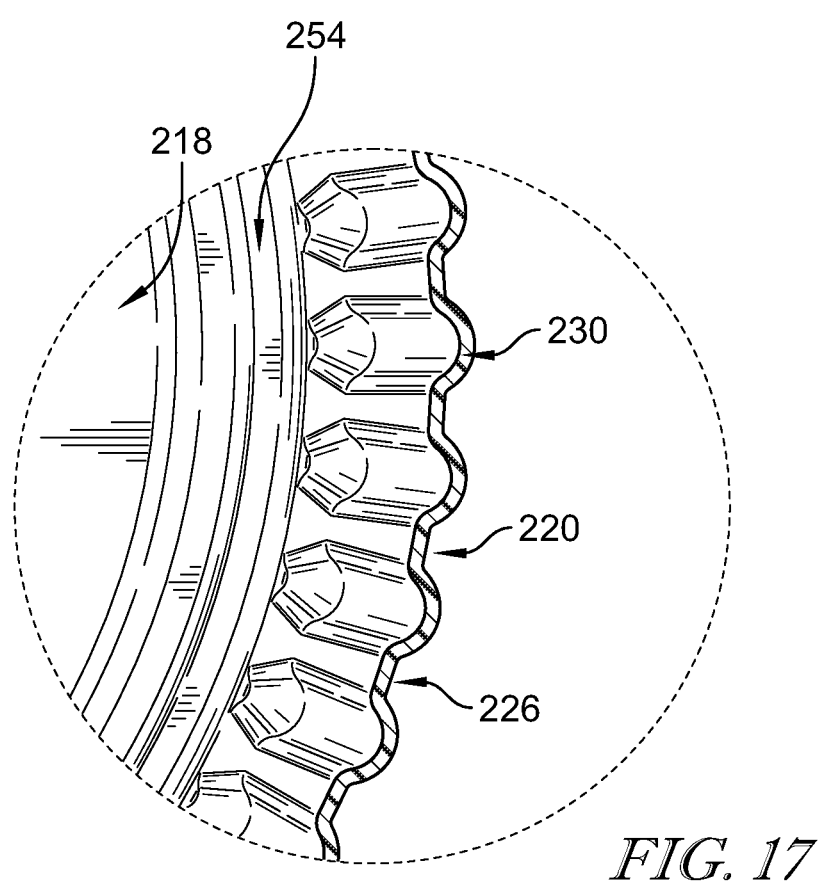
FIG. 17 is a detail view of the circled region of FIG. 16 showing the ribs are generally semi-circular and spaced-apart circumferentially from one another, and further showing the frustoconical panel is formed to include a plurality of side wall segments extending between the ribs.
Figure 18:
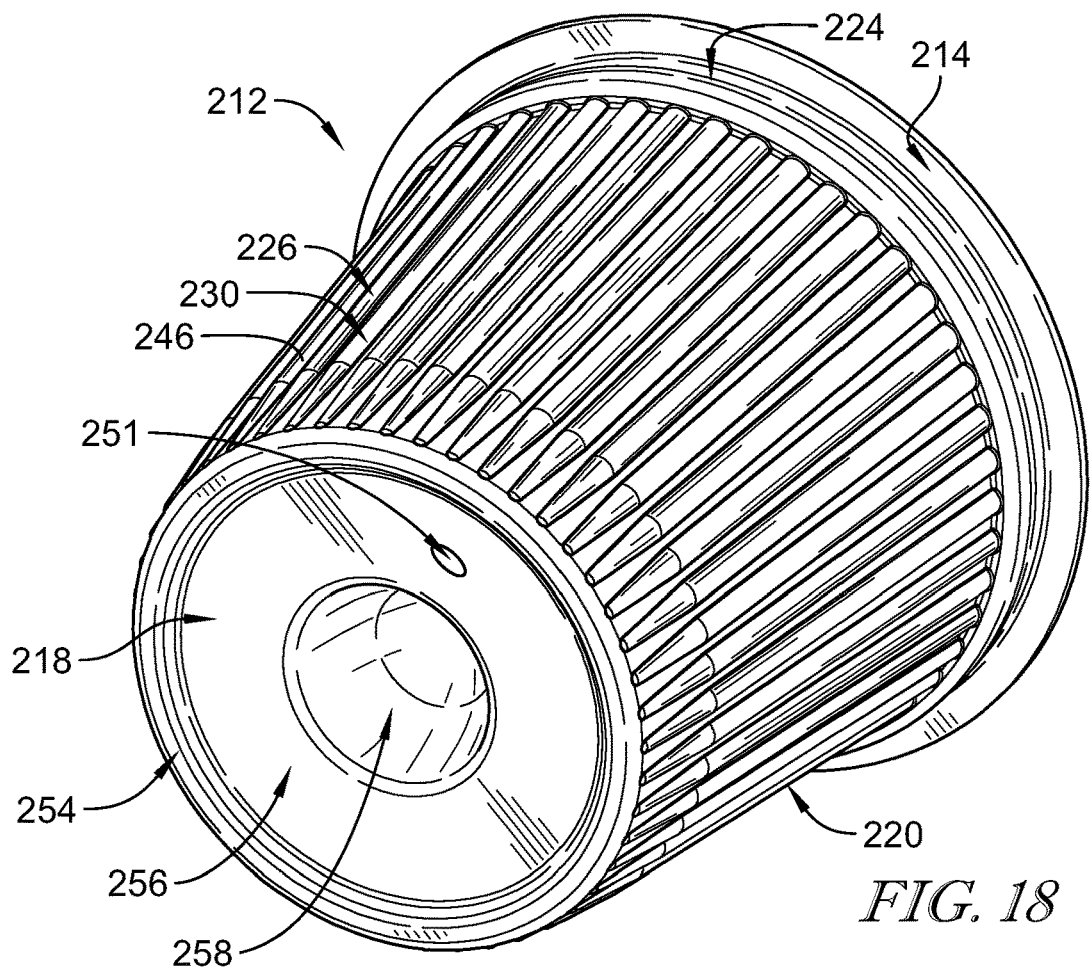
FIG. 18 is a perspective view of the cup of FIGS. 12-17 showing the floor coupled to the side wall and further showing the floor dome extending into the interior product-storage region.
Figure 19:
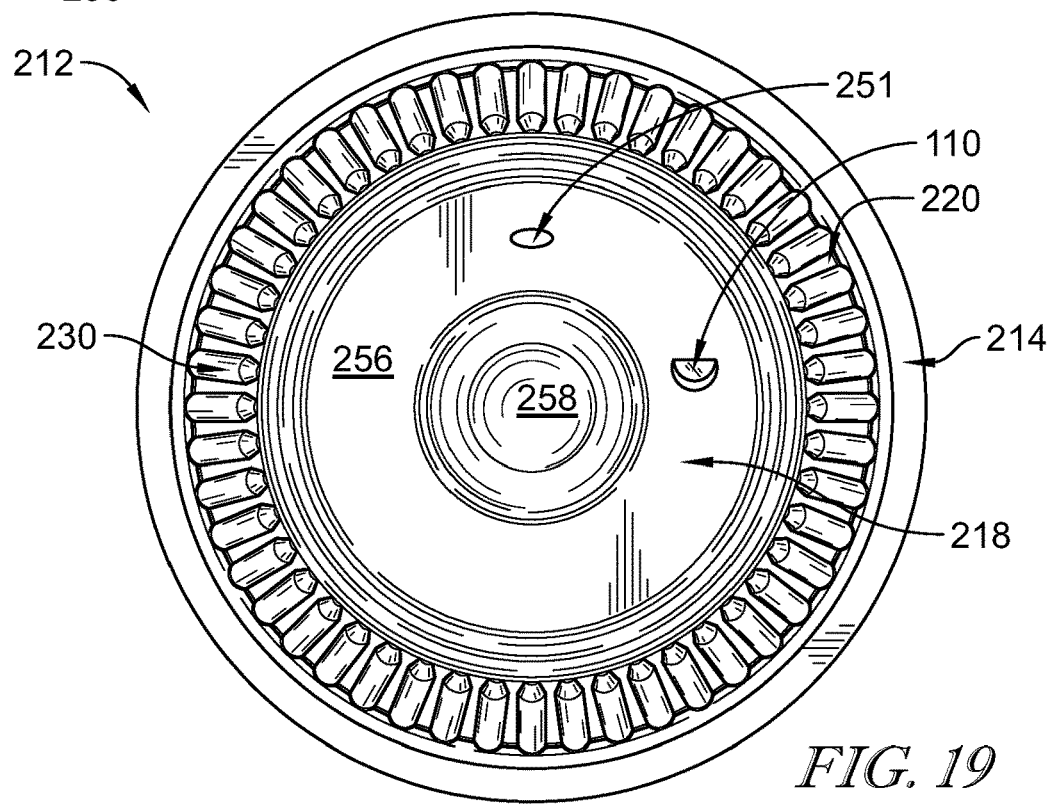
FIG. 19 is a bottom plan view of the cup of FIGS. 12-18 after the floor has been pierced by the outlet cannula and showing a cannula aperture formed in the disc of the floor.

Cups in accordance with the present disclosure are formed, for example, by thermoforming a multi-layer sheet in accordance with the present disclosure. During the thermoforming process, reinforcing ribs are formed in a side wall of the cup. Any suitable number of reinforcing ribs may be used. In one example, less than about 48 reinforcing ribs may be formed in the side wall. In one example, less than about 36 reinforcing ribs may be formed in the side wall. In one example, less than about 24 reinforcing ribs may be formed in the side wall. In one example, less than about 12 reinforcing ribs may be formed in the side wall. In one example, 48 reinforcing ribs may be formed in the side wall as shown in FIG. 16. In another example, 36 reinforcing ribs may be formed in the side wall as shown in FIG. 26. In yet another example, twelve reinforcing ribs may be formed in the side wall. Reference is hereby made to U.S. application Ser. No. 15/236,010 filed Aug. 12, 2016, and entitled BEVERAGE BREWING PACKAGE for disclosure relating to cups used in beverage brewing packages, which application is hereby incorporated in its entirety herein.

As described above, cups in accordance with the present disclosure may be formed by thermoforming a multi-layer sheet in accordance with the present disclosure. During the thermoforming process, the multi-layer sheet may be stretched and so that the thickness of the features of the cup 12, 212, 312 are thinner than the multi-layer sheet. In some embodiments, floor 18, 218, 318 may be about 0.01 to about 0.04 inches thick; side wall 20, 220, 320 may be about 0.005 inches to about 0.015 inches thick; brim 22, 222, 322 may be about 0.02 inches to about 0.04 inches thick.

EXAMPLES

The following examples are set forth for purposes of illustration only. Parts and percentages appearing in such examples are by weight unless otherwise stipulated. All ASTM, ISO, and other standard test methods cited or referred to in this disclosure are incorporated by reference in their entirety.

Example 1

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 1 to correlate the sublayer composition with the sublayer thickness.

A first sublayer (1.1) comprised a base resin, a mineral filler, a colorant, and a process aid. The base resin was Braskem PP TI4040WT. The mineral filler was Heritage Plastics HT6HP talc. The colorant was Ampacet 112761 White PE MB. The process aid was Ampacet 100458 Process Aid PE MB. The percentages by weight of the components were about:

| | |
|---|---|
| 91.3% | Braskem PP TI4040WT |
| 2.7% | Heritage Plastics HT6HP |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (1.2) comprised a base resin, a regrind, and a compatibilizer. The base resin was Braskem PP TI4040WT. The regrind was formed as described herein. The compatibilizer was EVAL® GF-30. The percentages by weight of the components were about:

| | |
|---|---|
| 12% | Braskem PP TI4040WT |
| 85% | Regrind |
| 3% | EVAL ® GF-30 |

The base resin, the regrind, and the compatibilizer were added to an extruder hopper and combined via blending to provide a formulation. The formulation was then heated in the extruder to form a molten material.

A third sublayer (1.3) comprised a base resin, a mineral filler, and a process aid. The base resin was Braskem PP TI4040WT. The mineral filler was Heritage Plastics HT6HP talc. The process aid was Ampacet 100458 Process Aid PE MB. The percentages by weight of the components were about:

| | |
|---|---|
| 96.3% | Braskem PP TI4040WT |
| 2.7% | Heritage Plastics HT6HP |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (1.4) comprised an adhesive. The adhesive was Mitsui ADMER® QF551A. The adhesive was added to an extruder hopper and then heated in the extruder to form a molten material.

A barrier layer (1.5) comprised a barrier material. The barrier material was Kuraray Co., Ltd. EVAL™ LT171B. The barrier material was added to an extruder hopper and then heated in the extruder to form a molten material.

A second-compatibility layer (1.6) comprised an adhesive. The adhesive was Mitsui ADMER® QF551A. The adhesive was added to an extruder hopper and then heated in the extruder to form a molten material.

A fourth sublayer (1.7) comprised a base resin, a mineral filler, and a process aid. The base resin was Braskem PP TI4040WT. The mineral filler was Heritage Plastics HT6HP talc. The process aid was Ampacet 100458 Process Aid PE MB. The percentages by weight of the components were about:

| | |
|---|---|
| 96.3% | Braskem PP TI4040WT |
| 2.7% | Heritage Plastics HT6HP |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.954 g/cm$^3$, and with layer thicknesses as described in Table 1.

TABLE 1

Target Layer Thicknesses

| Layer | Thickness (%) | Thickness (inches) |
|---|---|---|
| 1.1 | 20 | 0.01 |
| 1.2 | 63 | 0.0315 |
| 1.3 | 2 | 0.001 |
| 1.4 | 1 | 0.0005 |
| 1.5 | 3 | 0.0015 |
| 1.6 | 1 | 0.0005 |
| 1.7 | 10 | 0.005 |

The multi-layer sheet was thermoformed to form a cup in accordance with the present disclosure.

Example 2

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 2 to correlate the sublayer composition with the sublayer thickness.

A first sublayer (2.1) comprised a base resin, a mineral filler, a process aid, and a colorant. The base resin was Braskem PP TI4040WT. The mineral filler was Heritage Plastics HM10® MAX CaCO$_3$ concentrate. The colorant was Ampacet 112761 White PE MB. The process aid was Ampacet 100458 Process Aid PE MB. The percentages by weight of the components were about:

| | |
|---|---|
| 91.3% | Braskem PP TI4040WT |
| 2.7% | Heritage Plastics HM10 ® MAX |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (2.2) comprised a base resin, a regrind, and a compatibilizer. The base resin was Braskem PP TI4040WT. The regrind was formed as described herein. The compatibilizer was EVAL® GF-30. The percentages by weight of the components were about:

| | |
|---|---|
| 12% | Braskem PP TI4040WT |
| 85% | Regrind |
| 3% | EVAL ® GF-30 |

The base resins and the compatibilizer were added to an extruder hopper and combined via blending to provide a formulation. The formulation was then heated in the extruder to form a molten material.

A third sublayer (2.3) comprised a base resin, a mineral filler, and a process aid. The base resin was Braskem PP TI4040WT. The mineral filler was Heritage Plastics HM10® MAX CaCO$_3$ concentrate. The process aid was Ampacet 100458 Process Aid PE MB. The percentages by weight of the components were about:

| | |
|---|---|
| 96.3% | Braskem PP TI4040WT |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (2.4) comprised an adhesive. The adhesive was Mitsui ADMER® QF551A. The adhesive was added to an extruder hopper and then heated in the extruder to form a molten material.

A barrier layer (2.5) comprised a barrier material. The barrier material was Kuraray Co., Ltd. EVAL™ LT171B. The barrier material was added to an extruder hopper and then heated in the extruder to form a molten material.

A second-compatibility layer (2.6) comprised an adhesive. The adhesive was Mitsui ADMER® QF551A. The adhesive was added to an extruder hopper and then heated in the extruder to form a molten material.

A fourth sublayer (2.7 comprised a base resin, a mineral filler, and a process aid. The base resin was Braskem PP TI4040WT. The mineral filler was Heritage Plastics HM10® MAX CaCO$_3$ concentrate. The process aid was Ampacet 100458 Process Aid PE MB. The percentages by weight of the components were about:

| | |
|---|---|
| 96.3% | Braskem PP TI4040WT |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.950 g/cm$^3$, and with layer thicknesses as described in Table 2.

TABLE 2

| Target Layer Thicknesses | | |
|---|---|---|
| Layer | Thickness (%) | Thickness (inches) |
| 2.1 | 20 | 0.01 |
| 2.2 | 63 | 0.0315 |
| 2.3 | 2 | 0.001 |
| 2.4 | 1 | 0.0005 |

TABLE 2-continued

| Target Layer Thicknesses | | |
|---|---|---|
| Layer | Thickness (%) | Thickness (inches) |
| 2.5 | 3 | 0.0015 |
| 2.6 | 1 | 0.0005 |
| 2.7 | 10 | 0.005 |

The multi-layer sheet was thermoformed to form a cup in accordance with the present disclosure.

Example 3

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 3 to correlate the sublayer composition with the sublayer thickness.

A first sublayer (3.1) comprised a base resin, a mineral filler, a colorant, and a process aid. The base resin was Braskem PP TI4040WT. The mineral filler was Heritage Plastics HM10® MAX CaCO$_3$ concentrate. The colorant was Ampacet 192434 Kosher FDA Black PE MB. The process aid was Ampacet 100458 Process Aid PE MB. The percentages by weight of the components were about:

| | |
|---|---|
| 91.3% | Braskem PP TI4040WT |
| 2.7% | Heritage Plastics HM10 ® MAX |
| 5% | Ampacet 192434 Kosher FDA Black PE MB |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (3.2) comprised a base resin, a regrind, and a compatibilizer. The base resin was Braskem PP TI4040WT. The regrind was formed as described herein. The compatibilizer was EVAL® GF-30. The percentages by weight of the components were about:

| | |
|---|---|
| 12% | Braskem PP TI4040WT |
| 85% | Regrind |
| 3% | EVAL ® GF-30 |

The base resins and the compatibilizer were added to an extruder hopper and combined via blending to provide a formulation. The formulation was then heated in the extruder to form a molten material.

A third sublayer (3.3) comprised a base resin, a mineral filler, and a process aid. The base resin was Braskem PP TI4040WT. The mineral filler was Heritage Plastics HM10® MAX CaCO$_3$ concentrate. The process aid was Ampacet 100458 Process Aid PE MB. The percentages by weight of the components were about:

| | |
|---|---|
| 96.3% | Braskem PP TI4040WT |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (3.4) comprised an adhesive. The adhesive was Mitsui ADMER® QF551A. The adhesive was added to an extruder hopper and then heated in the extruder to form a molten material.

A barrier layer (3.5) comprised a barrier material. The barrier material was Kuraray Co., Ltd. EVAL™ LT171B. The barrier material was added to an extruder hopper and then heated in the extruder to form a molten material.

A second-compatibility layer (3.6) comprised an adhesive. The adhesive was Mitsui ADMER® QF551A. The adhesive was added to an extruder hopper and then heated in the extruder to form a molten material.

A fourth sublayer (3.7) comprised a base resin, a mineral filler, and a process aid. The base resin was Braskem PP TI4040WT. The mineral filler was Heritage Plastics HM10® MAX CaCO$_3$ concentrate. The process aid was Ampacet 100458 Process Aid PE MB. The percentages by weight of the components were about:

| 96.3% | Braskem PP TI4040WT |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.948 g/cm$^3$, and with layer thicknesses as described in Table 3.

TABLE 3

| Target Layer Thicknesses | | |
|---|---|---|
| Layer | Thickness (%) | Thickness (inches) |
| 3.1 | 20 | 0.01 |
| 3.2 | 63 | 0.0315 |
| 3.3 | 2 | 0.001 |
| 3.4 | 1 | 0.0005 |
| 3.5 | 3 | 0.0015 |
| 3.6 | 1 | 0.0005 |
| 3.7 | 10 | 0.005 |

The multi-layer sheet was thermoformed to form a cup in accordance with the present disclosure.

Example 4

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 4 to correlate the sublayer composition with the sublayer thickness.

A first sublayer (4.1) comprised a base resin, a mineral filler, a colorant, and a process aid. The base resin was Braskem PP TI4040WT. The mineral filler was Heritage Plastics HT6HP talc. The colorant was Ampacet 192434 Kosher FDA Black PE MB. The process aid was Ampacet 100458 Process Aid PE MB. The percentages by weight of the components were about:

| 91.3% | Braskem PP TI4040WT |
| 2.7% | Heritage Plastics HT6HP |
| 5% | Ampacet 192434 Kosher FDA Black PE MB |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (4.2) comprised a base resin, a regrind, and a compatibilizer. The base resin was Braskem PP TI4040WT. The regrind was formed as described herein. The compatibilizer was EVAL® GF-30. The percentages by weight of the components were about:

| 12% | Braskem PP TI4040WT |
| 85% | Regrind |
| 3% | EVAL ® GF-30 |

The base resins and the compatibilizer were added to an extruder hopper and combined via blending to provide a formulation. The formulation was then heated in the extruder to form a molten material.

A third sublayer (4.3) comprised a base resin, a mineral filler, and a process aid. The base resin was Braskem PP TI4040WT. The mineral filler was Heritage Plastics HT6HP talc. The process aid was Ampacet 100458 Process Aid PE MB. The percentages by weight of the components were about:

| 96.3% | Braskem PP TI4040WT |
| 2.7% | Heritage Plastics HT6HP |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (4.4) comprised an adhesive. The adhesive was Mitsui ADMER® QF551A. The adhesive was added to an extruder hopper and then heated in the extruder to form a molten material.

A barrier layer (4.5) comprised a barrier material. The barrier material was Kuraray Co., Ltd. EVAL™ LT171B. The barrier material was added to an extruder hopper and then heated in the extruder to form a molten material.

A second-compatibility layer (4.6) comprised an adhesive. The adhesive was Mitsui ADMER® QF551A. The adhesive was added to an extruder hopper and then heated in the extruder to form a molten material.

A fourth sublayer (4.7) comprised a base resin, a mineral filler, and a process aid. The base resin was Braskem PP TI4040WT. The mineral filler was Heritage Plastics HT6HP talc. The process aid was Ampacet 100458 Process Aid PE MB. The percentages by weight of the components were about:

| 96.3% | Braskem PP TI4040WT |
| 2.7% | Heritage Plastics HT6HP |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.942 g/cm$^3$, and with layer thicknesses as described in Table 4.

TABLE 4

| Target Layer Thicknesses | | |
|---|---|---|
| Layer | Thickness (%) | Thickness (inches) |
| 4.1 | 20 | 0.01 |
| 4.2 | 63 | 0.0315 |
| 4.3 | 2 | 0.001 |
| 4.4 | 1 | 0.0005 |
| 4.5 | 3 | 0.0015 |
| 4.6 | 1 | 0.0005 |
| 4.7 | 10 | 0.005 |

The multi-layer sheet was thermoformed to form a cup in accordance with the present disclosure.

Example 5

Cup Performance

The instant example is provided to evaluate the properties of the exemplary multi-layer sheet. The multi-layer sheets formed in Examples 1-4 were thermoformed to make cups. The cups were placed in a cup holder of a brewing machine (Model B31, Model K130, Model K200, or Model K300) so that the multi-layer sheet of the cup was in either the machine direction, the transverse direction, or a random direction. Cups were either placed in the machine direction (about 90° from an indicator 51), the transverse direction (about 180° from indicator 51), or randomly. The lid of the brewing machine was closed causing a cannula of the brewing machine to apply a force the floor of the cup. 30 cups were tested for each brewing machine in each sheet direction for each multi-layer sheet from Examples 1-4. Puncture quality was analyzed and cups showing fracturing or failed puncture did not pass. The results can be seen in Table 5.

Example 6

Cup Performance

The instant example is provided to evaluate the properties of the exemplary multi-layer sheet. The multi-layer sheets formed in Examples 1-4 were thermoformed to make cups. The cups were placed in a cup holder of a brewing machine (Model B31, Model K130, Model K200, or Model K300) so that the multi-layer sheet of the cup was in either the machine direction, the transverse direction, or a random direction. Cups were either placed in the machine direction (about 90° from indicator 51), the transverse direction (about 180° from indicator 51), or randomly. The lid of the brewing machine was closed causing a cannula of the brewing machine to apply a force the floor of the cup. 30 cups were tested for each brewing machine in each sheet direction for each multi-layer sheet from Examples 1-4. Puncture quality was analyzed and cups showing fracturing or failed puncture did not pass. The results can be seen in Table 6.

TABLE 6

| | Puncture Results | | | | | | | | | | | |
|---|---|---|---|---|---|---|---|---|---|---|---|---|
| | Model B31 | | | Model K130 | | | Model K200 | | | Model K300 | | |
| | | | | MD | TD | | | TD | Random | | TD | Random |
| Ex. | MD (% pass) | TD (% pass) | Random (% pass) | (% pass) | (% pass) | Random (% pass) | MD (% pass) | (% pass) | (% pass) | MD (% pass) | (% pass) | (% pass) |
| 1 | 30 (100) | 30 (100) | 30 (100) | 29 (97) | 30 (100) | 30 (100) | 29 (97) | 28 (93) | 29 (97) | 22 | 28 (93) | 19 (63) |
| 2 | 30 (100) | 30 (100) | 30 (100) | 28 (93) | 30 (100) | 29 (97) | 30 (100) | 30 (100) | 29 (97) | 15 (50) | 26 (87) | 23 (77) |
| 3 | 30 (100) | 30 (100) | 30 (100) | 30 (100) | 30 (100) | 30 (100) | 30 (100) | 30 (100) | 30 (100) | 29 (97) | 29 (97) | 27 (90) |
| 4 | 30 (100) | 30 (100) | 30 (100) | 30 (100) | 30 (100) | 30 (100) | 30 (100) | 29 (97) | 30 (100) | 30 (100) | 28 (93) | 24 (80) |

Example 7

Cup Performance

The instant example is provided to evaluate the properties of the exemplary multi-layer sheet. The multi-layer sheets formed in Examples 1-4 were thermoformed to make cups. The cups were placed in a cup holder of a brewing machine (Model B31, Model K130, Model K200, or Model K300) so that the multi-layer sheet of the cup was in either the machine direction, the transverse direction, or a random direction. Cups were either placed in the machine direction (about 90° from indicator 51), the transverse direction (about 180° from indicator 51), or randomly. The lid of the brewing machine was closed causing a cannula of the brewing machine to apply a force the floor of the cup. 30 cups were tested for each brewing machine in each sheet direction for each multi-layer sheet from Examples 1-4.

TABLE 5

| | Puncture Results | | | | | | | | | | | |
|---|---|---|---|---|---|---|---|---|---|---|---|---|
| | Model B31 | | | Model K130 | | | Model K200 | | | Model K300 | | |
| | | | | MD | TD | | | TD | | MD | TD | |
| Ex. | MD (% pass) | TD (% pass) | Random (% pass) | (% pass) | (% pass) | Random (% pass) | MD (% pass) | (% pass) | Random (% pass) | (% pass) | (% pass) | Random (% pass) |
| 1 | 30 (100) | 30 (100) | 30 (100) | 28 (93) | 28 (93) | 29 (97) | 29 (97) | 28 (93) | 28 (93) | 30 (100) | 30 (100) | 29 (97) |
| 2 | 30 (100) | 30 (100) | 30 (100) | 28 (93) | 26 (87) | 25 (83) | 30 (100) | 27 (90) | 27 (90) | 30 (100) | 30 (100) | 29 (97) |
| 3 | 30 (100) | 30 (100) | 30 (100) | 30 (100) | 30 (100) | 30 (100) | 30 (100) | 30 (100) | 30 (100) | 30 (100) | 30 (100) | 30 (100) |
| 4 | 30 (100) | 30 (100) | 30 (100) | 30 (100) | 29 (97) | 29 (97) | 30 (100) | 30 (100) | 29 (97) | 30 (100) | 30 (100) | 30 (100) |

Puncture quality was analyzed and cups showing fracturing or failed puncture did not pass. The results can be seen in Table 7.

MAX CaCO₃ concentrate. The process aid was Ampacet 100458 Process Aid PE MB. The percentages by weight of the components were about:

TABLE 7

Puncture Results

| | Model B31 | | | Model K130 | | | Model K200 | | | Model K300 | | |
|---|---|---|---|---|---|---|---|---|---|---|---|---|
| | MD | TD | Random | MD | TD | Random | MD | TD | Random | MD | TD | Random |
| Ex. | (% pass) | (% pass) | (% pass) | (% pass) | (% pass) | (% pass) | (% pass) | (% pass) | (% pass) | (% pass) | (% pass) | (% pass) |
| 1 | 30 (100) | 30 (100) | 30 (100) | 28 (93) | 28 (93) | 29 (97) | 29 (97) | 28 (93) | 28 (93) | 30 (100) | 30 (100) | 29 (97) |
| 2 | 30 (100) | 30 (100) | 30 (100) | 28 (93) | 26 (87) | 25 (83) | 30 (100) | 27 (90) | 27 (90) | 30 (100) | 30 (100) | 29 (97) |
| 3 | 30 (100) | 30 (100) | 30 (100) | 30 (100) | 30 (100) | 30 (100) | 30 (100) | 30 (100) | 30 (100) | 30 (100) | 30 (100) | 30 (100) |
| 4 | 30 (100) | 30 (100) | 30 (100) | 30 (100) | 29 (97) | 29 (97) | 30 (100) | 30 (100) | 29 (97) | 30 (100) | 30 (100) | 30 (100) |

Example 8

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 8 to correlate the sublayer composition with the sublayer thickness.

A first sublayer (5.1) comprised a base resin, a mineral filler, a colorant, and a process aid. The base resin was Braskem PP TI4040WT. The mineral filler was Heritage Plastics HM10® MAX CaCO₃ concentrate. The colorant was Ampacet 192434 Kosher FDA Black PE MB. The process aid was Ampacet 100458 Process Aid PE MB. The percentages by weight of the components were about:

| | |
|---|---|
| 92.9% | Braskem PP TI4040WT |
| 3.1% | Heritage Plastics HM10® MAX |
| 3% | Ampacet 192434 Kosher FDA Black PE MB |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (5.2) comprised a base resin, a regrind, and a compatibilizer. The base resin was Braskem PP TI4040WT. The regrind was formed as described herein. The compatibilizer was EVAL® GF-30. The percentages by weight of the components were about:

| | |
|---|---|
| 12% | Braskem PP TI4040WT |
| 85% | Regrind |
| 3% | EVAL® GF-30 |

The base resins and the compatibilizer were added to an extruder hopper and combined via blending to provide a formulation. The formulation was then heated in the extruder to form a molten material.

A third sublayer (5.3) comprised a base resin, a mineral filler, and a process aid. The base resin was Braskem PP TI4040WT. The mineral filler was Heritage Plastics HM10® MAX CaCO₃ concentrate. The process aid was Ampacet 100458 Process Aid PE MB. The percentages by weight of the components were about:

| | |
|---|---|
| 95.9% | Braskem PP TI4040WT |
| 3.1% | Heritage Plastics HM10® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (5.4) comprised an adhesive. The adhesive was Mitsui ADMER® QF551A. The adhesive was added to an extruder hopper and then heated in the extruder to form a molten material.

A barrier layer (5.5) comprised a barrier material. The barrier material was Kuraray Co., Ltd. EVAL™ LT171B. The barrier material was added to an extruder hopper and then heated in the extruder to form a molten material.

A second-compatibility layer (5.6) comprised an adhesive. The adhesive was Mitsui ADMER® QF551A. The adhesive was added to an extruder hopper and then heated in the extruder to form a molten material.

A fourth sublayer (5.7) comprised a base resin and a process aid. The base resin was Braskem PP TI4040WT. The process aid was Ampacet 100458 Process Aid PE MB. The percentages by weight of the components were about:

| | |
|---|---|
| 99% | Braskem PP TI4040WT |
| 1% | Ampacet 100458 Process Aid PE MB |

The base resin and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.937 g/cm³, and with layer thicknesses as described in Table 8.

TABLE 8

Target Layer Thicknesses

| Layer | Thickness (%) | Thickness (inches) |
|---|---|---|
| 5.1 | 20 | 0.01 |
| 5.2 | 63 | 0.0315 |
| 5.3 | 2 | 0.001 |
| 5.4 | 1 | 0.0005 |

TABLE 8-continued

| Target Layer Thicknesses | | |
|---|---|---|
| Layer | Thickness (%) | Thickness (inches) |
| 5.5 | 3 | 0.0015 |
| 5.6 | 1 | 0.0005 |
| 5.7 | 10 | 0.005 |

The multi-layer sheet was thermoformed to form a cup in accordance with the present disclosure.

Example 9

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 9 to correlate the sublayer composition with the sublayer thickness. The instant example is provided to evaluate the properties of the exemplary multi-layer sheet.

A first sublayer (6.1) comprised a base resin, a mineral filler, a colorant and a process aid. The base resin was Braskem PP TI4040WT. The mineral filler was Heritage Plastics HM10® MAX CaCO₃. The colorant was Ampacet 192434 Kosher FDA Black PE MB. The process aid was Ampacet 100458 Process Aid PE MB. The percentages by weight of the components were about:

| | |
|---|---|
| 93.3% | Braskem PP TI4040WT |
| 2.7% | Heritage Plastics HM10 ® MAX |
| 3% | Ampacet 192434 Kosher FDA Black PE MB |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (6.2) comprised a base resin, a regrind, and a compatibilizer. The base resin was Braskem PP TI4040WT. The regrind was formed as described herein. The compatibilizer was EVAL® GF-30. The percentages by weight of the components were about:

| | |
|---|---|
| 12% | Braskem PP TI4040WT |
| 85% | Regrind |
| 3% | EVAL ® GF-30 |

The base resins and the compatibilizer were added to an extruder hopper and combined via blending to provide a formulation. The formulation was then heated in the extruder to form a molten material.

A third sublayer (6.3) comprised a base resin, a mineral filler, and a process aid. The base resin was Braskem PP TI4040WT. The mineral filler was Heritage Plastics HM10® MAX CaCO₃ concentrate. The process aid was Ampacet 100458 Process Aid PE MB. The percentages by weight of the components were about:

| | |
|---|---|
| 96.3% | Braskem PP TI4040WT |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (6.4) comprised an adhesive. The adhesive was Mitsui ADMER® QF551A. The adhesive was added to an extruder hopper and then heated in the extruder to form a molten material.

A barrier layer (6.5) comprised a barrier material. The barrier material was Kuraray Co., Ltd. EVAL™ LT171B. The barrier material was added to an extruder hopper and then heated in the extruder to form a molten material.

A second-compatibility layer (6.6) comprised an adhesive. The adhesive was Mitsui ADMER® QF551A. The adhesive was added to an extruder hopper and then heated in the extruder to form a molten material.

A fourth sublayer (6.7) comprised a base resin, a mineral filler, and a process aid. The base resin was Braskem PP TI4040WT. The mineral filler was Heritage Plastics HM10® MAX CaCO₃ concentrate. The process aid was Ampacet 100458 Process Aid PE MB. The percentages by weight of the components were about:

| | |
|---|---|
| 96.3% | Braskem PP TI4040WT |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.938 g/cm³, and with layer thicknesses as described in Table 9.

TABLE 9

| Target Layer Thicknesses | | |
|---|---|---|
| Layer | Thickness (%) | Thickness (inches) |
| 6.1 | 20 | 0.01 |
| 6.2 | 63 | 0.0315 |
| 6.3 | 2 | 0.001 |
| 6.4 | 1 | 0.0005 |
| 6.5 | 3 | 0.0015 |
| 6.6 | 1 | 0.0005 |
| 6.7 | 10 | 0.005 |

The multi-layer sheet was thermoformed to form a cup in accordance with the present disclosure.

Example 10

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 10 to correlate the sublayer composition with the sublayer thickness. The instant example is provided to evaluate the properties of the exemplary multi-layer sheet.

A first sublayer (7.1) comprised a base resin, a mineral filler, a colorant, and a process aid. The base resin was Braskem PP TI4040WT. The mineral filler was Heritage Plastics HM10® MAX CaCO₃ concentrate. The colorant was Ampacet 192434 Kosher FDA Black PE MB. The process aid was Ampacet 100458 Process Aid PE MB. The percentages by weight of the components were about:

| 92.9% | Braskem PP TI4040WT |
| 3.1% | Heritage Plastics HM10 ® MAX |
| 3% | Ampacet 192434 Kosher FDA Black PE MB |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (7.2) comprised a base resin, a regrind, and a compatibilizer. The base resin was Braskem PP TI4040WT. The regrind was formed as described herein. The compatibilizer was EVAL® GF-30. The percentages by weight of the components were about:

| 12% | Braskem PP TI4040WT |
| 85% | Regrind |
| 3% | EVAL ® GF-30 |

The base resins and the compatibilizer were added to an extruder hopper and combined via blending to provide a formulation. The formulation was then heated in the extruder to form a molten material.

A third sublayer (7.3) comprised a base resin, a mineral filler, and a process aid. The base resin was Braskem PP TI4040WT. The mineral filler was Heritage Plastics HM10® MAX CaCO₃ concentrate. The process aid was Ampacet 100458 Process Aid PE MB. The percentages by weight of the components were about:

| 95.9% | Braskem PP TI4040WT |
| 3.1% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

A first-compatibility layer (7.4) comprised an adhesive. The adhesive was Mitsui ADMER® QF551A. The adhesive was added to an extruder hopper and then heated in the extruder to form a molten material.

A barrier layer (7.5) comprised a barrier material. The barrier material was Kuraray Co., Ltd. EVAL™ LT171B. The barrier material was added to an extruder hopper and then heated in the extruder to form a molten material.

A second-compatibility layer (7.6) comprised an adhesive. The adhesive was Mitsui ADMER® QF551A. The adhesive was added to an extruder hopper and then heated in the extruder to form a molten material.

A fourth sublayer (7.7) comprised a base resin and a process aid. The base resin was Braskem PP TI4040WT. The process aid was Ampacet 100458 Process Aid PE MB. The percentages by weight of the components were about:

| 99% | Braskem PP TI4040WT |
| 1% | Ampacet 100458 Process Aid PE MB |

The base resin and the process aid were added to an extruder hopper and combined via blending to provide a formulation. The formulation was then heated in the extruder to form a molten material.

The molten materials described above were co-extruded to form a multi-layer sheet with a gauge of 0.05 inches, a density of 0.939 g/cm³, and with layer thicknesses as described in Table 10.

TABLE 10

| Target Layer Thicknesses | | |
| --- | --- | --- |
| Layer | Thickness (%) | Thickness (inches) |
| 7.1 | 20 | 0.01 |
| 7.2 | 63 | 0.0315 |
| 7.3 | 2 | 0.001 |
| 7.4 | 1 | 0.0005 |
| 7.5 | 3 | 0.0015 |
| 7.6 | 1 | 0.0005 |
| 7.7 | 10 | 0.005 |

The multi-layer sheet was thermoformed to form a cup in accordance with the present disclosure.

Example 11

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 11 to correlate the sublayer composition with the sublayer thickness.

A first sublayer (8.1) comprised a base resin, a mineral filler, a colorant, and a process aid. The base resin was Braskem PP TI4040WT. The mineral filler was Heritage Plastics HM10® MAX CaCO₃ concentrate. The colorant was Ampacet 112761 White PE MB. The process aid was Ampacet 100458 Process Aid PE MB. The percentages by weight of the components were about:

| 91.3% | Braskem PP TI4040WT |
| 2.7% | Heritage Plastics HM10 ® MAX |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (8.2) comprised a regrind and a compatibilizer. The regrind was formed as described herein. The compatibilizer was EVAL® GF-30. The percentages by weight of the components were about:

| 97% | Regrind |
| --- | --- |
| 3% | EVAL ® GF-30 |

The regrind and the compatibilizer were added to an extruder hopper and combined via blending to provide a formulation. The formulation was then heated in the extruder to form a molten material.

A first compatibility sublayer (8.3) comprised an adhesive. The adhesive was Mitsui ADMER® QF551A. The adhesive was added to an extruder hopper and then heated in the extruder to form a molten material.

A barrier layer (8.4) comprised a barrier material. The barrier material was Kuraray Co., Ltd. EVAL™ LT171B. The barrier material was added to an extruder hopper and then heated in the extruder to form a molten material.

A second-compatibility layer (8.5) comprised an adhesive. The adhesive was Mitsui ADMER® QF551A. The adhesive was added to an extruder hopper and then heated in the extruder to form a molten material.

A third sublayer (8.6) comprised a regrind and a compatibilizer. The regrind was formed as described herein. The compatibilizer was EVAL® GF-30. The percentages by weight of the components were about:

| 97% | Regrind |
| --- | --- |
| 3% | EVAL ® GF-30 |

The regrind and the compatibilizer were added to an extruder hopper and combined via blending to provide a formulation. The formulation was then heated in the extruder to form a molten material.

A fourth sublayer (8.7) comprised a base resin, a mineral filler, and a process aid. The base resin was Braskem PP TI4040WT. The mineral filler was Heritage Plastics HM10® MAX CaCO$_3$ concentrate. The process aid was Ampacet 100458 Process Aid PE MB. The percentages by weight of the components were about:

| 96.3% | Braskem PP TI4040WT |
| --- | --- |
| 2.7% | Heritage Plastics HM10 ® MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.055 inches, a density of 0.934 g/cm$^3$, and with layer thicknesses as described in Table 11.

TABLE 11

Target Layer Thicknesses

| Layer | Thickness (%) | Thickness (inches) |
| --- | --- | --- |
| 8.1 | 19 | 0.01 |
| 8.2 | 28.5 | 0.016 |
| 8.3 | 1 | 0.00055 |
| 8.4 | 3 | 0.0017 |
| 8.5 | 1 | 0.00055 |
| 8.6 | 28.5 | 0.016 |
| 8.7 | 19 | 0.010 |

The multi-layer sheet was thermoformed to form a cup in accordance with the present disclosure.

Example 12

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 12 to correlate the sublayer composition with the sublayer thickness.

A first sublayer (9.1) comprised a base resin, a mineral filler, a colorant, and a process aid. The base resin was Braskem PP TI4040WT. The mineral filler was Heritage Plastics HiCal™ LC CaCO$_3$ concentrate. The colorant was Ampacet 112761 White PE MB. The process aid was Ampacet 100458 Process Aid PE MB. The percentages by weight of the components were about:

| 91.3% | Braskem PP TI4040WT |
| --- | --- |
| 2.7% | Heritage Plastics HiCal ™ LC |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (9.2) comprised a regrind and a compatibilizer. The regrind was formed as described herein. The compatibilizer was EVAL® GF-30. The percentages by weight of the components were about:

| 97% | Regrind |
| --- | --- |
| 3% | EVAL ® GF-30 |

The regrind and the compatibilizer were added to an extruder hopper and combined via blending to provide a formulation. The formulation was then heated in the extruder to form a molten material.

A first compatibility sublayer (9.3) comprised an adhesive. The adhesive was Mitsui ADMER® QF551A. The adhesive was added to an extruder hopper and then heated in the extruder to form a molten material.

A barrier layer (9.4) comprised a barrier material. The barrier material was Kuraray Co., Ltd. EVAL™ LT171B. The barrier material was added to an extruder hopper and then heated in the extruder to form a molten material.

A second-compatibility layer (9.5) comprised an adhesive. The adhesive was Mitsui ADMER® QF551A. The adhesive was added to an extruder hopper and then heated in the extruder to form a molten material.

A third sublayer (9.6) comprised a regrind and a compatibilizer. The regrind was formed as described herein. The compatibilizer was EVAL® GF-30. The percentages by weight of the components were about:

| 97% | Regrind |
| --- | --- |
| 3% | EVAL ® GF-30 |

The regrind and the compatibilizer were added to an extruder hopper and combined via blending to provide a formulation. The formulation was then heated in the extruder to form a molten material.

A fourth sublayer (9.7) comprised a base resin, a mineral filler, and a process aid. The base resin was Braskem PP TI4040WT. The mineral filler was Heritage Plastics HiCal™ LC CaCO₃ concentrate. The process aid was Ampacet 100458 Process Aid PE MB. The percentages by weight of the components were about:

| | |
|---|---|
| 96.3% | Braskem PP TI4040WT |
| 2.7% | Heritage Plastics HiCal ™ LC |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.055 inches, a density of 0.938 g/cm³, and with layer thicknesses as described in Table 12.

TABLE 12

Target Layer Thicknesses

| Layer | Thickness (%) | Thickness (inches) |
|---|---|---|
| 9.1 | 19 | 0.01 |
| 9.2 | 28.5 | 0.016 |
| 9.3 | 1 | 0.00055 |
| 9.4 | 3 | 0.0017 |
| 9.5 | 1 | 0.00055 |
| 9.6 | 28.5 | 0.016 |
| 9.7 | 19 | 0.010 |

The multi-layer sheet was thermoformed to form a cup in accordance with the present disclosure.

Example 13

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 13 to correlate the sublayer composition with the sublayer thickness.

A first sublayer (10.1) comprised a base resin, a mineral filler, a colorant, and a process aid. The base resin was Braskem PP TI4040WT. The mineral filler was Heritage Plastics Heritage HT6P talc. The colorant was Ampacet 112761 White PE MB. The process aid was Ampacet 100458 Process Aid PE MB. The percentages by weight of the components were about:

| | |
|---|---|
| 91.3% | Braskem PP TI4040WT |
| 2.7% | Heritage Plastics Heritage HT6P |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (10.2) comprised a regrind and a compatibilizer. The regrind was formed as described herein. The compatibilizer was EVAL® GF-30. The percentages by weight of the components were about:

| | |
|---|---|
| 97% | Regrind |
| 3% | EVAL ® GF-30 |

The regrind and the compatibilizer were added to an extruder hopper and combined via blending to provide a formulation. The formulation was then heated in the extruder to form a molten material.

A first compatibility sublayer (10.3) comprised an adhesive. The adhesive was Mitsui ADMER® QF551A. The adhesive was added to an extruder hopper and then heated in the extruder to form a molten material.

A barrier layer (10.4) comprised a barrier material. The barrier material was Kuraray Co., Ltd. EVAL™ LT171B. The barrier material was added to an extruder hopper and then heated in the extruder to form a molten material.

A second-compatibility layer (10.5) comprised an adhesive. The adhesive was Mitsui ADMER® QF551A. The adhesive was added to an extruder hopper and then heated in the extruder to form a molten material.

A third sublayer (10.6) comprised a regrind and a compatibilizer. The regrind was formed as described herein. The compatibilizer was EVAL® GF-30. The percentages by weight of the components were about:

| | |
|---|---|
| 97% | Regrind |
| 3% | EVAL ® GF-30 |

The regrind and the compatibilizer were added to an extruder hopper and combined via blending to provide a formulation. The formulation was then heated in the extruder to form a molten material.

A fourth sublayer (10.7) comprised a base resin, a mineral filler, and a process aid. The base resin was Braskem PP TI4040WT. The mineral filler was Heritage Plastics Heritage HT6P talc concentrate. The process aid was Ampacet 100458 Process Aid PE MB. The percentages by weight of the components were about:

| | |
|---|---|
| 96.3% | Braskem PP TI4040WT |
| 2.7% | Heritage Plastics Heritage HT6P |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.055 inches, a density of 0.937 g/cm³, and with layer thicknesses as described in Table 13.

TABLE 13

Target Layer Thicknesses

| Layer | Thickness (%) | Thickness (inches) |
|---|---|---|
| 10.1 | 19 | 0.01 |
| 10.2 | 28.5 | 0.016 |

TABLE 13-continued

Target Layer Thicknesses

| Layer | Thickness (%) | Thickness (inches) |
|---|---|---|
| 10.3 | 1 | 0.00055 |
| 10.4 | 3 | 0.0017 |
| 10.5 | 1 | 0.00055 |
| 10.6 | 28.5 | 0.016 |
| 10.7 | 19 | 0.010 |

The multi-layer sheet was thermoformed to form a cup in accordance with the present disclosure.

Example 14

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 14 to correlate the sublayer composition with the sublayer thickness.

A first sublayer (11.1) comprised a base resin, a mineral filler, a colorant, and a process aid. The base resin was ExxonMobil™ PP7032KN. The mineral filler was Heritage Plastics Heritage HT6P talc. The colorant was Ampacet 112761 White PE MB. The process aid was Ampacet 100458 Process Aid PE MB. The percentages by weight of the components were about:

| 91.3% | ExxonMobil ™ PP7032KN |
| 2.7% | Heritage Plastics Heritage HT6P |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (11.2) comprised a regrind and a compatibilizer. The regrind was formed as described herein. The compatibilizer was EVAL® GF-30. The percentages by weight of the components were about:

| 97% | Regrind |
| 3% | EVAL ® GF-30 |

The regrind and the compatibilizer were added to an extruder hopper and combined via blending to provide a formulation. The formulation was then heated in the extruder to form a molten material.

A first compatibility sublayer (11.3) comprised an adhesive. The adhesive was Mitsui ADMER® QF551A. The adhesive was added to an extruder hopper and then heated in the extruder to form a molten material.

A barrier layer (11.4) comprised a barrier material. The barrier material was Kuraray Co., Ltd. EVAL™ LT171B. The barrier material was added to an extruder hopper and then heated in the extruder to form a molten material.

A second-compatibility layer (11.5) comprised an adhesive. The adhesive was Mitsui ADMER® QF551A. The adhesive was added to an extruder hopper and then heated in the extruder to form a molten material.

A third sublayer (11.6) comprised a regrind and a compatibilizer. The regrind was formed as described herein. The compatibilizer was EVAL® GF-30. The percentages by weight of the components were about:

| 97% | Regrind |
| 3% | EVAL ® GF-30 |

The regrind and the compatibilizer were added to an extruder hopper and combined via blending to provide a formulation. The formulation was then heated in the extruder to form a molten material.

A fourth sublayer (11.7) comprised a base resin, a mineral filler, and a process aid. The base resin was ExxonMobil™ PP7032KN. The mineral filler was Heritage Plastics Heritage HT6P talc concentrate. The process aid was Ampacet 100458 Process Aid PE MB. The percentages by weight of the components were about:

| 96.3% | ExxonMobil ™ PP7032KN |
| 2.7% | Heritage Plastics Heritage HT6P |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.055 inches, a density of 0.937 g/cm$^3$, and with layer thicknesses as described in Table 14.

TABLE 14

Target Layer Thicknesses

| Layer | Thickness (%) | Thickness (inches) |
|---|---|---|
| 11.1 | 19 | 0.01 |
| 11.2 | 28.5 | 0.016 |
| 11.3 | 1 | 0.00055 |
| 11.4 | 3 | 0.0017 |
| 11.5 | 1 | 0.00055 |
| 11.6 | 28.5 | 0.016 |
| 11.7 | 19 | 0.010 |

The multi-layer sheet was thermoformed to form a cup in accordance with the present disclosure.

Example 15

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 15 to correlate the sublayer composition with the sublayer thickness.

A first sublayer (12.1) comprised a base resin, a mineral filler, a colorant, and a process aid. The base resin was ExxonMobil™ PP7032KN. The mineral filler was Heritage Plastics HiCal™ LC CaCO$_3$ concentrate. The colorant was Ampacet 112761 White PE MB. The process aid was Ampacet 100458 Process Aid PE MB. The percentages by weight of the components were about:

| 91.3% | ExxonMobil ™ PP7032KN |
| 2.7% | Heritage Plastics HiCal ™ LC |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (12.2) comprised a regrind and a compatibilizer. The regrind was formed as described herein. The compatibilizer was EVAL® GF-30. The percentages by weight of the components were about:

| 97% | Regrind |
| 3% | EVAL ® GF-30 |

The regrind and the compatibilizer were added to an extruder hopper and combined via blending to provide a formulation. The formulation was then heated in the extruder to form a molten material.

A first compatibility sublayer (12.3) comprised an adhesive. The adhesive was Mitsui ADMER® QF551A. The adhesive was added to an extruder hopper and then heated in the extruder to form a molten material.

A barrier layer (12.4) comprised a barrier material. The barrier material was Kuraray Co., Ltd. EVAL™ LT171B. The barrier material was added to an extruder hopper and then heated in the extruder to form a molten material.

A second-compatibility layer (12.5) comprised an adhesive. The adhesive was Mitsui ADMER® QF551A. The adhesive was added to an extruder hopper and then heated in the extruder to form a molten material.

A third sublayer (12.6) comprised a regrind and a compatibilizer. The regrind was formed as described herein. The compatibilizer was EVAL® GF-30. The percentages by weight of the components were about:

| 97% | Regrind |
| 3% | EVAL ® GF-30 |

The regrind and the compatibilizer were added to an extruder hopper and combined via blending to provide a formulation. The formulation was then heated in the extruder to form a molten material.

A fourth sublayer (12.7) comprised a base resin, a mineral filler, and a process aid. The base resin was ExxonMobil™ PP7032KN. The mineral filler was Heritage Plastics HiCal™ LC CaCO$_3$ concentrate. The process aid was Ampacet 100458 Process Aid PE MB. The percentages by weight of the components were about:

| 96.3% | ExxonMobil ™ PP7032KN |
| 2.7% | Heritage Plastics HiCal ™ LC |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.055 inches, a density of 0.938 g/cm$^3$, and with layer thicknesses as described in Table 15.

TABLE 15

Target Layer Thicknesses

| Layer | Thickness (%) | Thickness (inches) |
| --- | --- | --- |
| 12.1 | 19 | 0.01 |
| 12.2 | 28.5 | 0.016 |
| 12.3 | 1 | 0.00055 |
| 12.4 | 3 | 0.0017 |
| 12.5 | 1 | 0.00055 |
| 12.6 | 28.5 | 0.016 |
| 12.7 | 19 | 0.010 |

The multi-layer sheet was thermoformed to form a cup in accordance with the present disclosure.

Example 16

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 16 to correlate the sublayer composition with the sublayer thickness.

A first sublayer (13.1) comprised a base resin, a mineral filler, a colorant, and a process aid. The base resin was ExxonMobil™ PP7032KN. The mineral filler was Heritage Plastics HM10®MAX CaCO$_3$ concentrate. The colorant was Ampacet 112761 White PE MB. The process aid was Ampacet 100458 Process Aid PE MB. The percentages by weight of the components were about:

| 91.3% | ExxonMobil ™ PP7032KN |
| 2.7% | Heritage Plastics HM10 ®MAX |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (13.2) comprised a regrind and a compatibilizer. The regrind was formed as described herein. The compatibilizer was EVAL® GF-30. The percentages by weight of the components were about:

| 97% | Regrind |
| 3% | EVAL ® GF-30 |

The regrind and the compatibilizer were added to an extruder hopper and combined via blending to provide a formulation. The formulation was then heated in the extruder to form a molten material.

A first compatibility sublayer (13.3) comprised an adhesive. The adhesive was Mitsui ADMER® QF551A. The adhesive was added to an extruder hopper and then heated in the extruder to form a molten material.

A barrier layer (13.4) comprised a barrier material. The barrier material was Kuraray Co., Ltd. EVAL™ LT171B. The barrier material was added to an extruder hopper and then heated in the extruder to form a molten material.

A second-compatibility layer (13.5) comprised an adhesive. The adhesive was Mitsui ADMER® QF551A. The adhesive was added to an extruder hopper and then heated in the extruder to form a molten material.

A third sublayer (13.6) comprised a regrind and a compatibilizer. The regrind was formed as described herein. The compatibilizer was EVAL® GF-30. The percentages by weight of the components were about:

| | |
|---|---|
| 97% | Regrind |
| 3% | EVAL ® GF-30 |

The regrind and the compatibilizer were added to an extruder hopper and combined via blending to provide a formulation. The formulation was then heated in the extruder to form a molten material.

A fourth sublayer (13.7) comprised a base resin, a mineral filler, and a process aid. The base resin was ExxonMobil™ PP7032KN. The mineral filler was Heritage Plastics HM10®MAX CaCO₃ concentrate. The process aid was Ampacet 100458 Process Aid PE MB. The percentages by weight of the components were about:

| | |
|---|---|
| 96.3% | ExxonMobil ™ PP7032KN |
| 2.7% | Heritage Plastics HM10 ®MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.055 inches, a density of 0.933 g/cm³, and with layer thicknesses as described in Table 16.

TABLE 16

Target Layer Thicknesses

| Layer | Thickness (%) | Thickness (inches) |
|---|---|---|
| 13.1 | 19 | 0.01 |
| 13.2 | 28.5 | 0.016 |
| 13.3 | 1 | 0.00055 |
| 13.4 | 3 | 0.0017 |
| 13.5 | 1 | 0.00055 |
| 13.6 | 28.5 | 0.016 |
| 13.7 | 19 | 0.010 |

The multi-layer sheet was thermoformed to form a cup in accordance with the present disclosure.

Example 17

Cup Performance

The instant example is provided to evaluate the properties of the exemplary multi-layer sheet. The multi-layer sheets formed in Examples 11-16 were thermoformed to make cups. The cups were placed in a cup holder of a brewing machine (Model B31, Model K200, or Model K300) so that the multi-layer sheet of the cup was in either the machine direction, the transverse direction, or a random direction. Cups were either placed in the machine direction (about 90° from indicator 351), the transverse direction (about 180° from indicator 351), or randomly. The lid of the brewing machine was closed causing a cannula of the brewing machine to apply a force the floor of the cup. 30 cups were tested for each brewing machine in each sheet direction for each multi-layer sheet from Examples 11-16. Puncture quality was analyzed and cups showing fracturing or failed puncture did not pass. The results can be seen in Table 17.

TABLE 17

Puncture Results

| Ex. | K200 (% pass) | K300 (% pass) | B31 (% pass) |
|---|---|---|---|
| 11 | 30 (100) | 30 (100) | 17 (57) |
| 12 | 30 (100) | 30 (100) | 25 (83) |
| 13 | 27 (90) | 29 (97) | 30 (100) |
| 14 | 30 (100) | 30 (100) | 30 (100) |
| 15 | 30 (100) | 29 (97) | 24 (80) |
| 16 | 30 (100) | 30 (100) | 28 (93) |

Example 18

Formulation and Extrusion

An exemplary multi-layer sheet in accordance with certain aspects of the present disclosure is provided in the instant example. The multi-layer sheet in this example is a seven layer co-extruded sheet. For purposes of illustration, each sublayer of the multi-layer sheet is numbered successively in reference to Table 16 to correlate the sublayer composition with the sublayer thickness.

A first sublayer (14.1) comprised a base resin, a mineral filler, a colorant, and a process aid. The base resin was Braskem PP TI4040WT. The mineral filler was Heritage Plastics HM10®MAX CaCO₃ concentrate. The colorant was Ampacet 112761 White PE MB. The process aid was Ampacet 100458 Process Aid PE MB. The percentages by weight of the components were about:

| | |
|---|---|
| 90.5% | Braskem PP TI4040WT |
| 3.5% | Heritage Plastics HM10 ®MAX |
| 5% | Ampacet 112761 |
| 1% | Ampacet 100458 Process Aid PE MB |

The base resin, the mineral filler, the colorant, and the process aid were added to an extruder hopper and combined via blending to provide a formulation. The formulation was then heated in the extruder to form a molten material.

A second sublayer (14.2) comprised a regrind and a compatibilizer. The regrind was formed as described herein. The compatibilizer was EVAL® GF-30. The percentages by weight of the components were about:

| | |
|---|---|
| 97% | Regrind |
| 3% | EVAL ® GF-30 |

The regrind and the compatibilizer were added to an extruder hopper and combined via blending to provide a formulation. The formulation was then heated in the extruder to form a molten material.

A first compatibility sublayer (14.3) comprised an adhesive. The adhesive was Mitsui ADMER® QF551A. The adhesive was added to an extruder hopper and then heated in the extruder to form a molten material.

A barrier layer (14.4) comprised a barrier material. The barrier material was Kuraray Co., Ltd. EVAL™ LT171B. The barrier material was added to an extruder hopper and then heated in the extruder to form a molten material.

A second-compatibility layer (14.5) comprised an adhesive. The adhesive was Mitsui ADMER® QF551A. The adhesive was added to an extruder hopper and then heated in the extruder to form a molten material.

A third sublayer (14.6) comprised a regrind and a compatibilizer. The regrind was formed as described herein. The compatibilizer was EVAL® GF-30. The percentages by weight of the components were about:

| | |
|---|---|
| 97% | Regrind |
| 3% | EVAL ® GF-30 |

The regrind and the compatibilizer were added to an extruder hopper and combined via blending to provide a formulation. The formulation was then heated in the extruder to form a molten material.

A fourth sublayer (14.7) comprised a base resin, a mineral filler, and a process aid. The base resin was Braskem PP TI4040WT. The mineral filler was Heritage Plastics HM10®MAX $CaCO_3$ concentrate. The process aid was Ampacet 100458 Process Aid PE MB. The percentages by weight of the components were about:

| | |
|---|---|
| 95.5% | Braskem PP TI4040WT |
| 3.5% | Heritage Plastics HM10 ®MAX |
| 1% | Ampacet 100458 Process Aid PE MB |

The base resin, the mineral filler, and the process aid were added to an extruder hopper and combined via blending to provide a formulation. The formulation was then heated in the extruder to form a molten material.

The molten materials described above were co-extruded to form a multi-layer sheet with a gauge of about 0.06 inches, a density of 0.970 $g/cm^3$, and with layer thicknesses as described in Table 18.

TABLE 18

Target Layer Thicknesses

| Layer | Thickness (%) | Thickness (inches) |
|---|---|---|
| 14.1 | 21 | 0.013 |
| 14.2 | 26.5 | 0.016 |
| 14.3 | 1 | 0.0006 |
| 14.4 | 3 | 0.0018 |
| 14.5 | 1 | 0.0006 |
| 14.6 | 26.5 | 0.016 |
| 14.7 | 21 | 0.013 |

The multi-layer sheet was thermoformed to form a cup in accordance with the present disclosure.

The invention claimed is:

1. A cup for a beverage brewing package, the cup comprising
a floor,
a brim located spaced-apart from the floor and extending circumferentially around a central axis, and
a side wall extending from the floor to the brim,
wherein the cup is made from a multi-layer sheet configured to form a cannula aperture in response to a force being applied by a cannula to the cup so that any fractures extending from the cannula aperture are minimized and the multi-layer sheet has a density less than about 1 $g/cm^3$ to cause the multi-layer sheet to float in a sink/float separation tank, and
wherein the multi-layer sheet comprises a polypropylene impact copolymer and a mineral filler and the mineral filler is located in an outer-skin layer that forms an outer surface of the side wall, and
wherein the polypropylene impact copolymer comprises a rubber phase and a polypropylene matrix phase.

2. The cup of claim 1, wherein the multi-layer sheet includes an inner-skin layer, the outer-skin layer, and a barrier layer arranged to extend between and interconnect the inner-skin layer and the outer-skin layer.

3. The cup of claim 2, wherein the outer-skin layer comprises the polypropylene impact copolymer.

4. The cup of claim 3, wherein the mineral filler of the outer-skin layer is selected from the group consisting of calcium carbonate ($CaCO_3$), dolomite, barium sulfate ($BaSO_4$), talc, wollastonite, mica, kaolin, and a combination thereof.

5. The cup of claim 4, wherein the density of the multi-layer sheet is about 0.9 $g/cm^3$ to about 0.98 $g/cm^3$.

6. The cup of claim 3, wherein the multi-layer sheet has a thickness of about 0.04 inches to about 0.08 inches.

7. The cup of claim 6, wherein the side wall is formed to include a series of ribs.

8. The cup of claim 2, wherein the outer-skin layer includes a first sublayer, a second sublayer, and a third sublayer, and the second sublayer extends between and interconnects the first sublayer and the third sublayer.

9. The cup of claim 8, wherein the polypropylene impact copolymer is at least 80% by weight of the first sublayer.

10. The cup of claim 9, wherein the mineral filler is about 1% to about 10% by weight of the first sublayer.

11. The cup of claim 8, wherein the second sublayer comprises about 10% to about 95% by weight regrind.

12. The cup of claim 2, wherein the inner-skin layer has a thickness and the outer-skin layer has a thickness that is substantially similar to the thickness of the inner-skin layer.

13. The cup of claim 2, wherein the outer-skin layer comprises a first sublayer forming an outer surface of the multi-layer sheet, a second sublayer, a third sublayer spaced-apart from the first sublayer to locate the second sublayer therebetween, and a first-compatibility layer spaced-apart from the second sublayer to locate the third sublayer therebetween, and the first-compatibility layer extends between and interconnects the third sublayer with the barrier layer.

14. The cup of claim 13, wherein the first sublayer comprises the polypropylene impact copolymer.

15. The cup of claim 14, wherein the polypropylene impact copolymer is about 20% to about 95% by weight of the first sublayer.

16. The cup of claim 14, wherein the polypropylene impact copolymer is about 97% by weight of the first sublayer.

17. The cup of claim 16, wherein the second sublayer comprises a regrind.

18. The cup of claim 17, wherein the second sublayer comprises up to about 95% by weight the regrind.

19. The cup of claim 2, wherein the barrier layer comprises up to 100% by weight EVOH.

20. The cup of claim 13, wherein the inner-skin layer has a thickness and the outer-skin layer has a thickness that is substantially similar to the thickness of the inner-skin layer.

* * * * *